US012715983B2

(12) United States Patent
Bellehumeur et al.

(10) Patent No.: US 12,715,983 B2
(45) Date of Patent: Aug. 25, 2026

(54) LINEAR HIGH-DENSITY ETHYLENE INTERPOLYMER COMPOSITIONS

(71) Applicant: NOVA Chemicals (International) S.A., Fribourg (CH)

(72) Inventors: Celine Bellehumeur, Calgary (CA); Brian Molloy, Airdrie (CA); Gilbert Arnould, Calgary (CA); Henry Hay, Calgary (CA); Tracy Li, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 736 days.

(21) Appl. No.: 18/009,007

(22) PCT Filed: Jun. 4, 2021

(86) PCT No.: PCT/IB2021/054917
§ 371 (c)(1),
(2) Date: Dec. 8, 2022

(87) PCT Pub. No.: WO2021/250520
PCT Pub. Date: Dec. 16, 2021

(65) Prior Publication Data

US 2023/0279205 A1 Sep. 7, 2023

Related U.S. Application Data

(60) Provisional application No. 63/037,754, filed on Jun. 11, 2020.

(51) Int. Cl.
*C08L 23/0807* (2025.01)

(52) U.S. Cl.
CPC ..... *C08L 23/0815* (2013.01); *C08L 2205/025* (2013.01); *C08L 2205/03* (2013.01); *C08L 2308/00* (2013.01); *C08L 2314/02* (2013.01)

(58) Field of Classification Search
None
See application file for complete search history.

(56) References Cited

U.S. PATENT DOCUMENTS

| | | | |
|---|---|---|---|
| 5,292,845 | A | 3/1994 | Kawasaki et al. |
| 5,376,439 | A | 12/1994 | Hodgson et al. |
| 7,803,629 | B2 | 9/2010 | Deslauriers et al. |
| 8,022,143 | B2 | 9/2011 | Wang |
| 2015/0353715 | A1 | 12/2015 | Wang |
| 2017/0051138 | A1 | 2/2017 | Wang et al. |

FOREIGN PATENT DOCUMENTS

| | | | |
|---|---|---|---|
| CA | 2 957 706 | A1 * | 8/2018 |
| WO | WO-93/03093 | A1 | 2/1993 |
| WO | WO-2005/121239 | A2 | 12/2005 |
| WO | WO-2006/048253 | A1 | 5/2006 |
| WO | WO-2006/048254 | A1 | 5/2006 |
| WO | WO-2021/084416 | A1 | 5/2021 |

OTHER PUBLICATIONS

ASTM D1238-20—Standard Test Method for Melt Flow Rates of Thermoplastics by Extrusion Plastometer—Copyright ASTM International—Current edition approved Jul. 1, 2020. Published Aug. 2020. Originally approved in 1965. Last previous edition approved in 2013 as D1238-13; 17 pages.

ASTM D1525-17—Standard Test Method for Vicat Softening Temperature of Plastics—Copyright ASTM International—Current edition approved Aug. 1, 2017. Published Aug. 2017. Originally approved in 1958. Last previous edition approved in 2009 as D1525-09; 11 pages.

ASTM D1693-13—Standard Test Method for Environmental Stress-Cracking of Ethylene Plastics—Copyright ASTM International—Current edition approved Apr. 1, 2013. Published Apr. 2013. Originally approved in 1959. Last previous edition approved in 2012 as D1693-12; 11 pages.

ASTM D1822-13—Standard Test Method for Tensile-Impact Energy to Break Plastics and Electrical Insulating Materials—Copyright ASTM International—Current edition approved Sep. 1, 2013. Published Nov. 2013. Originally approved in 1961. Last previous edition approved in 2006 as D1822-06; 11 pages.

ASTM D256-10—Standard Test Method for Determining the Izod Pendulum Impact Resistance of Plastics—Copyright ASTM International—Current edition approved Nov. 1, 2018. Published Nov. 2018. Originally approved in 1926. Last previous edition approved in 2010 as D256-10; 20 pages.

ASTM D3124-98—Standard Test Method for Vinylidene Unsaturation in Polyethylene by Infrared Spectrophotometry—Copyright ASTM International—Current edition approved Mar. 10, 1998. Published Dec. 1998. Originally published as D3124-72. Last previous edition D3124-93; 4 pages.

ASTM D3418-12—Standard Test Method for Transition Temperatures and Enthalpies of Fusion and Crystallization of Polymers by Differential Scanning Calorimetry—Current edition approved Aug. 1, 2012. Published Sep. 2012. Originally approved in 1975. Last previous edition approved in 2008 as D3418-08; 7 pages.

ASTM D5227-21—Standard Test Method for Measurement of Hexane Extractable Content of Polyolefins—Current edition approved Jul. 1, 2021. Published Jul. 2021. Originally approved in 1992. Last previous edition approved in 2013 as D5227-13; 4 pages.

ASTM D5628-18—Standard Test Method for Impact Resistance of Flat, Rigid Plastic Specimens by Means of a Falling Dart (Tup or Falling Mass)—Copyright ASTM International—Current edition approved May 1, 2018. Published Jun. 2018. Originally approved in 1994. Last previous edition approved in 2010 as D5628-10; 10 pages.

(Continued)

*Primary Examiner* — Robert S Jones, Jr.
*Assistant Examiner* — Lily K Sloan
(74) *Attorney, Agent, or Firm* — Thomas J. Styslinger

(57) ABSTRACT

Provided in this disclosure is an ethylene interpolymer composition. The ethylene interpolymer composition includes a first ethylene interpolymer, a second ethylene interpolymer, and a third ethylene interpolymer. Further, the ethylene interpolymer composition has a density of at least 0.945 g/cm3; an environmental stress crack resistance (ESCR), measured according to ASTM D1693, Condition B, 10% IGEPAL CO-360, of at least 90 hours; and an Izod impact strength of at least 80 J/m, as measured according to ASTM D256.

17 Claims, 7 Drawing Sheets

(56) References Cited

OTHER PUBLICATIONS

ASTM D6248-98—Standard Test Method for Vinyl and Trans Unsaturation in Polyethylene by Infrared Spectrophotometry—Copyright ASTM International—Current edition approved Apr. 10, 1998. Published Feb. 1999; 3 pages.
ASTM D638-22—Standard Test Method for Tensile Properties of Plastics—Copyright ASTM International—Current edition approved Jul. 1, 2022. Published Jul. 2022. Originally approved in 1941. Last previous edition approved in 2014 as D0638-22; 16 pages.
ASTM D6474-99—Standard Test Method for Determining Molecular Weight Distribution and Molecular Weight Averages of Polyolefins by High Temperature Gel Permeation Chromatography—Copyright ASTM International—Current edition approved Nov. 10, 1999. Published Feb. 2000; 6 pages.
ASTM D6645-01—Standard Test Method for Methyl (Comonomer) Content in Polyethylene by Infrared Spectrophotometry—Copyright ASTM International—Current edition approved Mar. 10, 2001. Published Jun. 2001; 4 pages.
ASTM D792-13—Standard Test Method for Density and Specific Gravity (Relative Density) of Plastics by Displacement—Current edition approved Nov. 1, 2013. Published Nov. 2013. Originally approved in 1944. Last previous edition approved in 2008 as D792-08; 6 pages.
Dealy et al., "Time-Temperature Superposition—A Users Guide", Rheol. Bull., vol. 78, No. 2, 2009, pp. 16-31.
Gurp et al., "Time-Temperature Superposition for Polymeric Blends", Rheol. Bull., vol. 67, No. 1, 1998, pp. 5-8.
International Search Report & Written Opinion of the International Searching Authority issued in PCT Application No. PCT/IB2021/054917.
Nobile et al., "Evaluation of Molecular Weight Distribution from Dynamic Moduli", Rheol. Acta., vol. 40, 2001, pp. 111-119.
Randall et al., "A Review of High Resolution Liquid Carbon Nuclear Magnetic Resonance Characterizations of Ethylene-Based Polymers", Rev. Macromol. Chem. Phys., C29 (2&3), p. 201-286.
Rudin et al., "Basic Principles of Polymer Molecular Weights", 2nd Edition, Academic Press, 1999, pp. 63-87.
Thompson et al., "A Simplified Model for Prediction of Molecular Weight Distributions in Ethylene-Hexene Copolymerization Using Ziegler-Natta Catalysts", Macromol. React. Eng., vol. 1, 2007, pp. 523-536.
Thompson et al., "Exploring Reaction Kinetics of a Multi-Site Ziegler-Natta Catalyst Using Deconvolution of Molecular Weight Distributions for Ethylene-Hexene Copolymers", Macromol. React. Eng., vol. 1, 2007, pp. 264-274.
Trinkle et al., "Van Gurp-Palmen Plot II—Classification of long chain branched polymers by their topology", Rheol. Acta., vol. 41, 2002, pp. 103-113.
Tung et al., "The Effect of Molecular Weight on the Crystallinity of Polyethylene", J. Phys. Chem., vol. 62, No. 12, pp. 1530-1534.
Wild et al., "Determination of Branching Distributions in Polyethylene and Ethylene Copolymers", J. Poly. Sci.: Polym. Phys., vol. 20, 1982 pp. 441-455.
Wu et al., "Chain Structure and Entanglement", J. Poly. Sci.: Polym. Phys., vol. 27, 1989, pp. 723-741.

* cited by examiner

LINEAR HIGH-DENSITY ETHYLENE INTERPOLYMER COMPOSITIONS

CROSS-REFERENCE TO RELATED APPLICATIONS

This application is a U.S. National Phase Application under 35 U.S.C. § 371 of International Application No. PCT/IB2021/054917, filed Jun. 4, 2021, which claims priority to and the benefit of U.S. Provisional Application No. 63/037,754, filed Jun. 11, 2020, both of which are hereby incorporated by reference in their entireties.

TECHNICAL FIELD

This disclosure generally relates to interpolymer compositions as well as rotomolded articles made therefrom.

SUMMARY OF INVENTION

Provided in this disclosure is an ethylene interpolymer composition comprising a first ethylene interpolymer, a second ethylene interpolymer, and a third ethylene interpolymer. The ethylene interpolymer composition has a density of at least 0.945 g/cm$^3$; an environmental stress crack resistance (ESCR), measured according to ASTM D1693, Condition B, 10% IGEPAL® CO-360, of at least 90 hours; and an IZOD impact strength of greater than 1.5 ft·lb/inch.

In some embodiments, the density of the ethylene interpolymer composition is from 0.945 g/cm$^3$ to 0.957 g/cm$^3$. For example, the ethylene interpolymer composition can have a density from 0.945 g/cm$^3$ to 0.949 g/cm$^3$.

In some embodiments, the density of the ethylene interpolymer composition is from 0.949 g/cm$^3$ to 0.953 g/cm$^3$.

In some embodiments, the density of the ethylene interpolymer composition is from 0.953 g/cm$^3$ to 0.957 g/cm$^3$.

In some embodiments, the ethylene interpolymer composition has a melt index, $I_2$, of at least 0.5 g/10 min. For example, the ethylene interpolymer composition can have a melt index, $I_2$, from 0.5-10 g/10 min. In some embodiments, the ethylene interpolymer composition comprises a melt index, $I_2$, from 0.5-5 g/10 min.

In some embodiments, the ethylene interpolymer composition has a number average molecular weight, $M_n$, from 10,000 to 40,000. For example, the ethylene interpolymer composition can have a number average molecular weight, $M_n$, from 14,000 to 20,000.

In some embodiments, the ethylene interpolymer composition has a weight-average molecular weight, $M_w$, from 40,000 to 150,000. For example, the ethylene interpolymer composition can have a weight-average molecular weight, $M_w$, from 90,000 to 100,000.

In some embodiments, the ethylene interpolymer composition has a z-average molecular weight, $M_z$, from 200,000 to 800,000. For example, the ethylene interpolymer composition can have a z-average molecular weight, $M_z$, from 240,000 to 260,000.

In some embodiments, the ethylene interpolymer composition has a polydispersity index ($M_w/M_n$) from 3 to 11. For example, the ethylene interpolymer composition can have a polydispersity index ($M_w/M_n$) from 5 to 6.

In some embodiments, the ethylene interpolymer composition has an ESCR from 90 hours to 500 hours, as measured according to ASTM D1693, Condition B, 10% IGEPAL CO-360. For example, the ethylene interpolymer composition can have an ESCR from 130 hours to 160 hours, as measured according to ASTM D1693, Condition B, 10% IGEPAL CO-360.

In some embodiments, the Izod impact strength of the ethylene interpolymer composition is from 1.5 ft·lb/in$^2$ to 10 ft·lb/in$^2$. For example, Izod impact strength of the ethylene interpolymer composition can be from 1.5 ft·lb/in$^2$ to 3 ft·lb/in$^2$.

In some embodiments, the ethylene interpolymer has a tensile impact of at least 150 ft·lb/in$^2$. For example, the ethylene interpolymer composition can have a tensile impact from 200 ft·lb/in$^2$ to 250 ft·lb/in$^2$.

In some embodiments, the ethylene interpolymer composition has a flex modulus (1% secant) of at least 1,000 MPa. For example, the ethylene interpolymer composition can have a flex modulus (1% secant) from 1,000-1,200 MPa.

In some embodiments, at least one of the first ethylene interpolymer, the second ethylene interpolymer, or the third ethylene interpolymer comprises an α-olefin chosen from butene, pentene, hexene, heptene, octene, nonene, decene, or a combination thereof. In some embodiments, at least one of the first ethylene interpolymer, the second ethylene interpolymer, or the third ethylene interpolymer comprises 1-octene.

In some embodiments, at least one of the first ethylene interpolymer, the second ethylene interpolymer, or the third ethylene interpolymer comprises an α-olefin chosen from butene, pentene, hexene, heptene, octene, nonene, decene, or a combination thereof, and the α-olefin is present in an amount from 0.05 mol. % to 5 mol. % of the ethylene interpolymer composition. In some embodiments, at least one of the first ethylene interpolymer, the second ethylene interpolymer, or the third ethylene interpolymer comprises an α-olefin chosen from butene, pentene, hexene, heptene, octene, nonene, decene, or a combination thereof; and the α-olefin is present in an amount from 1.8 mol. % to 2.8 mol. % of the ethylene interpolymer composition.

In some embodiments, at least one of the first ethylene interpolymer, the second ethylene interpolymer, or the third ethylene interpolymer comprises 1-octene and the 1-octene is present in an amount from 0.05 mol. % to 5 mol. % of the ethylene interpolymer composition. In some embodiments, at least one of the first ethylene interpolymer, the second ethylene interpolymer, or the third ethylene interpolymer comprises 1-octene and the 1-octene is present in an amount from 1.8 mol. % to 2.8 mol. % of the ethylene interpolymer composition.

In some embodiments, the ethylene interpolymer composition has a bimodal profile in a gel permeation chromatograph.

In some embodiments, the ethylene interpolymer composition comprises a catalyst residue. For example, the ethylene interpolymer composition can include at least one catalyst residue chosen from titanium, aluminum, magnesium, and chlorine. In some embodiments, the ethylene interpolymer composition includes from 0.100 parts per million (ppm) to 1.000 ppm titanium. For example, the ethylene interpolymer composition can include from 0.200 ppm to 0.400 ppm titanium. In some embodiments, the ethylene interpolymer composition includes from 1.00 ppm aluminum to 10.00 ppm aluminum. For example, the ethylene interpolymer composition can include from 5.00 ppm aluminum to 6.00 ppm aluminum. In some embodiments, the ethylene interpolymer composition includes less than 2.0 ppm magnesium. In some embodiments, the ethylene interpolymer composition includes from 0.100 ppm chlorine to 1.000 ppm chlorine. For example, the ethylene interpolymer composition can include from 0.300 ppm to 0.600 ppm chlorine.

In some embodiments, the first interpolymer comprises 15 wt. % to 60 wt. % of the ethylene interpolymer composition. For example, the first interpolymer can include 35 wt. % to 50 wt. % of the ethylene interpolymer composition. In some embodiments, the first interpolymer comprises 40 wt. % to 45 wt. % of the ethylene interpolymer composition.

In some embodiments, the first interpolymer has a polydispersity ($M_w/M_n$) less than 3. In some embodiments, the first interpolymer has a polydispersity ($M_w/M_n$) from 1.5 to 3.

In some embodiments, the first interpolymer has a weight average molecular weight, $M_w$, from 100,000 to 400,000. For example, the first interpolymer can have a weight average molecular weight, $M_w$, from 150,000 to 300,000.

In some embodiments, the first interpolymer has a number average molecular weight, $M_n$, from 10,000 to 250,000. For example, the first interpolymer has a number average molecular weight, $M_n$, from 50,000 to 200,000.

In some embodiments, the first interpolymer has a z-average molecular weight, $M_z$, from 200,000 to 500,000. For example, the first interpolymer can have a z-average molecular weight, $M_z$, from 250,000 to 400,000.

In some embodiments, the first interpolymer has a melt index, $I_2$, of less than 0.4. In some embodiments, the first interpolymer has a melt index, $I_2$, from 0.01 g/10 min to 0.4 g/10 min.

In some embodiments, the first interpolymer has a density from 0.900 g/cm$^3$ to 0.945 g/cm$^3$. For example, the first interpolymer can have a density from 0.920 g/cm$^3$ to 0.940 g/cm$^3$.

In some embodiments, the second interpolymer is present in an amount from 30 wt. % to 85 wt. % of the ethylene interpolymer composition. For example, the second interpolymer can be present in an amount from 45 wt. % to 75 wt. % of the ethylene interpolymer composition. In some embodiments, the second interpolymer is present in an amount from 50 wt. % to 60 wt. % of the ethylene interpolymer composition.

In some embodiments, the second interpolymer a has polydispersity ($M_w/M_n$) of at least 2. For example, the second interpolymer can have a polydispersity ($M_w/M_n$) from 2 to 5.

In some embodiments, the second interpolymer has a weight average molecular weight, $M_w$, from 5,000 to 60,000. For example, the second interpolymer can have a weight average molecular weight, $M_w$, from 10,000 to 50,000. In some embodiments, the second interpolymer has a weight average molecular weight, $M_w$, from 10,000 to 40,000.

In some embodiments, the second interpolymer has a number average molecular weight, $M_n$, from 3,000 to 20,000. For example, the second interpolymer can have a number average molecular weight, $M_n$, from 5,000 to 15,000.

In some embodiments, the second interpolymer has a z-average molecular weight, $M_z$, from 10,000 to 70,000. For example, the second interpolymer can have a z-average molecular weight, $M_z$, from 15,000 to 45,000.

In some embodiments, the second interpolymer has a melt index, $I_2$, at least 1 g/10 min. For example, the second interpolymer can have a melt index, $I_2$, from 1 g/10 min to 10,000 g/10 min. In some embodiments, the second interpolymer has a melt index, $I_2$, up to 7,000 g/10 min.

In some embodiments, the second interpolymer has a density from 0.945 g/cm$^3$ to 0.975 g/cm$^3$. For example, the second interpolymer can have a density from 0.950 g/cm$^3$ to 0.975 g/cm$^3$.

In some embodiments, the third interpolymer can be present in an amount of up to 30 wt. % of the ethylene interpolymer composition. For example, the third interpolymer can be present in an amount from 10 wt. % to 30 wt. % of the ethylene interpolymer composition. In some embodiments, the third interpolymer is present in an amount from 10 wt. % to 20 wt. % of the ethylene interpolymer composition.

In some embodiments, the third interpolymer has a polydispersity ($M_w/M_n$) less than 3. In some embodiments, the third interpolymer has a polydispersity ($M_w/M_n$) from 1.5 to 3.

In some embodiments, the third interpolymer has a weight average molecular weight, $M_w$, from 25,000 to 90,000. For example, the third interpolymer can have a weight average molecular weight, $M_w$, from 30,000 to 75,000. In some embodiments, the third interpolymer has a weight average molecular weight, $M_w$, from 30,000 to 60,000.

In some embodiments, the third interpolymer has a number average molecular weight, $M_n$, from 10,000 to 50,000. For example, the third interpolymer can have a number average molecular weight, $M_n$, from 10,000 to 40,000.

In some embodiments, the third interpolymer has a z-average molecular weight, $M_z$, from 50,000 to 100,000. For example, the third interpolymer can have a z-average molecular weight, $M_z$, from 50,000 to 85,000.

In some embodiments, the third interpolymer has a melt index, $I_2$, from 0.5 g/10 min to 200 g/10 min. For example, the third interpolymer can have a melt index, $I_2$, from 0.5 g/10 min to 100 g/10 min. In some embodiments, the third interpolymer has a melt index, $I_2$, from 0.5 g/10 min to 30 g/10 min.

In some embodiments, the third interpolymer has a density from 0.940 g/cm$^3$ to 0.975 g/cm$^3$. For example, the third interpolymer can have a density from 0.945 g/cm$^3$ to 0.965 g/cm$^3$.

In some embodiments, the ethylene interpolymer composition includes 10 wt. % to 60 wt. % of the first ethylene interpolymer, 30 wt. % to 90 wt. % of the second ethylene interpolymer, and up to 30 wt. % of the third ethylene interpolymer.

In some embodiments, the ethylene interpolymer composition includes 15 wt. % to 60 wt. % of the first ethylene interpolymer, 30 wt. % to 90 wt. % of the second ethylene interpolymer, and 10 wt. % to 20 wt. % of the third ethylene interpolymer.

In some embodiments, the first ethylene interpolymer has a density from 0.900 g/cm$^3$ to 0.945 g/cm$^3$, the second ethylene interpolymer has a density from 0.930 g/cm$^3$ to 0.980 g/cm$^3$, and the third ethylene interpolymer has a density greater than that of the first and the second interpolymers.

In some embodiments, the first ethylene interpolymer has a density of 0.920 g/cm$^3$ to 0.945 g/cm$^3$, the second ethylene interpolymer has a density of 0.940 g/cm$^3$ to 0.970 g/cm$^3$, and the third ethylene interpolymer has a density greater than that of the first and the second interpolymers.

In some embodiments, the first ethylene interpolymer comprises a number-average molecular weight, $M_n$, of 50,000 to 200,000, the second ethylene interpolymer comprises a number-average molecular weight, $M_n$, from 5,000 to 15,000, and the third ethylene interpolymer comprises a number-average molecular weight, $M_n$, from 10,000 to 50,000.

In some embodiments, the first ethylene interpolymer has a weight average molecular weight, $M_w$, from 175,000 to 225,000, the second ethylene interpolymer has a weight average molecular weight, $M_w$, from 10,000 to 25,000, and the third ethylene interpolymer has a weight average molecular weight, $M_w$, from 30,000 to 70,000.

In some embodiments, the first ethylene interpolymer has a z-average molecular weight, $M_z$, from 150,000 to 500,000, the second ethylene interpolymer has a z-average molecular weight, $M_z$, from 15,000 to 45,000, and the third ethylene interpolymer has a z-average molecular weight, $M_z$, from 45,000 to 150,000.

In some embodiments, the first ethylene interpolymer has a z-average molecular weight, $M_z$, from 250,000 to 350,000, the second ethylene interpolymer has a z-average molecular weight, $M_z$, from 17,000 to 30,000, and the third ethylene interpolymer has a z-average molecular weight, $M_z$, from 50,000 to 100,000.

In some embodiments, the first ethylene interpolymer has a polydispersity ($M_w/M_n$) less than 3, the second ethylene interpolymer has a polydispersity ($M_w/M_n$) of at least 2, and the third ethylene interpolymer has a polydispersity ($M_w/M_n$) less than 3.

In some embodiments, the first ethylene interpolymer has a polydispersity ($M_w/M_n$) less than 3, the second ethylene interpolymer has a polydispersity ($M_w/M_n$) of greater than 2, and the third ethylene interpolymer has a polydispersity ($M_w/M_n$) less than 3.

In some embodiments, the polydispersity ($M_w/M_n$) of the first ethylene interpolymer is less than each of the polydispersity ($M_w/M_n$) of the second ethylene interpolymer and the polydispersity ($M_w/M_n$) of the third ethylene interpolymer.

In some embodiments, the first ethylene interpolymer has a melt index, $I_2$, less than 0.4 g/10 min, the second ethylene interpolymer has a melt index, $I_2$, from 1 g/10 min to 10,000 g/10 min, and the third ethylene interpolymer has a melt index, $I_2$, from 10 g/10 min to 10,000 g/10 min.

In some embodiments, the first ethylene interpolymer has a melt index, $I_2$, less than 0.4 g/10 min, the second ethylene interpolymer has a melt index, $I_2$, from 1 g/10 min to 7,000 g/10 min, and the third ethylene interpolymer has a melt index, $I_2$, from 100 g/10 to 10,000 g/10 min.

In some embodiments, the ethylene interpolymer composition is prepared by a process that includes melt blending a first interpolymer composition and a second interpolymer composition. The first interpolymer composition can be present in an amount from 5 wt. % to 80 wt. % of the ethylene interpolymer composition and the second interpolymer composition can be present in an amount from 20 wt. % to 95 wt. % of the ethylene interpolymer composition. In some embodiments, the first interpolymer composition can be present in an amount from 25 wt. % to 35 wt. % of the ethylene interpolymer composition and the second interpolymer composition can be present in an amount from 65 wt. % to 75 wt. % of the ethylene interpolymer composition.

In some embodiments, the first interpolymer composition has a density of at least 0.940 g/cm$^3$; a melt index, $I_2$, from 1.25 g/10 min to 2.5 g/10 min; and a molecular weight distribution ($M_w/M_n$) from 3.0 to 6.0.

In some embodiments, the first interpolymer composition has a density from 0.940 g/cm$^3$ to 0.949 g/cm$^3$. For example, the first interpolymer composition can have a density from 0.945 g/cm$^3$ to 0.946 g/cm$^3$.

In some embodiments, the first interpolymer composition has a melt index, $I_2$, from 1.25 g/10 min to 2.5 g/10 min. For example, the first interpolymer composition can have a melt index, $I_2$, from 1.5 g/10 min to 2.0 g/10 min.

In some embodiments, the first interpolymer composition has a melt index, $I_6$, from 2.0 g/10 min to 20.0 g/10 min. For example, the first interpolymer composition has a melt index, $I_6$, from 6.0 g/10 min to 9.0 g/10 min.

In some embodiments, the first interpolymer composition has a melt index, $I_{10}$, from 5.0 g/10 min to 25.0 g/10 min. For example, the first interpolymer composition can have a melt index, $I_{10}$, from 12.0 g/10 min to 18.0 g/10 min.

In some embodiments, the first interpolymer composition has a high load melt index, $I_{21}$, from 30.0 g/10 min to 100.0 g/10 min. For example, the first interpolymer composition can have a high load melt index, $I_{21}$, from 60.0 g/10 min to 70.0 g/10 min.

In some embodiments, the first interpolymer composition has a melt flow ratio ($I_{21}/I_2$) from 20 to 50. For example, the first interpolymer composition can have a melt flow ratio ($I_{21}/I_2$) from 30 to 40.

In some embodiments, the first interpolymer composition has a polydispersity index, $M_w/M_n$, from 2.0 to 9.0. For example, the first interpolymer composition can have a polydispersity index, $M_w/M_n$, from 4.25 to 4.75.

In some embodiments, the first interpolymer composition has a number average molecular weight, $M_n$, of less than 40,000. In some embodiments, the first interpolymer composition has a number average molecular weight, $M_n$, from 10,000 to 40,000. For example, the first interpolymer composition can have a number average molecular weight, $M_n$, from 17,000 to 23,000.

In some embodiments, the first interpolymer composition has a weight average molecular weight, $M_w$, from 60,000 to 120,000. For example, the first interpolymer composition can have a weight average molecular weight, $M_w$, from 90,000 to 96,000.

In some embodiments, the first interpolymer composition has a Z-average molecular weight, $M_z$, 150,000 to 350,000. For example, the first interpolymer composition can have a Z-average molecular weight, $M_z$, 255,000 to 275,000.

In some embodiments, the first interpolymer composition has a stress exponent of less than 1.5. For example, the first interpolymer composition can have a stress exponent from 1.2 to 1.45.

In some embodiments, the first interpolymer composition has a comonomer content from 0.01 mol. % to 1.0 mol. % as measured by FTIR. For example, the first interpolymer composition can have a comonomer content from 0.4 mol. % to 0.6 mol. % as measured by FTIR.

In some embodiments, the first interpolymer composition has a comonomer content from 1.6 wt. % to 2.6 wt. % as measured by FTIR. For example, the first interpolymer composition can have a comonomer content from 1.9 wt. % to 2.3 wt. % as measured by FTIR.

In some embodiments, the comonomer includes a comonomer chosen from 1-butene, 1-hexene, 1-octene, or a combination thereof. In some embodiments, the comonomer is 1-octene.

In some embodiments, the first interpolymer composition has a hexane extractables level below 0.55 wt. %. For example, the first interpolymer composition can have a hexane extractables level below 0.30 wt. %.

In some embodiments, the first interpolymer composition has a primary melting peak from 126° C. to 129° C., as determined by differential scanning calorimetry.

In some embodiments, the first interpolymer composition has a heat of fusion from 175 J/g to 210 J/g, as determined by differential scanning calorimetry. For example, the first interpolymer composition has a heat of fusion from 188 J/g to 198 J/g, as determined by differential scanning calorimetry.

In some embodiments, the first interpolymer composition has a molecular weight distribution, $M_w/M_n$, from 2.0 to 9.0; a density from 0.940 g/cm$^3$ to 0.949 g/cm$^3$; a melt index $I_2$, of from 1.25 g/10 min to 2.5 g/10 min; a comonomer content of less than 0.01 mol. % as determined by $^{13}$C NMR; an $M_z$ of less than 275,000; a stress exponent of less than 1.50.

In some embodiments, the first interpolymer composition is bimodal.

In some embodiments, the first interpolymer composition includes a first ethylene interpolymer and a second ethylene interpolymer.

In some embodiments, the first interpolymer composition includes 20 wt. % to 50 wt. % of the first ethylene interpolymer and 50 wt. % to 80 wt. % of the second ethylene interpolymer. In some embodiments, the first interpolymer composition includes 30 wt. % to 40 wt. % of the first ethylene interpolymer and 60 wt. % to 70 wt. % of the second ethylene interpolymer.

In some embodiments, the first ethylene interpolymer of the first interpolymer composition has a $M_w$ of at least 120,000. For example, the first ethylene interpolymer of the first interpolymer composition can have a $M_w$ from 140,000 to 300,000. In some embodiments, the first ethylene interpolymer of the first interpolymer composition has a $M_w$ from 160,000 to 240,000.

In some embodiments, the first ethylene interpolymer of the first interpolymer composition has a density from 0.918 g/cm$^3$ to 0.934 g/cm$^3$. For example, the first ethylene interpolymer of the first interpolymer composition can have a density from 0.920 g/cm$^3$ to 0.932 g/cm$^3$. In some embodiments, the first ethylene interpolymer of the first interpolymer composition has a density from 0.922 g/cm$^3$ to 0.932 g/cm$^3$.

In some embodiments, the first ethylene interpolymer of the first interpolymer composition has a degree of short chain branching per 1,000 carbons from 1.5 to 5. In some embodiments, the first ethylene interpolymer of the first interpolymer composition has a degree of short chain branching per 1,000 carbons from 1.8 to 5. In some embodiments, the first ethylene interpolymer of the first interpolymer composition has a degree of short chain branching per 1,000 carbons from 1.8 to 4.

In some embodiments, the second ethylene interpolymer of the first interpolymer composition has a $M_w$ of less than 100,000.

In some embodiments, the second ethylene interpolymer of the first interpolymer composition has a $M_w$ from 20,000 to 80,000. For example, the second ethylene interpolymer of the first interpolymer composition can have a $M_w$ from 25,000 to 50,000.

In some embodiments, the second ethylene interpolymer of the first interpolymer composition has a density of at least 0.942 g/cm$^3$. For example, the second ethylene interpolymer of the first interpolymer composition can have a density from 0.945 g/cm$^3$ to 0.946 g/cm$^3$. In some embodiments, the second ethylene interpolymer of the first interpolymer composition has a density from 0.950 g/cm$^3$ to 0.958 g/cm$^3$.

In some embodiments, the difference in the density between the first ethylene interpolymer of the first interpolymer composition and the density of the second ethylene interpolymer of the first interpolymer composition is less than 0.030 g/cm$^3$. In some embodiments, the difference in the density between the first ethylene interpolymer of the first interpolymer composition and the density of the second ethylene interpolymer of the first interpolymer composition is less than 0.025 g/cm$^3$ to 0.029 g/cm$^3$.

In some embodiments, the second ethylene interpolymer of the first interpolymer composition has a degree of short chain branching per 1,000 carbons from 0.50 to 0.95. In some embodiments, the second ethylene interpolymer of the first interpolymer composition has a degree of short chain branching per 1,000 carbons from 0.50 to 0.90.

In some embodiments, the second interpolymer composition has a density of at least 0.949 g/cm$^3$; a melt index, $I_2$, from 0.4 to 5.0 g/10 min; and a molecular weight distribution, $M_w/M_n$, from 3.0 to 11.0.

In some embodiments, the second interpolymer composition has a density from 0.949 g/cm$^3$ to 0.960 g/cm$^3$. For example, the second interpolymer composition can have a density from 0.952 g/cm$^3$ to 0.955 g/cm$^3$.

In some embodiments, the second interpolymer composition has a melt index, $I_2$, from 0.5 g/10 min to 3.0 g/10 min. For example, the second interpolymer composition can have a melt index, $I_2$, from 1.0 g/10 min to 1.2 g/10 min.

In some embodiments, the second interpolymer composition has a melt index, $I_5$, of at least 1.0 g/min.

In some embodiments, the second interpolymer composition has a melt index, $I_6$, from 1 g/10 min to 10 g/10 min. For example, the second interpolymer composition has a melt index, $I_6$, from 3 g/10 min to 7 g/10 min.

In some embodiments, the second interpolymer composition has a melt index, $I_{10}$, from 5 g/10 min to 15 g/10 min. For example, the second interpolymer composition can have a melt index, $I_{10}$, from 8 g/10 min to 12 g/10 min.

In some embodiments, the second interpolymer composition has a high load melt index, $I_{21}$, of at least 25 g/10 min. In some embodiments, wherein the second interpolymer composition has a high load melt index, $I_{21}$, from 25 g/10 min to 100 g/10 min. For example, the second interpolymer composition can have a high load melt index, $I_{21}$, from 60 g/10 min to 70 g/10 min.

In some embodiments, the second interpolymer composition has a melt flow ratio ($I_{21}/I_2$) of greater than 40. For example, the second interpolymer composition can have a melt flow ratio ($I_{21}/I_2$) from 45 to 90. In some embodiments, the second interpolymer composition has a melt flow ratio ($I_{21}/I_2$) from 50 to 70.

In some embodiments, the second interpolymer composition has a molecular weight distribution, $M_w/M_n$, from 5.0 to 9.0. For example, the second interpolymer composition can have a molecular weight distribution, $M_w/M_n$, from 7.0 to 8.0.

In some embodiments, the second interpolymer composition has a number average molecular weight, $M_n$, of less than 30,000. For example, the second interpolymer composition can have a number average molecular weight, $M_n$, from 10,000 to 20,000. In some embodiments, the second interpolymer composition has a number average molecular weight, $M_n$, from 11,000 to 15,000.

In some embodiments, the second interpolymer composition has a weight average molecular weight, $M_w$, from 50,000 to 150,000. For example, the second interpolymer composition can have a weight average molecular weight, $M_w$, from 80,000 to 120,000.

In some embodiments, the second interpolymer composition has a Z-average molecular weight, $M_z$, of less than 400,000. For example, the second interpolymer composition can have a Z-average molecular weight, $M_z$, of less than 350,000. In some embodiments, the second interpolymer composition has a Z-average molecular weight, $M_z$, 200,000 to 300,000.

In some embodiments, the second interpolymer composition has a stress exponent of less than 1.50. For example, the second interpolymer composition can have a stress exponent from 1.2 to 1.45.

In some embodiments, the second interpolymer composition has a comonomer content from 0.01 mol. % to 0.75 mol. %, as measured by FTIR. For example, the second interpolymer composition can have a comonomer content from 0.3 mol. % to 0.5 mol. %, as measured by FTIR.

In some embodiments, the second interpolymer composition has a comonomer content from 0.5 wt. % to 5 wt. %, as measured by FTIR. For example, the second interpolymer composition can have a comonomer content from 1.3 wt. % to 2.2 wt. %, as measured by FTIR.

In some embodiments, the second interpolymer composition has a hexane extractables level below 0.55 wt. %. For example, the second interpolymer composition can have a hexane extractables level below 0.40 wt. %.

In some embodiments, the second interpolymer composition has an ESCR Condition B (10% IGEPAL) of at least 20 hours.

In some embodiments, the second interpolymer composition has a molecular weight distribution, $M_w/M_n$, from 4.0 to 10.0; a density from 0.949 to 0.957 g/cm$^3$; a melt index $I_2$, from 0.4 to 5.0 g/10 min; a comonomer content of less than 0.75 mol % as determined by $^{13}$C NMR; an $M_z$ of less than 400,000; a stress exponent of less than 1.50; and an ESCR Condition B (10% IGEPAL) of at least 20 hrs.

In some embodiments, the second interpolymer composition includes a first ethylene interpolymer and a second ethylene interpolymer.

In some embodiments, the second interpolymer composition includes 10 wt. % to 70 wt. % of a first ethylene interpolymer having a melt index, $I_2$, of less than 0.4 g/10 min, a molecular weight distribution, $M_w/M_n$, of less than 3.0, and a density of from 0.920 to 0.955 g/cm$^3$; and 30 wt. % to 90 wt. % of a second ethylene interpolymer having a melt index, $I_2$, from 100 to 10,000 g/10 min, a molecular weight distribution, $M_w/M_n$, of less than 3.0, and a density higher than the density of the first ethylene interpolymer, but less than 0.967 g/cm$^3$; wherein the density of the second ethylene interpolymer is less than 0.037 g/cm$^3$ higher than the density of the first ethylene interpolymer; the ratio of short chain branching in the first ethylene interpolymer (SCB1) to the short chain branching in the second ethylene interpolymer (SCB2) is greater than 0.

In some embodiments, the second interpolymer composition includes 30 wt. % to 60 wt. % of a first ethylene interpolymer having a melt index, $I_2$, of less than 0.4 g/10 min, a molecular weight distribution, $M_w/M_n$, of less than 2.7, and a density of from 0.925 to 0.950 g/cm$^3$, and 40 wt. % to 70 wt. % of a second ethylene interpolymer having a melt index $I_2$, of from 100 to 10,000 g/10 min, a molecular weight distribution, $M_w/M_n$, of less than 2.7, and a density higher than the density of the first ethylene interpolymer, but less than 0.966 g/cm$^3$.

In some embodiments, the first ethylene interpolymer of the second interpolymer composition comprises an alpha-olefin.

In some embodiments, the alpha-olefin is present in an amount from 0.05 mol. % to 3.0 mol. % of the first ethylene interpolymer.

In some embodiments, the alpha-olefin is chosen from 1-butene, 1-hexene, 1-octene, or a combination thereof.

In some embodiments, the alpha-olefin is 1-octene.

In some embodiments, the short chain branching of the first ethylene interpolymer of the second interpolymer composition is from 0.25 to 15 short chain branches per thousand carbon atoms (SCB1/1000 Cs).

In some embodiments, the comonomer content of the first ethylene interpolymer of the second interpolymer composition is within ±0.05 mol. % of the comonomer content of the second ethylene interpolymer.

In some embodiments, the mol. % of comonomer of the first ethylene interpolymer of the second interpolymer composition is greater than the mol. % of comonomer in the second ethylene interpolymer.

In some embodiments, the short chain branching of the first ethylene interpolymer of the second interpolymer composition is within ±0.25 SCB/1000 Cs of the short chain branching in the second ethylene interpolymer.

In some embodiments, the melt index of the first ethylene interpolymer of the second interpolymer composition is from 0.01 g/10 min to 0.4 g/10 min.

In some embodiments, the weight average molecular weight, $M_w$, of the first ethylene interpolymer of the second interpolymer composition is from 110,000 to 225,000.

In some embodiments, the density of the first ethylene interpolymer of the second interpolymer composition is from 0.925 g/cm$^3$ to 0.955 g/cm$^3$.

In some embodiments, the first ethylene interpolymer of the second interpolymer composition has a molecular weight distribution of ≤2.7.

In some embodiments, the first ethylene interpolymer of the second interpolymer composition is a homogeneously branched ethylene interpolymer having a weight average molecular weight, $M_w$, of at least 110,000; a molecular weight distribution, $M_w/M_n$, of less than 2.7 and a density of from 0.925 to 0.948 g/cm$^3$.

In some embodiments, the first ethylene interpolymer of the second interpolymer composition is homogeneously branched ethylene interpolymer and has a CDBI of greater than 50%.

In some embodiments, the second ethylene interpolymer of the second interpolymer composition has a weight average molecular weight, $M_w$, of less than 45,000.

In some embodiments, the second ethylene interpolymer of the second interpolymer composition is a homogeneously branched interpolymer.

In some embodiments, the second ethylene interpolymer of the second interpolymer composition is made with a single site catalyst.

In some embodiments, the second ethylene interpolymer of the second interpolymer composition is made with a phosphinimine catalyst.

In some embodiments, the comonomer of the second ethylene interpolymer of the second interpolymer composition comprises an alpha-olefin. The alpha-olefin can include an alpha-olefin chosen from 1-butene, 1-hexene, 1-octene, or combinations thereof. In some embodiments, the alpha-olefin is 1-octene.

In some embodiments, the short chain branching in the second ethylene interpolymer of the second interpolymer composition is from 0.25 to 15 short chain branches per thousand carbon atoms (SCB2/1000 Cs).

In some embodiments, the comonomer content in the second ethylene interpolymer of the second interpolymer composition is within ±0.05 mol. % of the comonomer content of the first ethylene interpolymer of the second interpolymer composition.

In some embodiments, the mol. % of comonomer in the second ethylene interpolymer of the second interpolymer composition is less than the comonomer content of the first ethylene interpolymer of the second interpolymer composition.

In some embodiments, the amount of short chain branching in the second ethylene interpolymer of the second interpolymer composition is within ±0.25 SCB/1000 C of the amount of short chain branching in the first ethylene interpolymer of the second interpolymer composition.

In some embodiments, the amount of short chain branching in the second ethylene interpolymer of the second interpolymer composition is less than the amount of short chain branching in the first ethylene interpolymer of the second interpolymer composition.

In some embodiments, the second ethylene interpolymer of the second interpolymer composition has a density of less than 0.966 $g/cm^3$. In some embodiments, the second ethylene interpolymer of the second interpolymer composition has a density from 0.952 $g/cm^3$ to 0.966 $g/cm^3$.

In some embodiments, the second ethylene interpolymer of the second interpolymer composition a has molecular weight distribution, $M_w/M_n$, of ≤2.7.

In some embodiments, the second ethylene interpolymer of the second interpolymer composition a has a melt index, $I_2$, from 1,000 g/10 min to 7,000 g/10 min.

In some embodiments, the second ethylene interpolymer of the second interpolymer composition is a homogeneous ethylene interpolymer having a weight average molecular weight, $M_w$, of ≤45,000; a molecular weight distribution, $M_w/M_n$, of less than 2.7 and a density higher than the density of the first ethylene interpolymer in the second interpolymer composition, but less than 0.967 $g/cm^3$.

In some embodiments, the second ethylene interpolymer comprises from 40 wt. % to 80 wt. % of the second interpolymer composition.

BRIEF DESCRIPTION OF THE DRAWINGS

The interpolymer products and rotomolded articles described herein may be better understood by considering the following description in conjunction with the accompanying drawings; it being understood that this disclosure is not limited to the accompanying drawings.

DESCRIPTION OF EMBODIMENTS

Figure 1A:
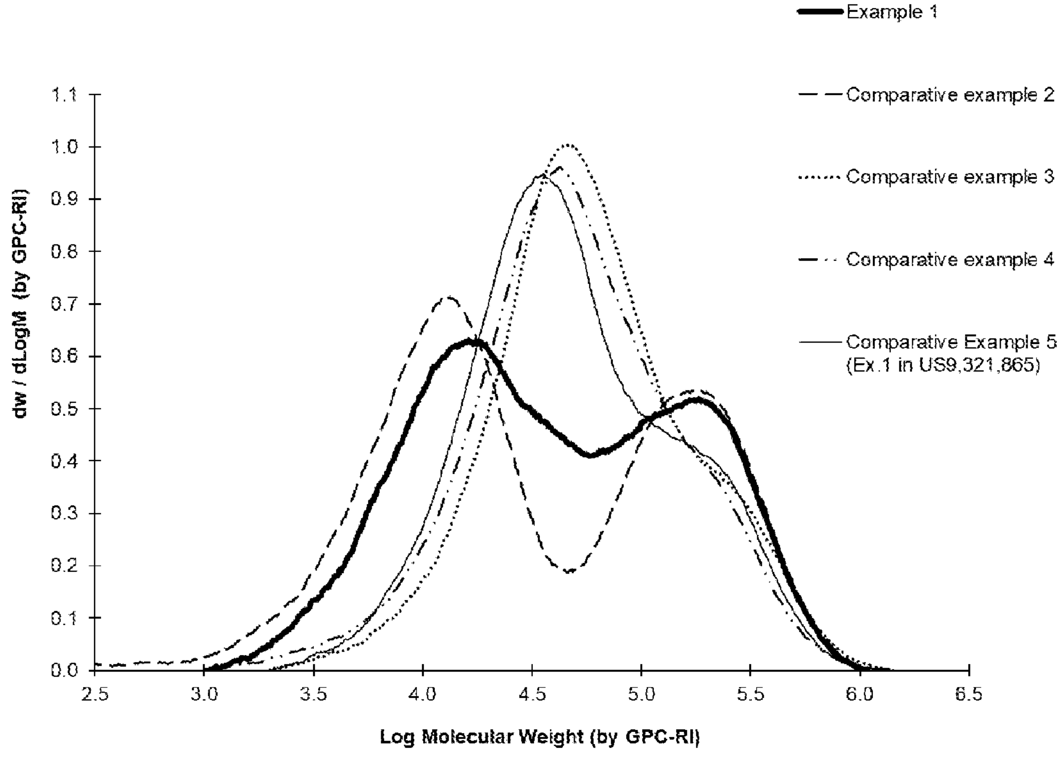
FIGS. 1A and 1B illustrate the molecular weight distribution obtained by GPC measurements of an ethylene interpolymer polymer according to the present disclosure (Example 1) and comparative examples.

As used herein, the term "R1" and its superscript form "$^{R1}$" refers to a first reactor in a continuous solution polymerization process; it being understood that R1 is distinctly different from the symbol $R^1$, which may be used in chemical formula to represent a hydrocarbyl group. Similarly, the term "R2" and it's superscript form "$^{R2}$" refers to a second reactor, the term "R3" and its superscript form "$^{R3}$" refers to a third reactor, the term "R4" and its superscript form "$^{R4}$" refers to a fourth reactor, and the term "R5" and its superscript form "$^{R5}$" refers to a fifth reactor.

Ethylene Interpolymer Composition

Provided in this disclosure is an ethylene interpolymer composition. The ethylene interpolymer composition includes a first ethylene interpolymer, a second ethylene interpolymer, and a third ethylene interpolymer. Further, the ethylene interpolymer composition has a density of at least 0.945 $g/cm^3$; an environmental stress crack resistance (ESCR), measured according to ASTM D1693, Condition B, 10% IGEPAL CO-360, of at least 90 hours; and an Izod impact strength of at least 80 J/m, as measured according to ASTM D256.

As used herein, the term "ethylene interpolymer" refers to a subset of ethylene polymers that excludes ethylene polymers produced in high pressure polymerization processes, such as LDPE and EVA, for example.

As used herein, the term "ethylene polymer" refers to macromolecules produced from ethylene monomers and, optionally, one or more additional monomers, and regardless of the specific catalyst or specific process used to make the ethylene polymer. Common ethylene polymers include high density polyethylene (HDPE), medium density polyethylene (MDPE), linear low density polyethylene (LLDPE), very low density polyethylene (VLDPE), ultralow density polyethylene (ULDPE), plastomer and elastomers. Ethylene polymers include polymers produced in a high pressure polymerization processes, such as low density polyethylene (LDPE), ethylene vinyl acetate copolymers (EVA), ethylene alkyl acrylate copolymers, ethylene acrylic acid copolymers and metal salts of ethylene acrylic acid (commonly referred to as ionomers). Ethylene polymers also include block copolymers that include 2-4 comonomers. Ethylene polymers includes combinations of, or blends of, the ethylene polymers described herein.

In some embodiments, the density of the ethylene interpolymer composition is from 0.945 $g/cm^3$ to 0.957 $g/cm^3$. In some embodiments, the density of the ethylene interpolymer composition is from 0.945 $g/cm^3$ to 0.949 $g/cm^3$, 0.949 $g/cm^3$ to 0.953 $g/cm^3$, or from 0.953 $g/cm^3$ to 0.957 $g/cm^3$.

The ethylene interpolymer composition can have a melt index, $I_2$, of at least 0.5 g/10 min.

The melt index, $I_2$, of the ethylene interpolymer composition can be measured according to ASTM D1238 (when conducted at 190° C., using a 2.16 kg weight).

In some embodiments, the ethylene interpolymer composition has a melt index, $I_2$, from 0.5 g/min to 10.0 g/10 min. For example, the ethylene interpolymer composition can have a melt index, $I_2$, from 0.5 g/min to 5.0 g/min, 1.0 g/min to 3.0 g/min, or from 1.5 g/min to 2.5 g/min.

The ethylene interpolymer composition can have a melt flow ratio ($I_{21}/I_2$) of at least 30. In some embodiments, the ethylene interpolymer composition has a melt flow ratio (121/12) from 30 to 100. For example, the ethylene interpolymer composition can have a melt flow ratio ($I_{21}/I_2$) from 30 to 65, from 35 to 55, or from 40 to 50.

The ethylene interpolymer composition can have a number average molecular weight, $M_n$, from 10,000 to 40,000. For example, the ethylene interpolymer composition can have a number average molecular weight, $M_n$, from 1,000 to 30,000, 12,000 to 25,000, or from 14,000 to 20,000.

The number-average molecular weight, $M_n$, of the ethylene interpolymer composition can be determined from gel permeation chromatography (GPC).

The ethylene interpolymer composition can have a weight-average molecular weight, $M_w$, from 40,000 to 150,000. For example, the ethylene interpolymer composition can have a weight-average molecular weight, $M_w$, from 65,000 to 125,000, from 80,000 to 110,000, or from 90,000 to 100,000.

The weight-average molecular weight, $M_w$, of the ethylene interpolymer composition can be determined from GPC.

The ethylene interpolymer composition can have a z-average molecular weight, $M_z$, from 200,000 to 800,000. For example, the ethylene interpolymer composition can have a z-average molecular weight, $M_z$, from 200,000 to 400,000, 220,000 to 300,000, or from 240,000 to 260,000.

The z-average molecular weight, $M_z$, of the ethylene interpolymer composition can be determined from GPC.

In some embodiments, the ethylene interpolymer composition has a polydispersity index ($M_w/M_n$) from 3 to 11. For example, the ethylene interpolymer composition can have a polydispersity index ($M_w/M_n$) from 4 to 8 or from 5 to 6.

In some embodiments, the ethylene interpolymer composition has an ESCR from 90 hours to 500 hours, as measured according to ASTM D1693, Condition B, 10% IGEPAL CO-360. For example, the ethylene interpolymer composition can have an ESCR from 120 hours to 500 hours or from 120 hours to 300 hours, as measured according to ASTM D1693, Condition B, 10% IGEPAL CO-360. In some embodiments, the ethylene interpolymer composition has an ESCR from 130 hours to 160 hours, as measured according to ASTM D1693, Condition B, 10% IGEPAL CO-360.

In some embodiments, the ethylene interpolymer composition has an ESCR from 90 hours to 500 hours, as measured according to ASTM D1693, Condition A, 10% IGEPAL CO-360. For example, the ethylene interpolymer composition can have an ESCR from 120 hours to 500 hours or from 120 hours to 300 hours, as measured according to ASTM D1693, Condition A, 10% IGEPAL CO-360. In some embodiments, the ethylene interpolymer composition has an ESCR from 135 hours to 165 hours, as measured according to ASTM D1693, Condition B, 10% IGEPAL CO-360.

In some embodiments, the ethylene interpolymer composition has an ESCR of greater than 1,000 hours, as measured according to ASTM D1693, Condition A, 100% IGEPAL CO-360.

In some embodiments, the ethylene interpolymer composition has an ESCR of greater than 1,000 hours, as measured according to ASTM D1693, Condition B, 100% IGEPAL CO-360.

The ethylene interpolymer composition can have an Izod impact strength from 80 J/m to 535 J/m, as measured according to ASTM D256. For example, the ethylene interpolymer composition can have an Izod impact strength from 80 J/m to 160 J/m, as measured according to ASTM D256.

In some embodiments, the ethylene interpolymer composition has a tensile impact, as measured according to ASTM D1822, of at least 315 $kJ/m^2$. For example, the ethylene interpolymer composition can have a tensile impact from 315 $kJ/m^2$ to 735 $kJ/m^2$. In some embodiments, the ethylene interpolymer composition has a tensile impact from 200 $ft \cdot lb/in^2$ to 250 $ft \cdot lb/in^2$.

In some embodiments, the ethylene interpolymer composition has a flex modulus (1% secant), as measured according to ASTM D790, of at least 1,000 MPa. For example, the ethylene interpolymer composition can have a flex modulus (1% secant) from 1,000 MPa to 1,400 MPa or from 1,000 MPa to 1,200 MPa.

In some embodiments, the ethylene interpolymer composition has a Dilution Index, Yd, greater than −1.0. In some embodiments, the ethylene interpolymer composition has a Dilution Index, Yd, less than 0.

In some embodiments, the ethylene interpolymer composition has a primary structure parameter (PSP2) from 2 to 8.9. For example, the ethylene interpolymer composition can have a PSP2 from 4-7 or a PSP2 from 5-6.

In some embodiments, the ethylene interpolymer composition has a total vinyl unsaturation from 0.01 to 1.0 vinyl groups per 1,000 carbon atoms. For example, the ethylene interpolymer composition can have a total vinyl unsaturation of at least 0.03 vinyl groups per 1,000 carbon atoms.

In some embodiments, the ethylene interpolymer composition has no long chain branching.0

In some embodiments, the ethylene interpolymer composition has a CDBI50 of greater than 60%. For example, the ethylene interpolymer composition can have a CDBI50 from 60% to 85%.

In some embodiments, at least one of the first ethylene interpolymer, the second ethylene interpolymer, or the third ethylene interpolymer of the ethylene interpolymer composition includes an α-olefin chosen from butene, pentene, hexene, heptene, octene, nonene, decene, or a combination thereof. In some embodiments, at least one of the first ethylene interpolymer, the second ethylene interpolymer, or the third ethylene interpolymer of the ethylene interpolymer composition includes an α-olefin chosen from hexene, octene, or a combination thereof. In some embodiments, at least one of the first ethylene interpolymer, the second ethylene interpolymer, or the third ethylene interpolymer of the ethylene interpolymer composition includes 1-octene.

In some embodiments, at least one of the first ethylene interpolymer, the second ethylene interpolymer, or the third ethylene interpolymer of the ethylene interpolymer composition includes an α-olefin and the α-olefin is present in an amount from 0.05 mol. % to 5 mol. % of the ethylene interpolymer composition. In some embodiments, at least one of the first ethylene interpolymer, the second ethylene interpolymer, or the third ethylene interpolymer of the ethylene interpolymer composition includes an α-olefin and the α-olefin is present in an amount from 1.0 mol. % to 4.0 mol. % or from 1.5 mol. % to 3.0 mol. % of the ethylene interpolymer composition. In some embodiments, at least one of the first ethylene interpolymer, the second ethylene interpolymer, or the third ethylene interpolymer of the ethylene interpolymer composition includes an α-olefin and the α-olefin is present in an amount from 1.8 mol. % to 2.8 mol. % of the ethylene interpolymer composition.

In some embodiments, at least one of the first ethylene interpolymer, the second ethylene interpolymer, or the third ethylene interpolymer of the ethylene interpolymer composition includes 1-octene and the 1-octene is present in an amount from 0.05 mol. % to 5 mol. % of the ethylene interpolymer composition. In some embodiments, at least one of the first ethylene interpolymer, the second ethylene interpolymer, or the third ethylene interpolymer of the ethylene interpolymer composition includes 1-octene and the 1-octene is present in an amount from 1.0 mol. % to 4.0 mol. % or from 1.5 mol. % to 3.0 mol. % of the ethylene interpolymer composition. In some embodiments, at least one of the first ethylene interpolymer, the second ethylene interpolymer, or the third ethylene interpolymer of the ethylene interpolymer composition includes 1-octene and the 1-octene is present in an amount from 1.8 mol. % to 2.8 mol. % of the ethylene interpolymer composition.

In some embodiments, the ethylene interpolymer composition has a bimodal profile in a gel permeation chromatograph. For example, the ethylene interpolymer composition can have a bimodal profile in a gel permeation chromatograph generated according to the method of ASTM D6474-99.

As used herein, the "modality" of an interpolymer composition refers to the form of its molecular weight distribution curve, i.e., the appearance of the graph of the polymer weight fraction (w) as a function of its molecular weight (M). The polymer weight fraction refers to the weight fraction of molecules of a given size. The molecular weight distribution curve of an interpolymer composition can be generated according to the method of ASTM D6474-99. As used herein, an interpolymer composition having a molecular weight distribution curve showing a single peak is referred to as "unimodal," an interpolymer composition having a curve showing two distinct peaks is referred to as "bimodal," a polymer having a curve showing three distinct peaks is referred to as "trimodal." An interpolymer composition having a plurality of molecular weight peaks (e.g., 2 or more molecular weight peaks) is considered to be multimodal.

In some embodiments, the ethylene interpolymer composition has a bimodal profile in a gel permeation chromatograph generated according to the method of ASTM D6474-99, wherein the difference between the low molecular weight peak intensity (dw/d Log M) and the valley (dw/d Log M) is less than 0.5 and the difference between the high molecular weight peak intensity (dw/d Log M) and the valley (dw/d Log M) is less than 0.5. For example, the ethylene interpolymer composition can have a bimodal profile in a gel permeation chromatograph generated according to the method of ASTM D6474-99 wherein the difference between the low molecular weight peak intensity (dw/d Log M) and the valley (dw/d Log M) is less than 0.3 and the difference between the high molecular weight peak intensity (dw/d Log M) and the valley (dw/d Log M) is less than 0.3.

In some embodiments, the ethylene interpolymer composition includes catalyst residues. The catalyst residues in the ethylene interpolymer composition can reflect the chemical compositions of the catalyst formulation employed in each reactor during production. In some embodiments, the ethylene interpolymer composition includes at least one catalyst residue chosen from titanium, aluminum, magnesium, and chlorine. In some embodiments, the ethylene interpolymer composition includes from 0.100 parts per million (ppm) to 1.000 ppm titanium. For example, the ethylene interpolymer composition can include from 0.100 ppm to 0.700 ppm titanium, 0.150 ppm to 0.500 ppm titanium, or from 0.200 ppm to 0.400 ppm titanium. In some embodiments, the ethylene interpolymer composition includes from 1.00 ppm aluminum to 10.00 ppm aluminum. For example, the ethylene interpolymer composition can include from 3.00 ppm aluminum to 8.00 ppm aluminum or from 5.00 ppm aluminum to 6.00 ppm aluminum. In some embodiments, the ethylene interpolymer composition includes less than 2.0 ppm magnesium. In some embodiments, the ethylene interpolymer composition includes from 0.100 ppm chlorine to 1.000 ppm chlorine. For example, the ethylene interpolymer composition can include from 0.150 to 0.800 ppm chlorine or from 0.300 ppm to 0.600 ppm chlorine.

Neutron Activation Analysis, hereafter NAA, can be used to determine catalyst residues in ethylene interpolymer compositions. For example, a radiation vial (composed of ultrapure polyethylene, 7 mL internal volume) can be filled with an ethylene interpolymer composition sample and the sample weight is recorded. Using a pneumatic transfer system the sample can then be placed inside a SLOWPOKE™ nuclear reactor (Atomic Energy of Canada Limited, Ottawa, Ontario, Canada) and irradiated for 30 to 600 seconds for short half-life elements (e.g., Ti, V, Al, Mg, and Cl) or 3 to 5 hours for long half-life elements (e.g. Zr, Hf, Cr, Fe and Ni). The average thermal neutron flux within the reactor can be $5\times10^{11}/cm^2/s$. After irradiation, the samples are withdrawn from the reactor and aged, allowing the radioactivity to decay; short half-life elements can be aged for 300 seconds or long half-life elements can be aged for several days. After aging, the gamma-ray spectrum of the sample can be recorded using a germanium semiconductor gamma-ray detector (Ortec model GEM55185, Advanced Measurement Technology Inc., Oak Ridge, Tenn., USA) and a multichannel analyzer (Ortec model DSPEC Pro). The amount of each element in the sample can then be calculated from the gamma-ray spectrum and recorded in parts per million, relative to the total weight of the ethylene interpolymer sample. The NAA system can be calibrated with Specpure standards (1,000 ppm solutions of the desired element (greater than 99% pure)). One mL of solutions (elements of interest) can be pipetted onto a 15 mm×800 mm rectangular paper filter and air dried. The filter paper can then placed in a 1.4 mL polyethylene irradiation vial and analyzed by the NAA system. Standards can be used to determine the sensitivity of the NAA procedure (in counts/μg).

In some embodiments, the ethylene interpolymer composition has a density from 0.945 $g/cm^3$ to 0.957 $g/cm^3$, a melt index from 0.5 g/min to 10 g/10 min, and a polydispersity index from 3 to 11.

In some embodiments, the ethylene interpolymer composition has a density from 0.949 $g/cm^3$ to 0.953 $g/cm^3$, a melt index from 1.5 g/min to 2.5 g/min, and a polydispersity index from 5 to 6.

In some embodiments, the ethylene interpolymer composition has a density from 0.945 $g/cm^3$ to 0.957 $g/cm^3$, a melt index from 0.5 g/min to 10 g/10 min, a polydispersity index from 3 to 11, an ESCR from 90 hours to 500 hours, as measured according to ASTM D1693, Condition B, 10% IGEPAL CO-360, and an Izod impact strength from 1.5 $ft\cdot lb/in^2$ to 10 $ft\cdot lb/in^2$, as measured according to ASTM D256.

In some embodiments, the ethylene interpolymer composition has a density from 0.949 $g/cm^3$ to 0.953 $g/cm^3$, a melt index from 1.5 g/min to 2.5 g/min, and a polydispersity index from 5 to 6, an ESCR from 130 hours to 160 hours, as measured according to ASTM D1693, Condition B, 10% IGEPAL CO-360, and an Izod impact strength from 1.5 $ft\cdot lb/in^2$ to 3 $ft\cdot lb/in^2$, as measured according to ASTM D256.

In some embodiments, the ethylene interpolymer composition includes one or more additives.

In some embodiments, the one or more additives can be present in the ethylene interpolymer composition an amount of up to 20 wt. %.

In some embodiments, the ethylene interpolymer composition includes an additive chosen from an antioxidant, an acid scavenger, an antiblock additive, a slip additive (e.g., erucimide), a colorant, a filler, a polymer processing aid, a UV additive, a stabilizer, and combinations thereof.

In some embodiments, the UV additive includes a hindered amine light stabilizer (HAL). In some embodiments, the UV additive includes a hindered amine light stabilizer chosen from TINUVIN® 494, TINUVIN 622 (butanedioic acid, dimethylester, polymer with 4-hydroxy-2,2,6,6-tetramethyl-1-piperidine ethanol; CAS number 65447-77-0), TINUVIN 111, CHIMASSORB® 119 (CAS number 106990-43-6), CHIMASSORB 944 (poly[[6-[(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino]]; CAS number 70624-18-9), CHIMASSORB 2020, (1,6-Hexanediamine, N,N'-bis(2,2,6,6-tetramethyl-4-piperidinyl)-polymer with 2,4,6-trichloro-1,3,5-triazine, reaction products with N-butyl-1-butanamine and N-butyl-2,2,6,6-tetramethyl-4-piperidinamine; CAS number 192268-64-7, and combinations thereof. For example, the ethylene interpolymer composition can include CHIMASSORB 944 FDL and TINUVIN 622.

In some embodiments, the additive includes a zinc oxide. For example, the additive can include ZOCO 102 (CAS number 1314-13-2).

In some embodiments, the additive includes a phosphite stabilizer.

In some embodiments, the phosphite stabilizer includes a monophosphite stabilizer. For example, the phosphite stabilizer can include a monophosphite stabilizer chosen from triphenyl phosphite, tris(2,4-di-tert-butylphenyl) phosphite (CAS number 31570-04-4; e.g., IRGAFOS® 168, available from BASF), bis(2,4-di-tert-butyl-6-methylphenyl) ethyl phosphite (CAS number 145650-60-8; e.g., IRGAFOS 38, available from BASF), 2,2',2"-nitrilo[triethyltris(3,3'5,5'-tetra-tert-butyl-1,1'-biphenyl-2,2-'-diyl) phosphite (CAS number 80410-33-9; e.g., IRGAFOS 12, available from BASF), and combinations thereof. In some embodiments, the ethylene interpolymer composition includes tris(2,4-di-tert-butylphenyl) phosphite (CAS number 31570-04-4; e.g., IRGAFOS 168).

In some embodiments, the phosphite stabilizer includes a diphosphite stabilizer. For example, the phosphite stabilizer can include a diphosphite stabilizer chosen from distearyl pentaerythritol diphosphite, diisodecyl pentaerythritol diphosphite, bis(2,4 di-tert-butylphenyl) pentaerythritol diphosphite (e.g., ULTRANOX® 626, by Chemtura Corporation), bis(2,6-di-tert-butyl-4-methylpenyl) pentaerythritol diphosphite, bisisodecyloxy-pentaerythritol diphosphite, bis (2,4-di-tert-butyl-6-methylphenyl) pentaerythritol diphosphite, bis(2,4,6-tri-tert-butylphenyl) pentaerythritol diphosphite, bis(2,4-dicumylphenyl)pentaerythritol diphosphite (CAS number 154862-43-8; e.g., DOVERPHOS® S9228-T and DOVERPHOS S9228-CT by Dover Chemicals Corporation).

In some embodiments, the ethylene interpolymer composition includes bis(2,4-dicumylphenyl)pentaerythritol diphosphite (CAS number 154862-43-8; e.g., DOVERPHOS S9228-T).

In some embodiments, the additive includes a phenolic antioxidant, such as a hindered phenolic antioxidant. The hindered phenolic antioxidant can include a hindered phenolic antioxidant chosen from 2-tert-butyl-4,6-dimethylphenol, 2,6-di-tert-butyl-4-ethylphenol, 2,6-di-tert-butyl-4-n-butylphenol, 2,6-di-tert-butyl-4isobutylphenol, 2,6-dicyclopentyl-4-methylphenol, 2-(alpha-methylcyclohexyl)-4,6 dimethylphenol, 2,6-di-octadecyl-4-methylphenol, 2,4,6,-tricyclohexyphenol, 2,6-di-tert-butyl-4-methoxymethylphenol, octadecyl-3-(3,5-di-tert-butyl-4-hydroxyphenyl)-propionate (e.g., IRGANOX® 1076; CAS number 2082-79-3), pentaerythritol tetrakis[3-[3,5-di-tert-butyl-4-hydroxyphenyl]propionate (e.g., IRGANOX 1010; CAS number 6683-19-8), and combinations thereof. In some embodiments, the ethylene interpolymer composition includes octadecyl-3-(3,5-di-tert-butyl-4-hydroxyphenyl)-propionate (e.g., IRGANOX 1076; CAS number 2082-79-3) and pentaerythritol tetrakis[3-[3,5-di-tert-butyl-4-hydroxyphenyl]propionate (e.g., IRGANOX 1010; CAS number 6683-19-8).

In some embodiments, the additive includes IRGASTAB® FS301, a mixture of oxidized bis(hydrogenated tallow alkyl)amines (IRGASTAB FS 042; CAS number 143925-92-2) and tris(2,4-di-tert-butylphenyl) phosphite (CAS number 31570-04-4; e.g., IRGAFOS 168, available from BASF available from BASF.

In some embodiments, the ethylene interpolymer composition includes CHIMASSORB 944 FDL, TINUVIN 622, ZOCO 102, IRGASTAB FS301, tris(2,4-di-tert-butylphenyl) phosphite (CAS number 31570-04-4; e.g., IRGAFOS 168), bis(2,4-dicumylphenyl)pentaerythritol diphosphite (CAS number 154862-43-8; e.g., DOVERPHOS S9228-T), octadecyl-3-(3,5-di-tert-butyl-4-hydroxyphenyl)-propionate (e.g., IRGANOX 1076; CAS number 2082-79-3) and pentaerythritol tetrakis[3-[3,5-di-tert-butyl-4-hydroxyphenyl] propionate (e.g., IRGANOX 1010; CAS number 6683-19-8).

The ethylene interpolymer compositions described herein can be used in the formation of molded articles. Such articles include tanks, water tanks, underground vessels, containers, carts, as well as playground equipment, caps, screw caps, and closures for bottles. The ethylene interpolymer compositions can also be used for other applications such as but not limited to film, injection blow molding, blow molding and sheet extrusion applications.

Ethylene Interpolymers of the Ethylene Interpolymer Composition

As disclosed herein, the ethylene interpolymer composition includes a first ethylene interpolymer, a second ethylene interpolymer, and a third ethylene interpolymer.

In some embodiments, the first interpolymer is present in an amount of 15 wt. % to 60 wt. % of the ethylene interpolymer composition. For example, the first interpolymer can be present in an amount of 35 wt. % to 50 wt. % of the ethylene interpolymer composition. In some embodiments, the first interpolymer is present in an amount of 40 wt. % to 45 wt. % of the ethylene interpolymer composition.

In some embodiments, the first interpolymer has a polydispersity ($M_w/M_n$) less than 3. For example, the first interpolymer can have a polydispersity ($M_w/M_n$) from 1.5 to 3.

In some embodiments, the first interpolymer has a weight average molecular weight, $M_w$, from 100,000 to 400,000. For example, the first interpolymer can have a weight average molecular weight, $M_w$, from 150,000 to 300,000.

In some embodiments, the first interpolymer has a number average molecular weight, $M_n$, from 10,000 to 250,000. For example, the first interpolymer can have a number average molecular weight, $M_n$, from 50,000 to 200,000.

In some embodiments, the first interpolymer has a z-average molecular weight, $M_z$, from 200,000 to 500,000. For example, the first interpolymer can have a z-average molecular weight, $M_z$, from 250,000 to 400,000.

In some embodiments, the first interpolymer has a melt index, $I_2$, less than 0.4. For example, the first interpolymer can have a melt index, $I_2$, from 0.01 g/10 min to 0.4 g/10 min.

In some embodiments, the first interpolymer has a density from 0.900 g/cm$^3$ to 0.945 g/cm$^3$. For example, the first interpolymer has a density from 0.920 g/cm$^3$ to 0.940 g/cm$^3$.

In some embodiments, the second interpolymer is present in an amount of 30 wt. % to 85 wt. % of the ethylene interpolymer composition. For example, the second interpolymer can be present in an amount of 45 wt. % to 75 wt. % of the ethylene interpolymer composition. In some embodiments, the second interpolymer is present in an amount of 50 wt. % to 60 wt. % of the ethylene interpolymer composition.

In some embodiments, wherein the second interpolymer a has polydispersity ($M_w/M_n$) of at least 2. For example, the second interpolymer can have a polydispersity ($M_w/M_1$) from 2 to 5.

In some embodiments, the second interpolymer has a weight average molecular weight, $M_w$, from 5,000 to 60,000. For example, the second interpolymer can have a weight average molecular weight, $M_w$, from 10,000 to 50,000. In some embodiments, the second interpolymer has a weight average molecular weight, $M_w$, from 10,000 to 40,000.

In some embodiments, the second interpolymer has a number average molecular weight, $M_n$, from 3,000 to 20,000. For example, the second interpolymer can have a number average molecular weight, $M_n$, from 5,000 to 15,000.

In some embodiments, the second interpolymer has a z-average molecular weight, $M_z$, from 10,000 to 70,000. For example, the second interpolymer can have a z-average molecular weight, $M_z$, from 15,000 to 45,000.

In some embodiments, the second interpolymer has a melt index, $I_2$, greater than 1 g/10 min. In some embodiments, the second interpolymer has a melt index, $I_2$, from 1 g/10 min to 10,000 g/10 min. In some embodiments, the second interpolymer has a melt index, 12, up to 7,000 g/10 min.

In some embodiments, the second interpolymer has a density from 0.945 g/cm$^3$ to 0.975 g/cm$^3$. For example, the second interpolymer can have a density from 0.950 g/cm$^3$ to 0.975 g/cm$^3$.

In some embodiments, the third interpolymer is present in an amount of up to 30 wt. % of the ethylene interpolymer composition. In some embodiments, the third interpolymer is present in an amount of 10 wt. % to 30 wt. % of the ethylene interpolymer composition. In some embodiments, the third interpolymer is present in an amount of 10 wt. % to 20 wt. % of the ethylene interpolymer composition.

In some embodiments, the third interpolymer has a polydispersity ($M_w/M_n$) less than 3. In some embodiments, the third interpolymer has a polydispersity ($M_w/M_n$) from 1.5 to 3.

In some embodiments, the third interpolymer has a weight average molecular weight, $M_w$, from 25,000 to 90,000. For example, the third interpolymer can have a weight average molecular weight, $M_w$, from 30,000 to 75,000. In some embodiments, the third interpolymer has a weight average molecular weight, $M_w$, from 30,000 to 60,000.

In some embodiments, the third interpolymer has a number average molecular weight, $M_n$, from 10,000 to 50,000. In some embodiments, the third interpolymer has a number average molecular weight, $M_n$, from 10,000 to 40,000.

In some embodiments, the third interpolymer has a z-average molecular weight, $M_z$, from 50,000 to 100,000. In some embodiments, the third interpolymer has a z-average molecular weight, $M_z$, from 50,000 to 85,000.

In some embodiments, the third interpolymer has a melt index, $I_2$, from 0.5 g/10 min to 200 g/10 min. In some embodiments, the third interpolymer has a melt index, $I_2$, from 0.5 g/10 min to 100 g/10 min. In some embodiments, the third interpolymer has a melt index, $I_2$, from 0.5 g/10 min to 30 g/10 min.

In some embodiments, the third interpolymer has a density from 0.940 g/cm$^3$ to 0.975 g/cm$^3$. For example, the third interpolymer can have a density from 0.945 g/cm$^3$ to 0.965 g/cm$^3$.

In some embodiments, the ethylene interpolymer composition includes 10 wt. % to 60 wt. % of the first ethylene interpolymer, 30 wt. % to 90 wt. % of the second ethylene interpolymer and up to 30 wt. % of the third ethylene interpolymer. For example, the ethylene interpolymer composition can include from 15 wt. % to 60 wt. % of the first ethylene interpolymer, from 30 wt. % to 90 wt. % of the second ethylene interpolymer, and from 5 wt. % to 20 wt. % of the third ethylene interpolymer.

In some embodiments, the first ethylene interpolymer has a density from 0.900 g/cm$^3$ to 0.945 g/cm$^3$, the second ethylene interpolymer has a density from 0.930 g/cm$^3$ to 0.980 g/cm$^3$, and the third ethylene interpolymer has a density greater than that of the first interpolymer. For example, the first ethylene interpolymer can have a density from 0.920 g/cm$^3$ to 0.945 g/cm$^3$, the second ethylene interpolymer can have a density from 0.940 g/cm$^3$ to 0.970 g/cm$^3$, and the third ethylene interpolymer can have a density greater than that of the first interpolymer. In some embodiments, the first ethylene interpolymer has a density from 0.900 g/cm$^3$ to 0.945 g/cm$^3$, the second ethylene interpolymer has a density from 0.930 g/cm$^3$ to 0.980 g/cm$^3$, and the third ethylene interpolymer has a density from 0.930 g/cm$^3$ to 0.970 g/cm$^3$. For example, the first ethylene interpolymer can have a density from 0.920 g/cm$^3$ to 0.945 g/cm$^3$, the second ethylene interpolymer can have a density from 0.940 g/cm$^3$ to 0.970 g/cm$^3$, and the third ethylene interpolymer can have a density from 0.935 g/cm$^3$ to 0.960 g/cm$^3$.

In some embodiments, the first ethylene interpolymer has a number average molecular weight, $M_n$, from 50,000 to 200,000, the second ethylene interpolymer has a number average molecular weight, $M_n$, from 3,000 to 15,000, and the third ethylene interpolymer has a number average molecular weight, $M_n$, from 10,000 to 50,000. For example, the first ethylene interpolymer can have a number average molecular weight, $M_n$, from 70,000 to 130,000, the second ethylene interpolymer can have a number average molecular weight, $M_n$, from 4,000 to 12,000, and the third ethylene interpolymer can have number average molecular weight, $M_n$, from 12,000 to 40,000. In some embodiments, the first ethylene interpolymer has a number average molecular weight, $M_n$, from 90,000 to 110,000, the second ethylene interpolymer has a number average molecular weight, $M_n$, from 5,000 to 9,000, and the third ethylene interpolymer has a number average molecular weight, $M_n$, from 15,000 to 35,000.

In some embodiments, the first ethylene interpolymer has a weight average molecular weight, $M_w$, from 50,000 to 500,000, the second ethylene interpolymer has a weight average molecular weight, $M_w$, from 5,000 to 50,000, and the third ethylene interpolymer has weight average molecular weight, $M_w$, from 10,000 to 150,000. For example, the first ethylene interpolymer can have a weight average molecular weight, $M_w$, from 100,000 to 350,000, the second ethylene interpolymer can have a weight average molecular weight, $M_w$, from 175,000 to 225,000, and the third ethylene interpolymer can have a weight average molecular weight, $M_w$, from 25,000 to 100,000. In some embodiments, the first ethylene interpolymer has a weight average molecular weight, $M_w$, from 175,000 to 225,000, the second ethylene interpolymer has a weight average molecular weight, $M_w$, from 10,000 to 25,000, and the third ethylene interpolymer has a weight average molecular weight, $M_w$, from 30,000 to 70,000.

In some embodiments, the first ethylene interpolymer has a z-average molecular weight, $M_z$, from 150,000 to 500,000, the second ethylene interpolymer has a z-average molecular weight, $M_z$, from 15,000 to 45,000, and the third ethylene interpolymer has a z-average molecular weight, $M_z$, from 45,000 to 150,000. For example, the first ethylene interpolymer can have a z-average molecular weight, $M_z$, from 200,000 to 400,000, the second ethylene interpolymer can have a z-average molecular weight, $M_z$, from 15,000 to 35,000, and the third ethylene interpolymer can have a z-average molecular weight, $M_z$, from 50,000 to 100,000. In some embodiments, the first ethylene interpolymer has a z-average molecular weight, $M_z$, from 250,000 to 350,000, the second ethylene interpolymer has a z-average molecular weight, $M_z$, from 17,000 to 30,000, and the third ethylene interpolymer has a z-average molecular weight, $M_z$, from 50,000 to 100,000.

In some embodiments, the first ethylene interpolymer has a polydispersity ($M_w/M_n$) less than 3, the second ethylene interpolymer has a polydispersity ($M_w/M_n$) of at least 1.5, and the third ethylene interpolymer has a polydispersity ($M_w/M_n$) less than 3. In some embodiments, the first ethylene interpolymer has a polydispersity ($M_w/M_n$) from 1 to 5, the second ethylene interpolymer has a polydispersity ($M_w/M_n$) from 1 to 5, and the third ethylene interpolymer has a polydispersity ($M_w/M_n$) from 1 to 5. For example, the first ethylene interpolymer can have a polydispersity ($M_w/M_n$) from 1.5 to 3, the second ethylene interpolymer can have a polydispersity ($M_w/M_n$) 1.5 to 3, and the third ethylene interpolymer can have a polydispersity ($M_w/M_n$) from 1.5 to 3.0. In some embodiments, the first ethylene interpolymer has a polydispersity ($M_w/M_n$) from 1.75 to 2.25, the second ethylene interpolymer has a polydispersity ($M_w/M_n$) 1.75 to 2.25, and the third ethylene interpolymer has a polydispersity ($M_w/M_n$) from 1.75 to 2.45.

In some embodiments, the ethylene interpolymer composition includes a fourth ethylene interpolymer, wherein the fourth ethylene interpolymer comprises a polydispersity ($M_w/M_n$) substantially equal to the polydispersity ($M_w/M_n$) of the second ethylene interpolymer.

In some embodiments, the first ethylene interpolymer has a melt index, $I_2$, of less than 0.4 g/10 min, the second ethylene interpolymer has a melt index, $I_2$, from 1 g/10 min to 10,000 g/10 min, and the third ethylene interpolymer has a melt index, $I_2$, from 0.5 g/10 min to 200 g/10 min. For example, the first ethylene interpolymer can have a melt index, $I_2$, less than 0.4 g/10 min, the second ethylene interpolymer can have a melt index, $I_2$, from 1-7,000 g/10 min, and the third ethylene interpolymer can have a melt index, $I_2$, from 0.5 to 100 g/10 min.

Preparation of the Ethylene Interpolymer Composition

The ethylene interpolymer compositions disclosed herein can be prepared using known techniques in the art, including but not limited to melt blending, solution blending, or in-reactor blending to bring together the first ethylene interpolymer, the second ethylene interpolymer, and the third ethylene interpolymer.

In some embodiments, the ethylene interpolymer composition is prepared by using a single site catalyst in two different reactors, where each reactor is operated under different polymerization conditions to give different ethylene interpolymers (e.g., the first ethylene interpolymer and second ethylene interpolymer) and by using a multi-site catalyst in another reactor to give another ethylene interpolymer (e.g., the third ethylene interpolymer). For example, the ethylene interpolymer composition can be prepared by using the same single site catalyst in two different reactors, where each reactor is operated under different polymerization conditions to give different ethylene interpolymers (e.g., the first ethylene interpolymer and second ethylene interpolymer) and by using a multi-site catalyst in another reactor to give another ethylene interpolymer (e.g., the third ethylene interpolymer). In some embodiments, the ethylene interpolymer composition is prepared using a different single site catalyst in two different reactors, where each reactor is operated under similar or different polymerization conditions to give different ethylene interpolymers (e.g., the first ethylene interpolymer and second ethylene interpolymer), and using a multi-site catalyst in another reactor to give another ethylene interpolymer (e.g., the third ethylene interpolymer). In some embodiments, the ethylene interpolymer composition is prepared using one or more polymerization reactors, using two different single site polymerization catalysts and a multi-site polymerization catalyst, where each catalyst has a different response to one or more of hydrogen concentration, ethylene concentration, comonomer concentration, and temperature under a given set of polymerization conditions, so that an ethylene interpolymer (e.g., the first ethylene interpolymer) is produced by the first single site catalyst, an ethylene interpolymer is produced by the second single site catalyst (e.g., second ethylene interpolymer), and an ethylene interpolymer is produced by the multi-site catalyst (e.g., the third ethylene interpolymer).

In some embodiments, the ethylene interpolymer composition is prepared using one or more polymerization reactors using one or more single site polymerization catalysts, and one multi-site catalyst, where each catalyst has a similar or different response to one or more of hydrogen concentration, ethylene concentration, comonomer concentration, and temperature under a given set of polymerization conditions, and where one or more of hydrogen concentration, ethylene concentration, comonomer concentration, and temperature are cycled through a range so that the first ethylene interpolymer, second ethylene interpolymer, and third ethylene interpolymer are produced by the one or more single site catalysts and the one multi-site catalyst present in the one or more polymerization reactors.

In some embodiments, the ethylene interpolymer composition is prepared by forming an ethylene interpolymer (e.g., the first ethylene interpolymer) in a first reactor by polymerizing ethylene and an alpha olefin with a single site catalyst; forming an ethylene interpolymer (e.g., the second ethylene interpolymer) in a second reactor by polymerizing ethylene and optionally an alpha olefin with a single site catalyst, and forming an ethylene interpolymer (e.g., the third ethylene interpolymer) in a third reactor by polymerizing ethylene and optionally an alpha olefin with a multi-site catalyst.

In some embodiments, the ethylene interpolymer composition is prepared by forming an ethylene interpolymer (e.g., the first ethylene interpolymer) in a first reactor by polymerizing ethylene and an alpha olefin with a single site catalyst; forming an ethylene interpolymer (e.g., the second ethylene interpolymer) in a second reactor by polymerizing ethylene and optionally an alpha olefin with a single site catalyst, and forming an ethylene interpolymer (e.g., the third ethylene interpolymer) in a third reactor by polymerizing ethylene and optionally an alpha olefin with a multi-site catalyst, where at least two of the first, second and third reactors are configured in series with one another.

In some embodiments, the ethylene interpolymer composition is prepared by forming an ethylene interpolymer (e.g., the first ethylene interpolymer) in a first solution phase polymerization reactor by polymerizing ethylene and an alpha olefin with a single site catalyst; forming an ethylene interpolymer (e.g., the second ethylene interpolymer) in a second solution phase polymerization reactor by polymerizing ethylene and optionally an alpha olefin with a single site catalyst, and forming an ethylene interpolymer (e.g., the third ethylene interpolymer) in a third solution phase polymerization reactor by polymerizing ethylene and optionally an alpha olefin with a multi-site catalyst.

In some embodiments, the ethylene interpolymer composition is prepared by forming an ethylene interpolymer (e.g., the first ethylene interpolymer) in a first solution phase polymerization reactor by polymerizing ethylene and an alpha olefin with a single site catalyst; forming an ethylene interpolymer (e.g., the second ethylene interpolymer) in a second solution phase polymerization reactor by polymerizing ethylene and optionally an alpha olefin with a single site catalyst, and forming an ethylene interpolymer (e.g., the third ethylene interpolymer) in a third solution phase polymerization reactor by polymerizing ethylene and optionally an alpha olefin with a multi-site catalyst, where at least two of the first, second and third solution phase polymerization reactors are configured in series with one another.

In some embodiments, the ethylene interpolymer composition is prepared by forming an ethylene interpolymer (e.g., the first ethylene interpolymer) in a first solution phase polymerization reactor by polymerizing ethylene and an alpha olefin with a single site catalyst; forming an ethylene interpolymer (e.g., the second ethylene interpolymer) in a second solution phase polymerization reactor by polymerizing ethylene and optionally an alpha olefin with a single site catalyst, and forming an ethylene interpolymer (e.g., the third ethylene interpolymer) in a third solution phase polymerization reactor by polymerizing ethylene and optionally an alpha olefin with a multi-site catalyst, where the first and second solution phase polymerization reactors are configured in series with one another.

In some embodiments, the ethylene interpolymer composition is prepared by forming an ethylene interpolymer (e.g., the first ethylene interpolymer) in a first reactor by polymerizing ethylene and an alpha olefin with a single site catalyst; forming an ethylene interpolymer (e.g., the second ethylene interpolymer) in a second reactor by polymerizing ethylene and optionally an alpha olefin with a single site catalyst, and forming an ethylene interpolymer (e.g., the third ethylene interpolymer) in a third reactor by polymerizing ethylene and optionally an alpha olefin with a multi-site catalyst, where each of the first, second and third reactors are configured in parallel to one another.

In some embodiments, the ethylene interpolymer composition is prepared by forming an ethylene interpolymer (e.g., the first ethylene interpolymer) in a first solution phase polymerization reactor by polymerizing ethylene and an alpha olefin with a single site catalyst; forming an ethylene interpolymer (e.g., the second ethylene interpolymer) in a second solution phase polymerization reactor by polymerizing ethylene and optionally an alpha olefin with a single site catalyst, and forming an ethylene interpolymer (e.g., the third ethylene interpolymer) in a third solution phase polymerization reactor by polymerizing ethylene and optionally an alpha olefin with a multi-site catalyst, where each of the first, second and third solution phase polymerization reactors are configured in parallel to one another.

In some embodiments, the ethylene interpolymer composition is prepared by forming an ethylene interpolymer (e.g., the first ethylene interpolymer) in a first reactor by polymerizing ethylene and an alpha olefin with a single site catalyst; forming an ethylene interpolymer (e.g., the second ethylene interpolymer) in a second reactor by polymerizing ethylene and optionally an alpha olefin with a single site catalyst, and forming an ethylene interpolymer (e.g., the third ethylene interpolymer) in a third reactor by polymerizing ethylene and optionally an alpha olefin with a multi-site catalyst, where the first and second reactors are configured in series to one another, and the third reactor is configured in parallel to the first and second reactors.

In some embodiments, the ethylene interpolymer composition is prepared by forming an ethylene interpolymer (e.g., the first ethylene interpolymer) in a first solution phase reactor by polymerizing ethylene and an alpha olefin with a single site catalyst; forming an ethylene interpolymer (e.g., the second ethylene interpolymer) in a second solution phase reactor by polymerizing ethylene and optionally an alpha olefin with a single site catalyst, and forming an ethylene interpolymer (e.g., the third ethylene interpolymer) in a third solution phase reactor by polymerizing ethylene and optionally an alpha olefin with a multi-site catalyst, where the first and second solution phase reactors are configured in series to one another, and the third solution phase reactor is configured in parallel to the first and second reactors.

In some embodiments, the solution phase polymerization reactor used as a first solution phase reactor, a second solution phase reactor, or a third solution phase reactor is a continuously stirred tank reactor.

In some embodiments, the solution phase polymerization reactor used as a first solution phase reactor, a second solution phase reactor, or a third solution phase reactor is a tubular reactor.

In some embodiments, the ethylene interpolymer composition is prepared by melt blending or solution blending three different polyethylene components: a first ethylene interpolymer composition, a second ethylene interpolymer composition, and a third ethylene interpolymer composition.

In some embodiments, the ethylene interpolymer composition is prepared by melt blending or solution blending two different polyethylene components: a first ethylene interpolymer composition and a second ethylene interpolymer composition.

In some embodiments, the ethylene interpolymer composition is prepared by melt blending a first interpolymer composition and a second interpolymer composition. For example, the ethylene interpolymer composition can be prepared by melt blending a bimodal first interpolymer composition and a bimodal second interpolymer composition.

When the ethylene interpolymer composition is prepared by melt blending a bimodal first interpolymer composition and a bimodal second interpolymer composition, the resulting ethylene interpolymer composition itself can be bimodal.

In some embodiments, the ethylene interpolymer composition includes from 5 wt. % to 80 wt. % of the first interpolymer composition and from 20 wt. % to 95 wt. % of the second interpolymer composition. For example, the ethylene interpolymer composition can include from 15 wt. % to 45 wt. % of the first interpolymer composition and from 55 wt. % to 85 wt. % of the second ethylene interpolymer composition. In some embodiments, the ethylene interpolymer composition includes 25 wt. % to 35 wt. % of the first interpolymer composition and from 65 wt. % to 75 wt. % of the second interpolymer composition. For example, the ethylene interpolymer composition can include from 29 wt. % to 31 wt. % of the first interpolymer composition and from 69 wt. % to 71 wt. % of the second interpolymer composition.

First Interpolymer Composition for Melt Blending

As disclosed herein, the ethylene interpolymer composition can be prepared from a first interpolymer composition and a second interpolymer composition. For example, the ethylene interpolymer composition can be prepared by a process that includes melt blending a first interpolymer composition and a second interpolymer composition.

The first interpolymer composition can have a density of at least 0.940 g/cm$^3$; a melt index, $I_2$, from 1.25 g/10 min to 2.5 g/10 min; and a molecular weight distribution ($M_w/M_n$) from 3.0 to 7.0.

The melt index, $I_2$, of the first interpolymer composition can be measured according to ASTM D1238 (when conducted at 190° C., using a 2.16 kg weight).

In some embodiments, the first interpolymer composition has a density from 0.940 g/cm$^3$ to 0.949 g/cm$^3$. For example, the first interpolymer composition can have a density from 0.943 g/cm$^3$ to 0.947 g/cm$^3$. In some embodiments, the first interpolymer composition has a density from 0.945 g/cm$^3$ to 0.946 g/cm$^3$.

In some embodiments, the first interpolymer composition has a melt index, $I_2$, from 1.25 g/10 min to 2.5 g/10 min. For example, the first interpolymer composition can have a melt index, $I_2$, from 1.5 g/10 min to 2.0 g/10 min. In some embodiments, the first interpolymer composition has a melt index, $I_2$, from 1.65 g/10 min to 1.85 g/10 min.

In some embodiments, the first interpolymer composition has a melt index, $I_6$, from 2.0 g/10 min to 20.0 g/10 min. For example, the first interpolymer composition can have a melt index, $I_6$, from 6.0 g/10 min to 9.0 g/10 min. In some embodiments, the first interpolymer composition has a melt index, $I_6$, from 7.0 g/10 min to 8.0 g/10 min.

The melt index, $I_6$, of the first interpolymer composition can be measured according to ASTM D1238 (when conducted at 190° C., using a 6.48 kg weight).

In some embodiments, the first interpolymer composition has a melt index, $I_{10}$, from 5.0 g/10 min to 25.0 g/10 min. For example, the first interpolymer composition can have a melt index, $I_{10}$, from 10.0 g/10 min to 20.0 g/10 min. In some embodiments, the first interpolymer composition has a melt index, $I_1$, from 12.0 g/10 min to 18.0 g/10 min.

The melt index, $I_{10}$, of the first interpolymer composition can be measured according to ASTM D1238 (when conducted at 190° C., using a 10 kg weight).

In some embodiments, the first interpolymer composition has a high load melt index, $I_{21}$, of at least 30 g/10 min, at least 40 g/10 min, at least 50 g/10 min, or at least 60 g/10 min. In some embodiments, the first interpolymer composition has a high load melt index, $I_{21}$, from 30.0 g/10 min to 100.0 g/10 min. For example, the first interpolymer composition can have a high load melt index, $I_{21}$, from 45 g/10 min to 85 g/10 min.

The high load melt index, $I_{21}$, of the second interpolymer composition can be measured according to ASTM D1238 (when conducted at 190° C., using a 21 kg weight).

In some embodiments, the first interpolymer composition has a melt flow ratio ($I_{21}/I_2$) from 20 to 50. For example, the first interpolymer composition can have a melt flow ratio ($I_{21}/I_2$) from 25 to 45. In some embodiments, the first interpolymer composition has a melt flow ratio ($I_{21}/I_2$) from 30 to 40. For example, the first interpolymer composition can have a melt flow ratio (121/12) from 34 to 38.

In some embodiments, the first ethylene interpolymer composition has a melt flow ratio ($I_{10}/I_2$) from 6 to 11. For example, the first ethylene interpolymer composition can have a melt flow ratio (110/12) from 8 to 9.

In some embodiments, the first interpolymer composition has a number average molecular weight, $M_n$, of less than 40,000. In some embodiments, the first interpolymer composition has a number average molecular weight, $M_n$, from 10,000 to 40,000. For example, the first interpolymer composition can have a number average molecular weight, $M_n$, from 11,000 to 30,000. In some embodiments, the first interpolymer composition has a number average molecular weight, $M_n$, from 17,000 to 23,000.

In some embodiments, the first interpolymer composition has a weight average molecular weight, $M_w$, from 60,000 to 120,000. For example, the first interpolymer composition can have a weight average molecular weight, $M_w$, from 85,000 to 105,000. In some embodiments, the first interpolymer composition has a weight average molecular weight, $M_w$, from 90,000 to 96,000.

In some embodiments, the first interpolymer composition has a Z-average molecular weight, $M_z$, from 150,000 to 350,000. For example, the first interpolymer composition can have a Z-average molecular weight, $M_z$, from 235,000 to 295,000.

In some embodiments, the first interpolymer composition has a polydispersity index ($M_w/M_n$) from 2.0 to 9.0. For example, the first interpolymer composition can have a polydispersity index ($M_w/M_n$) from 3.0 to 7.0. In some embodiments, the first interpolymer composition has a polydispersity index ($M_w/M_n$) from 4.25 to 4.75.

In some embodiments, the first interpolymer composition has a stress exponent of less than 1.5. For example, the first interpolymer composition can have a stress exponent from 1.2 to 1.45.

The stress exponent is defined herein as $Log_{10}[I_6/I_2]/Log_{10}[6.48/2.16]$.

In some embodiments, the first interpolymer composition has a branch frequency per 1,000 carbon atoms from 2.2 to 3.2, wherein the branch frequency per 1,000 carbon atoms is measured by FTIR. For example, the first interpolymer composition can have a branch frequency per 1,000 carbon atoms from 2.4 to 3.0, wherein the branch frequency per 1,000 carbon atoms is measured by FTIR.

The first interpolymer composition can have a comonomer content from 0.01 mol. % to 1.0 mol. %, as measured by FTIR. In some embodiments, the first interpolymer composition can have a comonomer content from 0.2 mol. % to 0.8 mol. %, as measured by FTIR. For example, the first interpolymer composition can have a comonomer content from 0.4 mol. % to 0.6 mol. %, as measured by FTIR.

The first interpolymer composition can have a comonomer content from 0.01 mol. % to 1.0 mol. %, as measured by $^{13}C$ NMR. In some embodiments, the first interpolymer composition can have a comonomer content from 0.2 mol. % to 0.8 mol. %, as measured by $^{13}C$ NMR. For example, the first interpolymer composition can have a comonomer content from 0.4 mol. % to 0.6 mol. %, as measured by $^{13}C$ NMR.

The first interpolymer composition can have a comonomer content from 1.0 wt. % to 5.0 wt. %, as measured by FTIR. In some embodiments, the first interpolymer composition has a comonomer content from 1.6 wt. % to 2.6 wt. %, as measured by FTIR. For example, the first interpolymer composition can have a comonomer content from 1.9 wt. % to 2.3 wt. %, as measured by FTIR.

The first interpolymer composition can have a comonomer content from 1.0 wt. % to 5.0 wt. %, as measured by $^{13}C$ NMR. In some embodiments, the first interpolymer composition has a comonomer content from 1.6 wt. % to 2.6 wt. %, as measured by $^{13}C$ NMR. For example, the first interpolymer composition can have a comonomer content from 1.9 wt. % to 2.3 wt. %, as measured by $^{13}C$ NMR.

The comonomer of the first interpolymer composition can include a comonomer chosen from 1-butene, 1-hexene, 1-octene, or a combination thereof. In some embodiments, the comonomer of the first interpolymer composition is 1-octene.

The first interpolymer composition can have a 1-octene content from 0.01 mol. % to 1.0 mol. %, as measured by FTIR. In some embodiments, the first interpolymer composition can have a 1-octene content from 0.2 mol. % to 0.8 mol. %, as measured by FTIR. For example, the first interpolymer composition can have a 1-octene content from 0.4 mol. % to 0.6 mol. %, as measured by FTIR.

The first interpolymer composition can have a 1-octene content from 0.01 mol. % to 1.0 mol. %, as measured by $^{13}C$ NMR. In some embodiments, the first interpolymer composition can have a 1-octene content from 0.2 mol. % to 0.8 mol %, as measured by $^{13}C$ NMR. For example, the first interpolymer composition can have a 1-octene content from 0.4 mol. % to 0.6 mol. %, as measured by $^{13}C$ NMR.

The first interpolymer composition can have a 1-octene content from 1.0 wt. % to 5.0 wt. %, as measured by FTIR. In some embodiments, the first interpolymer composition has a 1-octene content from 1.6 wt. % to 2.6 wt. %, as measured by FTIR. For example, the first interpolymer composition can have a 1-octene content from 1.9 wt. % to 2.3 wt. %, as measured by FTIR.

The first interpolymer composition can have a 1-octene content from 1.0 wt. % to 5.0 wt. %, as measured by $^{13}C$ NMR. In some embodiments, the first interpolymer composition has a 1-octene content from 1.6 wt. % to 2.6 wt. %, as measured by $^{13}C$ NMR. For example, the first interpolymer composition can have a 1-octene content from 1.9 wt. % to 2.3 wt. %, as measured by $^{13}C$ NMR.

In some embodiments, the first interpolymer composition has an internal unsaturation from 0.05 per 1,000 carbon atoms to 0.5 per 1,000 carbon atoms, as determined by FTIR. For example, the first interpolymer composition can have an internal unsaturation from 0.05 per 1,000 carbon atoms to 0.15 per 1,000 carbon atoms, as determined by FTIR.

In some embodiments, the first interpolymer composition has a hexane extractables level below 0.55 wt. %, as measured according to ASTM D5227. For example, the first interpolymer composition can have a hexane extractables level below 0.30 wt. %, as measured according to ASTM D5227. In some embodiments, the first interpolymer composition has a hexane extractables level from 0.10 wt. % to 0.40 wt. %, as measured according to ASTM D5227. For example, the first interpolymer composition can have a hexane extractables level from 0.15 wt. % to 0.30 wt. %, as measured according to ASTM D5227.

In some embodiments, the first interpolymer composition has a primary melting peak from 124° C. to 131° C., as determined by differential scanning calorimetry. For example, the first interpolymer composition can have a primary melting peak from 126° C. to 129° C., as determined by differential scanning calorimetry.

In some embodiments, the first interpolymer composition has a heat of fusion from 175 J/g to 210 J/g, as determined by differential scanning calorimetry. For example, the first interpolymer composition can have a heat of fusion from 188 J/g to 198 J/g, as determined by differential scanning calorimetry. In some embodiments, the first interpolymer composition has a heat of fusion from 191 J/g to 195 J/g, as determined by differential scanning calorimetry.

In some embodiments, the first interpolymer composition has a crystallinity from 55% to 75%. For example, the second interpolymer composition can have a crystallinity from 60% to 70%.

Primary melting peak (° C.), heat of fusion (J/g), and crystallinity can be determined using differential scanning calorimetry (DSC) as follows: the instrument is first calibrated with indium; after the calibration, a polymer specimen is equilibrated at 0° C. and then the temperature is increased to 200° C. at a heating rate of 10° C./min; the melt is then kept isothermally at 200° C. for five minutes; the melt is then cooled to 0° C. at a cooling rate of 10° C./min and kept at 0° C. for five minutes; the specimen is then heated to 200° C. at a heating rate of 10° C./min. The DSC primary melting peak, heat of fusion, and crystallinity are determined from the 2nd heating cycle.

In some embodiments, the first interpolymer composition has a polydispersity ($M_w/M_n$) from 2.0 to 9.0; a density from 0.940 g/cm$^3$ to 0.949 g/cm$^3$; a melt index 12, of from 1.25 g/10 min to 2.5 g/10 min; a comonomer content of less than 0.01 mol. % as determined by $^{13}C$ NMR; an $M_z$ of less than 275,000; and a stress exponent of less than 1.50.

In some embodiments, the first interpolymer composition includes catalyst residues. The catalyst residues in the first interpolymer composition can reflect the chemical compositions of the catalyst formulation employed in each reactor during production. In some embodiments, the first interpolymer composition includes at least one catalyst residue chosen from titanium, aluminum, magnesium, and chlorine. In some embodiments, the first interpolymer composition includes from 0.100 ppm to 1.000 ppm titanium. For example, the first interpolymer composition can include from 0.100 to 0.700 ppm titanium, 0.150 ppm to 0.500 ppm titanium, or from 0.200 ppm to 0.400 ppm titanium. In some embodiments, the first interpolymer composition includes from 1.00 ppm aluminum to 10.00 ppm aluminum. For example, the first interpolymer composition can include from 3.00 ppm aluminum to 8.00 ppm aluminum or from 5.25 ppm aluminum to 6.25 ppm aluminum. In some embodiments, the first interpolymer composition includes less than 2.0 ppm magnesium. In some embodiments, the first interpolymer composition includes from 0.100 ppm chlorine to 1.000 ppm chlorine. For example, the first interpolymer composition can include from 0.200 to 0.800 ppm chlorine or from 0.400 ppm to 0.600 ppm chlorine.

The first interpolymer composition can be bimodal, as identified by using GPC.

When the first interpolymer composition is bimodal it includes at least two components, one of which has a lower weight average molecular weight and a higher density and another of which has a higher weight average molecular weight and a lower density.

In some embodiments, the first interpolymer composition is bimodal; has a density from 0.943 g/cm$^3$ to 0.947 g/cm$^3$; a melt index, $I_2$, from 1.5 g/10 min to 2.0 g/10 min; a polydispersity index ($M_w/M_n$) from 3.0 to 7.0; a melt flow ratio ($I_{21}/I_2$) from 30 to 40; and a 1-octene content from 0.2 mol. % to 0.8 mol. %, as measured by FTIR.

In some embodiments, the first interpolymer composition is bimodal; has a density from 0.945 g/cm$^3$ to 0.946 g/cm$^3$; a melt index, $I_2$, from 1.65 g/10 min to 1.85 g/10 min; a polydispersity index ($M_w/M_n$) from 4.25 to 4.75; and a 1-octene content from 0.2 mol. % to 0.8 mol. %, as measured by FTIR.

In some embodiments, the first interpolymer composition is bimodal; has a density from 0.943 g/cm$^3$ to 0.947 g/cm$^3$; a melt index, $I_2$, from 1.5 g/10 min to 2.0 g/10 min; a polydispersity index ($M_w/M_n$) from 3.0 to 7.0; a melt flow ratio ($I_{21}/I_2$) from 30 to 40; a 1-octene content from 0.2 mol. % to 0.8 mol. %, as measured by FTIR; from 0.150 ppm to 0.500 ppm titanium; from 3.00 ppm aluminum to 8.00 ppm aluminum; less than 2.0 ppm magnesium; and from 0.200 to 0.800 ppm chlorine.

In some embodiments, the first interpolymer composition is bimodal; has a density from 0.945 g/cm$^3$ to 0.946 g/cm$^3$; a melt index, $I_2$, from 1.65 g/10 min to 1.85 g/10 min; a polydispersity index ($M_w/M_n$) from 4.25 to 4.75; a 1-octene content from 0.2 mol. % to 0.8 mol. %, as measured by FTIR; from 0.150 ppm to 0.500 ppm titanium; from 3.00 ppm aluminum to 8.00 ppm aluminum; less than 2.0 ppm magnesium; and from 0.200 to 0.800 ppm chlorine.

In some embodiments, the first interpolymer composition is bimodal; has a density from 0.943 g/cm$^3$ to 0.947 g/cm$^3$; a melt index, $I_2$, from 1.5 g/10 min to 2.0 g/10 min; a polydispersity index ($M_w/M_n$) from 3.0 to 7.0; a melt flow ratio ($I_{21}/I_2$) from 30 to 40; and a 1-octene content from 0.2 mol. % to 0.8 mol. %, as measured by $^{13}C$ NMR.

In some embodiments, the first interpolymer composition is bimodal; has a density from 0.943 g/cm$^3$ to 0.947 g/cm$^3$; a melt index, $I_2$, from 1.5 g/10 min to 2.0 g/10 min; a polydispersity index ($M_w/M_n$) from 3.0 to 7.0; a melt flow ratio ($I_{21}/I_2$) from 30 to 40; a 1-octene content from 0.2 mol. % to 0.8 mol. %, as measured by $^{13}C$ NMR; from 0.150 ppm to 0.500 ppm titanium; from 3.00 ppm aluminum to 8.00 ppm aluminum; less than 2.0 ppm magnesium; and from 0.200 to 0.800 ppm chlorine.

In some embodiments, the first interpolymer composition is bimodal; has a density from 0.945 g/cm$^3$ to 0.946 g/cm$^3$; a melt index, $I_2$, from 1.65 g/10 min to 1.85 g/10 min; a polydispersity index ($M_w/M_n$) from 4.25 to 4.75; and a 1-octene content from 0.2 mol. % to 0.8 mol. %, as measured by $^{13}C$ NMR.

In some embodiments, the first interpolymer composition is bimodal; has a density from 0.945 g/cm$^3$ to 0.946 g/cm$^3$; a melt index, $I_2$, from 1.65 g/10 min to 1.85 g/10 min; a polydispersity index ($M_w/M_n$) from 4.25 to 4.75; a 1-octene content from 0.2 mol. % to 0.8 mol. %, as measured by $^{13}C$ NMR; from 0.150 ppm to 0.500 ppm titanium; from 3.00 ppm aluminum to 8.00 ppm aluminum; less than 2.0 ppm magnesium; and from 0.200 to 0.800 ppm chlorine In some embodiments, the first interpolymer composition can include a first ethylene interpolymer and a second ethylene interpolymer.

In some embodiments, the first interpolymer composition includes 20 wt. % to 50 wt. % of the first ethylene interpolymer and 50 wt. % to 80 wt. % of the second ethylene interpolymer. For example, the first interpolymer composition can include 30 wt. % to 40 wt. % of the first ethylene interpolymer and 60 wt. % to 70 wt. % of the second ethylene interpolymer.

In some embodiments, the one or more additives can present in the first interpolymer composition an amount of up to 20 wt. %.

In some embodiments, the first interpolymer composition includes an additive chosen from an antioxidant, an acid scavenger, an antiblock additive, a slip additive (e.g., erucimide), a colorant, a filler, a polymer processing aid, a UV additive, a stabilizer, and combinations thereof.

In some embodiments, the UV additive includes a hindered amine light stabilizer (HAL). In some embodiments, the UV additive includes a hindered amine light stabilizer chosen from TINUVIN 494, TINUVIN 622 (butanedioic acid, dimethylester, polymer with 4-hydroxy-2,2,6,6-tetramethyl-1-piperidine ethanol; CAS number 65447-77-0), TINUVIN 111, CHIMASSORB 119 (CAS number 106990-43-6), CHIMASSORB 944 (poly[[6-[(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino]]; CAS number 70624-18-9), CHIMASSORB 2020, (1,6-Hexanediamine, N,N'-bis(2,2,6,6-tetramethyl-4-piperidinyl)-polymer with 2,4,6-trichloro-1,3,5-triazine, reaction products with N-butyl-1-butanamine and N-butyl-2,2,6,6-tetramethyl-4-piperidinamine; CAS number 192268-64-7, and combinations thereof. For example, the first interpolymer composition can includes CHIMASSORB 944 FDL and TINUVIN 622.

In some embodiments, the additive includes a zinc oxide. For example, the first interpolymer composition can include ZOCO 102 (CAS number 1314-13-2).

In some embodiments, the additive includes a phosphite stabilizer.

In some embodiments, the phosphite stabilizer includes a monophosphite stabilizer. For example, the phosphite stabilizer can include a monophosphite stabilizer chosen from triphenyl phosphite, tris(2,4-di-tert-butylphenyl) phosphite (CAS number 31570-04-4; e.g., IRGAFOS 168, available from BASF), bis(2,4-di-tert-butyl-6-methylphenyl) ethyl phosphite (CAS number 145650-60-8; e.g., IRGAFOS 38, available from BASF), 2,2',2"-nitrilo[triethyltris(3,3'5,5'-tetra-tert-butyl-1,1'-biphenyl-2,2-'-diyl) phosphite (CAS number 80410-33-9; e.g., IRGAFOS 12, available from BASF), and combinations thereof. In some embodiments, the first interpolymer composition includes tris(2,4-di-tert-butylphenyl) phosphite (CAS number 31570-04-4; e.g., IRGAFOS 168).

In some embodiments, the phosphite stabilizer includes a diphosphite stabilizer. For example, the phosphite stabilizer can include a diphosphite stabilizer chosen from distearyl pentaerythritol diphosphite, diisodecyl pentaerythritol diphosphite, bis(2,4 di-tert-butylphenyl) pentaerythritol diphosphite (e.g., ULTRANOX 626, by Chemtura Corporation), bis(2,6-di-tert-butyl-4-methylpenyl) pentaerythritol diphosphite, bisisodecyloxy-pentaerythritol diphosphite, bis (2,4-di-tert-butyl-6-methylphenyl) pentaerythritol diphosphite, bis(2,4,6-tri-tert-butylphenyl) pentaerythritol diphosphite, bis(2,4-dicumylphenyl)pentaerythritol diphosphite (CAS number 154862-43-8; e.g., DOVERPHOS S9228-T and DOVERPHOS S9228-CT by Dover Chemicals Corporation). In some embodiments, the first interpolymer composition includes bis(2,4-dicumylphenyl)pentaerythritol diphosphite (CAS number 154862-43-8; e.g., DOVERPHOS S9228-T).

In some embodiments, the additive includes a phenolic antioxidant, such as a hindered phenolic antioxidant. The hindered phenolic antioxidant can include a hindered phenolic antioxidant chosen from 2-tert-butyl-4,6-dimethylphenol, 2,6-di-tert-butyl-4-ethylphenol, 2,6-di-tert-butyl-4-n- butylphenol, 2,6-di-tert-butyl-4isobutylphenol, 2,6-dicyclopentyl-4-methylphenol, 2-(alpha-methylcyclohexyl)-4,6 dimethylphenol, 2,6-di-octadecyl-4-methylphenol, 2,4,6,-tricyclohexyphenol, 2,6-di-tert-butyl-4-methoxymethylphenol, octadecyl-3-(3,5-di-tert-butyl-4-hydroxyphenyl)-propionate (e.g., IRGANOX 1076; CAS number 2082-79-3), pentaerythritol tetrakis[3-[3,5-di-tert-butyl-4-hydroxyphenyl]propionate (e.g., IRGANOX 1010; CAS number 6683-19-8), and combinations thereof. In some embodiments, the first interpolymer composition includes octadecyl-3-(3,5-di-tert-butyl-4-hydroxyphenyl)-propionate (e.g., IRGANOX 1076; CAS number 2082-79-3) and pentaerythritol tetrakis[3-[3,5-di-tert-butyl-4-hydroxyphenyl] propionate (e.g., IRGANOX 1010; CAS number 6683-19-8).

In some embodiments, the additive includes IRGASTAB FS301, a mixture of oxidized bis(hydrogenated tallow alkyl) amines (IRGASTAB FS 042; CAS number 143925-92-2) and tris(2,4-di-tert-butylphenyl) phosphite (CAS number 31570-04-4; e.g., IRGAFOS 168, available from BASF available from BASF.

In some embodiments, the first interpolymer composition includes CHIMASSORB 944 FDL, TINUVIN 622, ZOCO 102, IRGASTAB FS301, tris(2,4-di-tert-butylphenyl) phosphite (CAS number 31570-04-4; e.g., IRGAFOS 168), bis (2,4-dicumylphenyl)pentaerythritol diphosphite (CAS number 154862-43-8; e.g., DOVERPHOS 59228-T), octadecyl-3-(3,5-di-tert-butyl-4-hydroxyphenyl)-propionate (e.g., IRGANOX 1076; CAS number 2082-79-3) and pentaerythritol tetrakis[3-[3,5-di-tert-butyl-4-hydroxyphenyl]propionate (e.g., IRGANOX 1010; CAS number 6683-19-8).

In some embodiments, the first interpolymer composition includes CHIMASSORB 944 FDL, TINUVIN 622, ZOCO 102, IRGASTAB FS301, tris(2,4-di-tert-butylphenyl) phosphite (CAS number 31570-04-4; e.g., IRGAFOS 168), bis (2,4-dicumylphenyl)pentaerythritol diphosphite (CAS number 154862-43-8; e.g., DOVERPHOS S9228-T), and octadecyl-3-(3,5-di-tert-butyl-4-hydroxyphenyl)-propionate (e.g., IRGANOX 1076; CAS number 2082-79-3).

First Ethylene Interpolymer of the First Interpolymer Composition

As disclosed herein, the first interpolymer composition can include a first ethylene interpolymer and a second ethylene interpolymer.

In some embodiments, the first ethylene interpolymer of the first interpolymer composition has a density from 0.918 g/cm$^3$ to 0.934 g/cm$^3$. For example, the first ethylene interpolymer of the first interpolymer composition can have a density from 0.920 g/cm$^3$ to 0.932 g/cm$^3$. In some embodiments, the first ethylene interpolymer of the first interpolymer composition has a density from 0.922 g/cm$^3$ to 0.932 g/cm$^3$.

In some embodiments, the first ethylene interpolymer of the first interpolymer composition has a weight average molecular weight, $M_w$, of at least 120,000. In some embodiments, the first ethylene interpolymer of the first interpolymer composition has a weight average molecular weight, $M_w$, from 140,000 to 300,000. For example, the first ethylene interpolymer of the first interpolymer composition can have a weight average molecular weight, $M_w$, from 160,000 to 240,000.

In some embodiments, the first ethylene interpolymer of the first interpolymer composition has a degree of short chain branching per 1,000 carbon atoms from 1.5 to 5. For example, the first ethylene interpolymer of the first interpolymer composition can have a degree of short chain branching per 1,000 carbon atoms from 1.8 to 5. In some embodiments, the first ethylene interpolymer of the first interpolymer composition has a degree of short chain branching per 1,000 carbon atoms from 1.8 to 4.

Second Ethylene Interpolymer of the First Interpolymer Composition

In some embodiments, the second ethylene interpolymer of the first interpolymer composition has a density of at least 0.942 g/cm$^3$. For example, the second ethylene interpolymer of the first interpolymer composition can have a density from 0.945 g/cm$^3$ to 0.946 g/cm$^3$. In some embodiments, the second ethylene interpolymer of the first interpolymer composition has a density from 0.950 g/cm$^3$ to 0.958 g/cm$^3$.

In some embodiments, the second ethylene interpolymer of the first interpolymer composition has a weight average molecular weight, $M_w$, of less than 100,000. For example, the second ethylene interpolymer of the first interpolymer composition can have a weight average molecular weight, $M_w$, from 20,000 to 80,000. In some embodiments, the second ethylene interpolymer of the first interpolymer composition has a weight average molecular weight, $M_w$, from 25,000 to 50,000.

In some embodiments, the difference in the density between the first ethylene interpolymer of the first interpolymer composition and the density of the second ethylene interpolymer of the first interpolymer composition is less than 0.030 g/cm$^3$. For example, the difference in the density between the first ethylene interpolymer of the first interpolymer composition and the density of the second ethylene interpolymer of the first interpolymer composition can be from than 0.025 g/cm$^3$ to 0.029 g/cm$^3$.

In some embodiments, the second ethylene interpolymer of the first interpolymer composition has a degree of short chain branching per 1,000 carbon atoms from 0.50 to 0.95. For example, the second ethylene interpolymer of the first interpolymer composition can have a degree of short chain branching per 1,000 carbon atoms from 0.50 to 0.90.

Polymerization Process: First Interpolymer Composition.

The first interpolymer composition can be made using a solution phase reactor system. For example, the first interpolymer composition can be produced in a continuous solution polymerization process, such as a dual reactor solution process.

In some embodiments, the first interpolymer composition is prepared by a process that includes providing a catalyst formulation that includes a catalyst and contacting ethylene and an alpha-olefin with the catalyst under solution phase polymerization conditions in at least two polymerization reactors.

When the first interpolymer composition is prepared using a dual reactor solution process, an inert hydrocarbon solvent can be used. The inert hydrocarbon solvent can be chosen from a $C_{5-12}$ hydrocarbon, which may be unsubstituted or substituted by a $C_{1-4}$ alkyl group, such as pentane, methyl pentane, hexane, heptane, octane, cyclohexane, methylcyclohexane and hydrogenated naphtha. An example of a suitable solvent that is commercially available is "ISOPAR® E" ($C_{8-12}$ aliphatic solvent, ExxonMobil Chemical Co.).

In some embodiments, the temperature of the reactors is from 80° C. to 300° C. For example, the temperature of the reactors can be from 120° C. to 250° C. The upper temperature limit will be influenced by considerations that are well known to those skilled in the art, such as a desire to maximize operating temperature (so as to reduce solution viscosity), while still maintaining good polymer properties (as increased polymerization temperatures generally reduce the molecular weight of the polymer).

In some embodiments, the reaction process is a "medium pressure process," wherein the pressure in the reactor(s) is less than 42,000 kilopascals (kPa) (about 6,000 psi). For example, the pressure in one or more reactors can be from 10,000 kPa to 40,000 kPa (1,450 psi to 5,800 psi) or from 14,000 kPa to 22,000 kPa (2,000 psi to 3,000 psi).

In some embodiments, the pressure in the reactor system is high enough to maintain the polymerization solution as a single phase solution and to provide the necessary upstream pressure to feed the polymer solution from the reactor system through a heat exchanger system and to a devolatilization system. In some embodiments, the reactor system permits the solvent to separate into a polymer rich and polymer lean stream to facilitate polymer separation.

The solution polymerization process can be conducted in a stirred reactor system that includes one or more stirred tank reactors or in one or more loop reactors or in a mixed loop and stirred tank reactor system. The reactors can be in tandem or parallel operation. In a dual tandem reactor system, the first polymerization reactor can operate at a lower temperature. The residence time in each reactor can depend on the design and the capacity of the reactor. Generally, the reactors can be operated under conditions to achieve a thorough mixing of the reactants. In some embodiments, from 20 wt. % to 60 wt. % of the first interpolymer composition is polymerized in the first reactor, with the balance being polymerized in the second reactor.

In some embodiments, the polymerization temperature in the first reactor is from 80° C. to 180° C., such as from 120° C. to 160° C., and the second reactor is operated at a higher temperature up to 220° C.

In some embodiments, the catalyst in the catalyst formulation is a phosphinimine catalyst. The phosphinimine catalyst can be a phosphinimine catalyst of Formula (1):

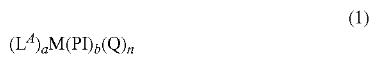

(1)

wherein ($L^A$) is a cyclopentadienyl-type ligand; M is a metal atom chosen from Ti, Zr, and Hf; PI is a phosphinimine ligand; Q is an activatable ligand; a is 0 or 1; b is 1 or 2; (a+b)=2; n is 1 or 2; and the sum of (a+b+n) equals the valance of the metal M.

As used herein, the term "cyclopentadienyl-type" ligand includes ligands having at least one five-carbon ring, which is bonded to the metal via eta-5 (or in some cases eta-3) bonding. Thus, the term "cyclopentadienyl-type" includes, for example, unsubstituted cyclopentadienyl, singly or multiply substituted cyclopentadienyl, unsubstituted indenyl, singly or multiply substituted indenyl, unsubstituted fluorenyl, and singly or multiply substituted fluorenyl. Hydrogenated versions of indenyl and fluorenyl ligands are also contemplated for use in the current disclosure, so long as the five-carbon ring which bonds to the metal via eta-5 (or in some cases eta-3) bonding remains intact. Substituents for a cyclopentadienyl ligand, an indenyl ligand (or hydrogenated version thereof) and a fluorenyl ligand (or hydrogenated version thereof) may be chosen from a $C_{1-30}$ hydrocarbyl radical (which hydrocarbyl radical may be unsubstituted or further substituted by for example a halide and/or a hydrocarbyl group; for example a substituted $C_{1-30}$ hydrocarbyl radical is a pentafluorobenzyl group such as $-CH_2C_6F_5$); a halogen atom; a $C_{1-8}$ alkoxy radical; a $C_{6-10}$ aryl or aryloxy radical (each of which may be further substituted by for example by a halide and/or a hydrocarbyl group); an amido radical which is unsubstituted or substituted by up to two $C_{1-8}$ alkyl radicals; a phosphido radical which is unsubstituted or substituted by up to two $C_{1-8}$ alkyl radicals; a silyl radical of the formula $-Si(R')_3$ wherein each R' is independently chosen from hydrogen, a $C_{1-8}$ alkyl or alkoxy radical, $C_{6-10}$ aryl or aryloxy radicals; and a germanyl radical of the formula $-Ge(R')_3$ wherein R' is as defined directly above.

The phosphinimine ligand, PI, is defined by Formula (2):

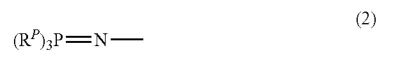

(2)

wherein each $R^p$ groups is independently selected from a hydrogen; a halogen; a $C_{1-20}$ hydrocarbyl radical which is unsubstituted or substituted with one or more halogen atoms; a $C_{1-8}$ alkoxy radical; a $C_{6-10}$ aryl radical; a $C_{6-10}$ aryloxy radical; an amido radical; a silyl radical of the formula $-Si(R^s)_3$, wherein each $R^s$ groups is independently selected from, a hydrogen, a $C_{1-8}$ alkyl or alkoxy radical, a $C_{6-10}$ aryl radical, a $C_{6-10}$ aryloxy radical, or a germanyl radical of formula $-Ge(R^G)_3$, wherein the $R^G$ groups are defined as $R^s$ is defined in this paragraph.

The metal, M, in the phosphinimine catalyst can be titanium, Ti.

The activatable ligand, Q, can be chosen from a halogen, a $C_{1-4}$ alkyl radical, a $C_{6-20}$ aryl radical, a $C_{7-12}$ arylalkyl radical, a $C_{6-10}$ phenoxy radical, an amido radical which may be substituted by up to two $C_{1-4}$ alkyl radicals, and a $C_{1-4}$ alkoxy radical. In some embodiments, Q is chosen from chlorine, a methyl radical, an ethyl radical, and a benzyl radical.

In some embodiments, the phosphinimine catalyst used to make the first polyethylene is cyclopentadienyl tri(tertiary-butyl)phosphinimine titanium dichloride, $Cp((t\text{-}Bu)_3PN)TiCl_2$.

The catalyst formulation can also include an activator. In some embodiments, the activator is chosen from an aluminoxane, an ionic activator, or a combination thereof. In general, ionic activators are comprised of a cation and a bulky anion; wherein the latter is substantially non-coordinating. Non-limiting examples of ionic activators are boron ionic activators that are four coordinate with four ligands bonded to the boron atom.

The aluminoxane can be of the formula: $(R^4)_2AlO(R^4AlO)_mAl(R^4)_2$ wherein each $R^4$ is independently chosen from a $C_{1-20}$ hydrocarbyl radicals and m is from 0 to 50. In some embodiments, $R^4$ is a $C_{1-4}$ alkyl radical and m is from 5 to 30. In some embodiments, the activator is modified methylalumoxane (MMAO).

Commercially available MMAO may contain free aluminum alkyl (e.g., trimethylaluminum or "TMA"), which may reduce catalyst activity and/or broaden the molecular weight distribution of the polymer. If a narrow molecular weight distribution polymer is required, commercially available MMAO can be treated with an additive that is capable of reacting with the TMA. For example, MMAO can be treated with an alcohol (e.g., a hindered phenol, such as 2,6-di-tert-butyl-4-ethylphenol).

In some embodiments, the molar ratio of aluminoxane to the metal, M, in the catalyst formulation is from 10:1 to 1000:1. For example, the molar ratio of aluminoxane to metal, M, in the catalyst formulation can be from 10:1 to 250:1. In some embodiments, the molar ratio of aluminoxane to the metal, M, in the catalyst formulation can be from 50:1 to 250:1.

In some embodiments, the ionic activator is a boron ionic activator of Formula (3):

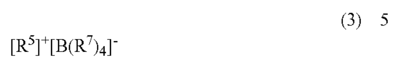

(3)

B is a boron. $R^5$ is an aromatic hydrocarbyl (e.g., a triphenyl methyl cation). Each $R^7$ is chosen independently from a phenyl radical which is unsubstituted or substituted with from 3 to 5 substituents chosen from a fluorine, a $C_{1-4}$ alkyl which is unsubstituted or substituted by a fluorine, or an alkoxy radical which is unsubstituted or substituted by a fluorine atom; and a silyl radical of the formula —Si—$(R^9)_3$; wherein each $R^9$ is independently chosen from a hydrogen or a $C_{1-4}$ alkyl radical.

In some embodiments, $R^7$ is a pentafluorophenyl radical and $R^5$ is a triphenylmethyl cation.

In some embodiments, the ionic activator is a boron ionic activator of Formula (4):

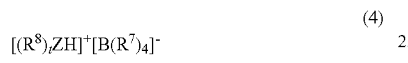

(4)

B is boron. H is hydrogen. Z is nitrogen or phosphorus. Each $R^s$ is independently chosen from a $C_{1-8}$ alkyl radical, a phenyl radical which is unsubstituted or substituted by up to three $C_{1-4}$ alkyl radicals, or one $R^s$ taken together with the nitrogen, when Z is nitrogen, may form an anilinium radical. The subscript t is 2 or 3. Each $R^7$ is chosen independently from a phenyl radical which is unsubstituted or substituted with from 3 to 5 substituents chosen from a fluorine, a $C_{1-4}$ alkyl which is unsubstituted or substituted by a fluorine, or an alkoxy radical which is unsubstituted or substituted by a fluorine atom; and a silyl radical of the formula —Si—$(R^9)_3$; wherein each $R^9$ is independently chosen from a hydrogen or a $C_{1-4}$ alkyl radical.

In some embodiments, $R^7$ is a pentafluorophenyl radical and Z is nitrogen and $R^s$ is a $C_{1-4}$ alkyl radical.

In some embodiments, $R_7$ is a pentafluorophenyl radical and Z is nitrogen and $R^8$ taken together with the nitrogen forms an anilinium radical which is substituted by two $C_{1-4}$ alkyl radicals.

In some embodiments, the ionic activator is a boron ionic activator of Formula (5):

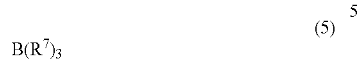

(5)

B is boron. Each $R^7$ is chosen independently from a phenyl radical which is unsubstituted or substituted with from 3 to 5 substituents chosen from a fluorine, a $C_{1-4}$ alkyl which is unsubstituted or substituted by a fluorine, or an alkoxy radical which is unsubstituted or substituted by a fluorine atom; and a silyl radical of the formula —Si—$(R^9)_3$; wherein each $R^9$ is independently chosen from a hydrogen or a $C_{1-4}$ alkyl radical.

In some embodiments, $R_7$ is a pentafluorophenyl radical.

In some embodiments the ionic activator is chosen from triethylammonium tetra(phenyl)boron; tripropylammonium tetra(phenyl)boron; tri(n-butyl)ammonium tetra(phenyl)boron; trimethylammonium tetra(p-tolyl)boron; trimethylammonium tetra(o-tolyl)boron; tributylammonium tetra(pentafluorophenyl)boron; tripropylammonium tetra(o,p-dimethylphenyl)boron; tributylammonium tetra(m,m-dimethylphenyl)boron; tributylammonium tetra(p-trifluoromethylphenyl)boron; tributylammonium tetra (pentafluorophenyl)boron; tri(n-butyl)ammonium tetra(o-tolyl)boron; N,N-dimethylanilinium tetra(phenyl)boron; N,N-diethylanilinium tetra(phenyl)boron; N,N-diethylanilinium tetra(phenyl)n-butylboron, N,N-2,4,6-pentamethylanilinium tetra(phenyl)boron; di-(isopropyl)ammonium tetra(pentafluorophenyl)boron; dicyclohexylammonium tetra(phenyl)boron, triphenylphosphonium tetra(phenyl)boron; tri(methylphenyl)phosphonium tetra(phenyl)boron; tri(dimethylphenyl)phosphonium tetra(phenyl)boron; tropillium tetrakispentafluorophenyl borate; triphenylmethylium tetrakispentafluorophenyl borate; benzene (diazonium) tetrakispentafluorophenyl borate; tropillium phenyltrispentafluorophenyl borate; triphenylmethylium phenyltrispentafluorophenyl borate; benzene (diazonium) phenyltrispentafluorophenyl borate; tropillium tetrakis (2,3,5,6-tetrafluorophenyl) borate; triphenylmethylium tetrakis (2,3,5,6-tetrafluorophenyl) borate; benzene (diazonium) tetrakis (3,4,5-trifluorophenyl) borate; tropillium tetrakis (3,4,5-trifluorophenyl) borate; benzene (diazonium) tetrakis (3,4,5-trifluorophenyl) borate; tropillium tetrakis (1,2,2-trifluoroethenyl) borate; triphenylmethylium tetrakis (1,2,2-trifluoroethenyl) borate; benzene (diazonium) tetrakis (1,2,2-trifluoroethenyl) borate; tropillium tetrakis (2,3,4,5-tetrafluorophenyl) borate; triphenylmethylium tetrakis (2,3,4,5-tetrafluorophenyl) borate; and benzene (diazonium) tetrakis (2,3,4,5-tetrafluorophenyl) borate; or a combination thereof.

In some embodiments, the ionic activator is chosen from N,N-dimethylaniliniumtetrakispentafluorophenyl borate; triphenylmethylium tetrakispentafluorophenyl borate; trispentafluorophenyl borane; or a combination thereof.

In some embodiments, the molar ratio of the ionic activator to the Ti, Zr, or Hf of the catalyst is from 1:1 to 3:1. For example, the molar ratio of the ionic activator to the Ti, Zr, or Hf of the catalyst can be from 1:1 to 1:2.

In some embodiments, the phosphinimine catalyst used to make the first polyethylene is cyclopentadienyl tri(tertiarybutyl)phosphinimine titanium dichloride, $Cp((t\text{-}Bu)_3PN)TiCl_2$, and the molar ratio of the ionic activator to the Ti is from 1:1 to 3:1 or from 1:1 to 1:2.

In some embodiments, the ionic activator is used in combination with an alkylating activator (which may also serve as a scavenger). The alkylating activator can be chosen from $(R^3)_pMgX_{2-p}$ wherein X is a halide and each $R^3$ is independently chosen from a $C_{1-10}$ alkyl radical and p is 1 or 2; $R^3Li$ wherein $R^3$ is a $C_{1-10}$ alkyl radical, $(R^3)_qZ_nX_{2-q}$ wherein each $R^3$ is independently chosen from a $C_{1-10}$ alkyl radical, X is a halogen and q is 1 or 2; $(R^3)_sAlX_{3-s}$ wherein each $R^3$ is independently chosen from a $C_{1-10}$ alkyl radical, X is halogen, and s is an integer from 1 to 3. In some embodiments, $R^3$ in the above compounds is a $C_{1-4}$ alkyl radical, and X is chlorine. Commercially available compounds include triethyl aluminum (TEAL), diethyl aluminum chloride (DEAC), dibutyl magnesium ($(Bu)_2Mg$), and butyl ethyl magnesium (BuEtMg).

In some embodiments, the catalyst formulation includes cyclopentadienyl tri(tertiarybutyl)phosphinimine titanium dichloride, $Cp((t\text{-}Bu)_3PN)TiCl_2$, modified methylalumoxane (MMAO), and trityl tetrakis(pentafluorophenyl) borate. In some embodiments, the catalyst formulation includes cyclopentadienyl tri(tertiarybutyl)phosphinimine titanium dichloride, $Cp((t\text{-}Bu)_3PN)TiCl_2$, modified methylalumoxane (MMAO), trityl tetrakis(pentafluorophenyl)borate, and 2,6-di-tert-butyl-4-ethylphenol.

In some embodiments, the catalyst formulation includes cyclopentadienyl tri(tertiarybutyl)phosphinimine titanium dichloride, $Cp((t\text{-}Bu)_3PN)TiCl_2$, modified methylalumoxane (MMAO), and trityl tetrakis(pentafluorophenyl) borate wherein the ratio of trityl tetrakis(pentafluorophenyl) borate to $Cp((t\text{-}Bu)_3PN)TiCl_2$ is from 1:0.5 to 1:2.0 and the ratio of MMAO to $Cp((t\text{-}Bu)_3PN)TiCl_2$ is from 10:1 to 150:1. For example, the catalyst formulation can include cyclopentadienyl tri(tertiarybutyl)phosphinimine titanium dichloride, $Cp((t\text{-}Bu)_3PN)TiCl_2$, modified methylalumoxane (MMAO), and trityl tetrakis(pentafluorophenyl) borate wherein the ratio of trityl tetrakis(pentafluorophenyl) borate to $Cp((t\text{-}Bu)_3PN)TiCl_2$ is from 1:0.1 to 1:1.3 and the ratio of MMAO to $Cp((t\text{-}Bu)_3PN)TiCl_2$ is from 25:1 to 100:1.

In some embodiments, the catalyst formulation includes cyclopentadienyl tri(tertiarybutyl)phosphinimine titanium dichloride, $Cp((t\text{-}Bu)_3PN)TiCl_2$, modified methylalumoxane (MMAO), trityl tetrakis(pentafluorophenyl)borate, and 2,6-di-tert-butyl-4-ethylphenol, wherein the ratio of trityl tetrakis(pentafluorophenyl)borate to $Cp((t\text{-}Bu)_3PN)TiCl_2$ is from 1:0.5 to 1:2.0, the ratio of MMAO to $Cp((t\text{-}Bu)_3PN)TiCl_2$ is from 10:1 to 150:1, and the ratio of MMAO to 2,6-di-tert-butyl-4-ethylphenol is from 0:1 to 1:1.

For example the catalyst formulation can include cyclopentadienyl tri(tertiarybutyl)phosphinimine titanium dichloride, $Cp((t\text{-}Bu)_3PN)TiCl_2$, modified methylalumoxane (MMAO), trityl tetrakis(pentafluorophenyl)borate, and 2,6-di-tert-butyl-4-ethylphenol, wherein the ratio of trityl tetrakis(pentafluorophenyl)borate to $Cp((t\text{-}Bu)_3PN)TiCl_2$ is from 1:0.5 to 1:2.0, the ratio of MMAO to $Cp((t\text{-}Bu)_3PN)TiCl_2$ is from 10:1 to 150:1, and the ratio of MMAO to 2,6-di-tert-butyl-4-ethylphenol is from 0:1 to 0.4:1.

Second Interpolymer Composition for Melt Blending

As disclosed herein, the ethylene interpolymer composition can be prepared from a first interpolymer composition and a second interpolymer composition.

The second interpolymer composition can have a density of at least 0.949 g/cm$^3$; a melt index, $I_2$, from 0.4 to 5.0 g/10 min; and a polydispersity ($M_w/M_n$) from 3.0 to 11.0.

The melt index, $I_2$, of the second interpolymer composition can be measured according to ASTM D1238 (when conducted at 190° C., using a 2.16 kg weight).

The second interpolymer composition can have a density of at least 0.949 g/cm$^3$ or at least 0.950 g/cm$^3$.

In some embodiments, the second interpolymer composition has a density from 0.949 g/cm$^3$ to 0.960 g/cm$^3$. For example, the second interpolymer composition can have a density from 0.949 g/cm$^3$ to 0.959 g/cm$^3$, 0.949 g/cm$^3$ to 0.957 g/cm$^3$, 0.949 g/cm$^3$ to 0.956 g/cm$^3$, or from 0.949 g/cm$^3$ to 0.955 g/cm$^3$. The second interpolymer composition can also have a density from 0.950 g/cm$^3$ to 0.955 g/cm$^3$, 0.951 g/cm$^3$ to 0.957 g/cm$^3$, or from 0.951 g/cm$^3$ to 0.955 g/cm$^3$.

In some embodiments, the second interpolymer composition has a density from 0.952 g/cm$^3$ to 0.955 g/cm$^3$.

In some embodiments, the second interpolymer composition has a melt index, $I_2$, from 0.4 g/10 min to 3.5 g/10 min, 0.4 g/10 min to 3.0 g/10 min, 0.5 g/10 min to 3.5 g/10 min, 1.0 g/10 min to 3.0 g/10 min, or from 1.0 g/10 min to 2.0 g/10 min. The second interpolymer composition can also have a melt index, $I_2$, from 0.5 g/10 min to 3.0 g/10 min or from 0.5 to 2.0 g 10/min. In some embodiments, the second interpolymer composition has a melt index, $I_2$, from 1.0 g/10 min to 1.2 g/10 min.

The second interpolymer composition can have a melt index, $I_5$, of at least 1.0 g/10 min. For example, the second interpolymer composition can have a melt index, Is, of at least 1.1 g/10 min, at least 3.0 g/10 min, or at least 4.0 g/10 min. In some embodiments, the second interpolymer composition has a melt index, Is, from 1.0 g/10 min to 10.0 g/10 min, 2.0 g/10 min to 8.0 g/10 min, 4.0 g/10 min to 7.0 g/10 min, or from 3.0 g/10 min to 6.5 g/10 min.

The melt index, $I_5$, of the second interpolymer composition can be measured according to ASTM D1238 (when conducted at 190° C., using a 5 kg weight).

In some embodiments, the ratio of the melt index, $I_2$, of the second ethylene interpolymer of the second interpolymer composition to the melt index, Is, of the second interpolymer composition is from 200 to 1,500. For example, the ratio of the melt index, $I_2$, of the second ethylene interpolymer of the second interpolymer composition to the melt index, $I_5$, of the second interpolymer composition can be from 400 to 1,300 or from 600 to 1,200.

The second interpolymer composition can have a melt index, $I_6$, from 1 g/10 min to 10 g/10 min. For example, the second interpolymer composition can have a melt index, $I_6$, from 3 g/10 min to 7 g/10 min.

The melt index, $I_6$, is of the second interpolymer composition can be measured according to ASTM D1238 (when conducted at 190° C., using a 6.48 kg weight).

The second interpolymer composition can have a melt index, $I_{10}$, from 5 g/10 min to 15 g/10 min. For example, the second interpolymer composition can have a melt index, $I_{10}$, from 8 g/10 min to 12 g/10 min.

The melt index, $I_{10}$, of the second interpolymer composition can be measured according to ASTM D1238 (when conducted at 190° C., using a 10 kg weight).

The second interpolymer composition can have a high load melt index, $I_{21}$, of at least 25 g/10 min. For example, the second interpolymer composition can have a high load melt index, $I_{21}$, of at least 50 g/10 min. In some embodiments, the second interpolymer composition has a high load melt index, $I_{21}$, from 25 g/10 min to 100 g/10 min. For example, the second interpolymer composition can have a high load melt index, $I_{21}$, from 60 g/10 min to 70 g/10 min.

The high load melt index, $I_{21}$, of the second interpolymer composition can be measured according to ASTM D1238 (when conducted at 190° C., using a 21 kg weight).

The second interpolymer composition can have a melt flow ratio ($I_{21}/I_2$) of at least 40. For example, the second interpolymer composition can have a melt flow ratio ($I_{21}/I_2$) of at least 45, or at least 50. In some embodiments, the second interpolymer composition has a melt flow ratio ($I_{21}/I_2$) from 45 to about 90. For example, the second interpolymer composition can have a melt flow ratio ($I_{21}/I_2$) from 45 to 80, 45 to 75, 45 to 70, 50 to 90, 50 to 80, or from 50 to 75.

In some embodiments, the second interpolymer composition has a melt flow ratio ($I_{21}/I_2$) from 55 to 65.

In some embodiments, the second interpolymer composition has a melt flow rate ($I_{21}/I_5$) of less than 25. For example, the second interpolymer composition can have a melt flow rate ($I_{21}/I_5$) of less than 20.

In some embodiments, the second ethylene interpolymer composition has a melt flow ratio ($I_{10}/I_2$) from 2 to 20, 5 to 15, or from 7 to 11.

The second interpolymer composition can have a stress exponent of less than 1.50. For example, the second interpolymer composition can have a stress exponent of less than 1.48 or less than 1.45. In some embodiments, the second interpolymer composition has a stress exponent from 1.2 to 1.45.

The stress exponent is defined herein as $Log_{10}[I_6/I_2]/Log_{10}[6.48/2.16]$.

The second interpolymer composition can have a number average molecular weight, $M_n$, of less than 30,000. For example, the second interpolymer composition can have a number average molecular weight, $M_n$, from 10,000 to 20,000. In some embodiments, the second interpolymer composition has a number average molecular weight, $M_n$, from 11,000 to 15,000.

The second interpolymer composition can have a weight average molecular weight, $M_w$, from 50,000 to 150,000. For example, the second interpolymer composition can have a weight average molecular weight, $M_w$, from 80,000 to 120,000.

The second interpolymer composition can have a Z-average molecular weight, $M_z$, of less than 400,000. For example, the second interpolymer composition can have a Z-average molecular weight, $M_z$, from 200,000 to 300,000. In some embodiments, the second interpolymer composition can have a Z-average molecular weight, $M_z$, from 240,000 to 280,000.

In some embodiments, the second interpolymer composition has a polydispersity ($M_w/M_n$) from 5.0 to 9.0. For example, the second interpolymer composition can have a polydispersity ($M_w/M_n$) from 7.0 to 8.0.

In some embodiments, the second interpolymer composition has an environment stress crack resistance ESCR Condition B at 10% (as measured according to ASTM D1693 (at 10% IGEPAL CO-360 and 50° C. under condition B)) of at least 20 hours, at least 60 hours, at least 80 hours, at least 120 hours, or at least 150 hours. In some embodiments, the second interpolymer composition has an environment stress crack resistance ESCR Condition B at 10% (as measured according to ASTM D1693 (at 10% IGEPAL CO-360 and 50° C. under condition B)) from 60 hours to 400 hours or from 100 hours to 350 hours.

In some embodiments, the second interpolymer composition has an environment stress crack resistance ESCR Condition B at 10% (as measured according to ASTM D1693 (at 10% IGEPAL CO-360 and 50° C. under condition B)) from 60 hours to 250 hours.

In some embodiments, the second interpolymer composition has a notched Izod impact strength of at least 60 J/m, as measured according to ASTM D256.

In some embodiments, the second interpolymer composition has a comonomer content from 0.01 mol. % to 0.75 mol. %, as measured by FTIR. For example, the second interpolymer composition can have a comonomer content from 0.3 mol. % to 0.5 mol. %, as measured by FTIR.

In some embodiments, the second interpolymer composition has a comonomer content from 0.01 mol. % to 0.75 mol. %, as measured by $^{13}C$ NMR. For example, the second interpolymer composition can have a comonomer content from 0.3 mol. % to 0.5 mol. %, as measured by $^{13}C$ NMR.

In some embodiments, the second interpolymer composition has a comonomer content from 0.5 wt. % to 5.0 wt. %, as measured by FTIR. For example, the second interpolymer composition can have a comonomer content from 1.0 wt. % to 3.0 wt. %, as measured by FTIR. In some embodiments, the second interpolymer composition has a comonomer content from 1.3 wt. % to 2.2 wt. %, as measured by FTIR.

In some embodiments, the second interpolymer composition has a comonomer content from 0.5 wt. % to 5.0 wt. %, as measured by $^{13}C$ NMR. For example, the second interpolymer composition can have a comonomer content from 1.0 wt. % to 3.0 wt. %, as measured by $^{13}C$ NMR. In some embodiments, the second interpolymer composition has a comonomer content from 1.3 wt. % to 2.2 wt. %, as measured by $^{13}C$ NMR.

The comonomer of the second interpolymer composition can include a comonomer chosen from 1-butene, 1-hexene, 1-octene, or a combination thereof. In some embodiments, the comonomer of the second interpolymer composition is 1-octene.

In some embodiments, the second interpolymer composition has a has a 1-octene content from 0.01 mol. % to 0.75 mol. %, as measured by FTIR. For example, the second interpolymer composition can have a has a 1-octene content from 0.3 mol. % to 0.5 mol. %, as measured by FTIR.

In some embodiments, the second interpolymer composition has a has a 1-octene content from 0.01 mol. % to 0.75 mol. %, as measured by $^{13}C$ NMR. For example, the second interpolymer composition can have a has a 1-octene content from 0.3 mol. % to 0.5 mol. %, as measured by $^{13}C$ NMR.

In some embodiments, the second interpolymer composition has a 1-octene content from 0.5 wt. % to 5 wt. %, as measured by FTIR. For example, the second interpolymer composition can have a 1-octene content from 1 wt. % to 3 wt. %, as measured by FTIR. In some embodiments, the second interpolymer composition has a 1-octene content from 1.3 wt. % to 2.2 wt. %, as measured by FTIR.

In some embodiments, the second interpolymer composition has a 1-octene content from 0.5 wt. % to 5 wt. %, as measured by $^{13}C$ NMR. For example, the second interpolymer composition can have a 1-octene content from 1 wt. % to 3 wt. %, as measured by $^{13}C$ NMR.

In some embodiments, the second interpolymer composition has a 1-octene content from 1.3 wt. % to 2.2 wt. %, as measured by $^{13}C$ NMR.

In some embodiments, the ratio ($SCB^21/SCB^22$) of the number of short chain branches per thousand carbons in the first ethylene interpolymer of the second interpolymer composition ($SCB^21$) to the number of short chain branches per thousand carbons in the second ethylene interpolymer (i.e. $SCB^22$) of the second interpolymer composition is greater than 0.5 (i.e. $SCB^21/SCB^22$). For example, the ratio ($SCB^21/SCB^22$) of the number of short chain branches per thousand carbons in the first ethylene interpolymer of the second interpolymer composition ($SCB^21$) to the number of short chain branches per thousand carbons in the second ethylene interpolymer (i.e. $SCB^22$) of the second interpolymer composition can be at least 0.6, 0.75, 1.0, 1.25, or at least 1.5.

The short chain branch frequency (SCB per 1000 carbons) of interpolymer samples can be determined by Fourier Transform Infrared Spectroscopy (FTIR) as per the ASTM D6645-01.

In some embodiments, the ratio ($SCB^21/SCB^22$) of the number of short chain branches per thousand carbon atoms in the first ethylene interpolymer of the second interpolymer composition ($SCB^21$) to the number of short chain branches per thousand carbon atoms in the second ethylene interpolymer (i.e. $SCB^22$) of the second interpolymer composition is from 0.5 to 1.0. In some embodiments, the ratio ($SCB^21/SCB^22$) of the number of short chain branches per thousand carbon atoms in the first ethylene interpolymer of the second interpolymer composition ($SCB^21$) to the number of short chain branches per thousand carbon atoms in the second ethylene interpolymer (i.e. $SCB^22$) of the second interpolymer composition is from 0.75 to 12.0, 1.0 to 10, 1.0 to 7.0, 1.0 to 5.0, or from 1.0 to 3.0.

In some embodiments, the second interpolymer composition has a hexane extractables level below 0.55 wt. %. For example, the second interpolymer composition can have a hexane extractables level below 0.40 wt. %. In some embodiments, the second interpolymer composition has a hexane extractables level from 0.20 wt. % to 0.40 wt. %.

The second interpolymer composition can have a shear viscosity at 1,000 $s^{-1}$ (200° C.) from 200 Pa·s to 400 Pa·s. For example, the second interpolymer composition can have a shear viscosity at 1,000 $s^{-1}$ (200° C.) from 200 Pa·s to 240 Pa·s. The shear viscosity can be measured using a capillary rheometer, such as a DYNISCO® LCR7000 instrument.

In some embodiments, the second interpolymer composition has a complex viscosity, η* at a shear stress (G*) from 1 kPa to 25 kPa (1,000 Pa·s to 25,000 Pa·s). For example, the second interpolymer composition can have a complex viscosity, η* at a shear stress (G*) from 1 kPa to 10 kPa (1,000 Pa·s to 10,000 Pa·s).

In some embodiments, the shear viscosity ratio, $SVR_{(10,1000)}$ at 240° C. of the second interpolymer composition is from 4.0 to 25, 4.0 to 20, or from 4.0 to 17. The shear viscosity ratio $SVR_{(10,1000)}$ is determined by taking the ratio of shear viscosity at a shear rate of 10 $s^{-1}$ and shear viscosity at a shear rate of 1000 $s^{-1}$ as measured with a capillary rheometer at constant temperature (e.g., 240° C.), and a die with L/D ratio of 20 and diameter of 0.06".

In some embodiments, the shear thinning index, $SHI_{(1,100)}$, of the second interpolymer composition is less than 10 or less than 7. The shear thinning index (SHI), can be calculated using dynamic mechanical analysis (DMA) frequency sweep methods as disclosed in PCT applications WO 2006/048253 and WO 2006/048254. The SHI value can be obtained by calculating the complex viscosities η*(1) and η*(100) at a constant shear stress of 1 kPa (G*) and 100 kPa (G*), respectively.

The $SHI_{(1,100)}$ of the second interpolymer composition can satisfy the equation: $SHI_{(1,100)}<-10.58$ (log $I_2$ of second interpolymer composition in g/10 min)/(g/10 min)+12.94. In some embodiments, the $SHI_{(1,100)}$ of the second interpolymer composition satisfies the equation: $SHI_{(1,100)}<-5.5$ (log $I_2$ of the second interpolymer composition in g/10 min)/(g/10 min)+9.66.

In some embodiments, the second interpolymer composition has a primary melt peak from 110° C. to 140° C. For example, the second interpolymer composition can have a primary melt peak from 125° C. to 135° C.

In some embodiments, the second interpolymer composition has a heat of fusion from 180 J/g to 240 J/g. For example, the second interpolymer composition can have a heat of fusion from 200 J/g to 220 J/g.

In some embodiments, the second interpolymer composition has a crystallinity from 60% to 85%. For example, the second interpolymer composition can have a crystallinity from 70% to 80%.

Primary melting peak (° C.), heat of fusion (J/g), and crystallinity can be determined using differential scanning calorimetry (DSC) as follows: the instrument is first calibrated with indium; after the calibration, a polymer specimen is equilibrated at 0° C. and then the temperature is increased to 200° C. at a heating rate of 10° C./min; the melt is then kept isothermally at 200° C. for five minutes; the melt is then cooled to 0° C. at a cooling rate of 10° C./min and kept at 0° C. for five minutes; the specimen is then heated to 200° C. at a heating rate of 10° C./min. The DSC primary melting peak, heat of fusion, and crystallinity are determined from the 2nd heating cycle.

The second interpolymer composition can have a VICAT softening point from 122° C. to 132° C. or from 125° C. to 129° C., as determined in accordance with ASTM D1525.

In some embodiments, the second interpolymer composition has a composition distribution breadth index (CDBI), as determined by temperature elution fractionation (TREF), of at least 60%. For example, the second interpolymer composition can have a CDBI of greater than 65%, greater than 70%, greater than 75%, or greater than 80%.

In some embodiments, the second interpolymer composition has a bimodal molecular weight distribution.

In some embodiments, the second interpolymer composition includes catalyst residues. The catalyst residues in the first interpolymer composition can reflect the chemical compositions of the catalyst formulation employed in each reactor during production. In some embodiments, the second interpolymer composition includes at least one catalyst residue chosen from titanium, aluminum, magnesium, and chlorine. In some embodiments, the second interpolymer composition includes from 0.100 ppm to 1.00 ppm titanium. For example, the second interpolymer composition can include from 0.100 to 0.700 ppm titanium, 0.150 ppm to 0.500 ppm titanium, or from 0.175 ppm to 0.275 ppm titanium. In some embodiments, the second interpolymer composition includes from 1.00 ppm aluminum to 10.00 ppm aluminum. For example, the second interpolymer composition can include from 3.00 ppm aluminum to 8.00 ppm aluminum or from 4.50 ppm aluminum to 6.50 ppm aluminum. In some embodiments, the second interpolymer composition includes less than 2.0 ppm magnesium. In some embodiments, the second interpolymer composition includes from 0.100 ppm chlorine to 1.000 ppm chlorine. For example, the second interpolymer composition can include 0.150 to 0.600 ppm chlorine or from 0.250 ppm to 0.500 ppm chlorine.

As disclosed herein, NAA can be used to determine catalyst residues in the second ethylene interpolymer composition.

In some embodiments, the second interpolymer composition has density from 0.951 g/cm$^3$ to 0.957 g/cm$^3$; a melt index, $I_2$, from 0.5 g/10 min to 3.0 g/10 min; and a polydispersity ($M_w/M_n$) from 5.0 to 9.0; and a comonomer content from 0.01 mol. % to 0.75 mol. %, as measured by FTIR.

In some embodiments, the second interpolymer composition has density from 0.951 g/cm$^3$ to 0.957 g/cm$^3$; a melt index, $I_2$, from 0.5 g/10 min to 3.0 g/10 min; and a polydispersity ($M_w/M_n$) from 5.0 to 9.0; and a comonomer content from 0.01 mol. % to 0.75 mol. %, as measured by $^{13}$C NMR.

In some embodiments, the second interpolymer composition has density from 0.952 g/cm$^3$ to 0.955 g/cm$^3$; a melt index, $I_2$, from 0.5 g/10 min to 3.0 g/10 min; and a polydispersity ($M_w/M_n$) from 7.0 to 8.0; and a 1-octene content from 0.01 mol. % to 0.75 mol. %, as measured by FTIR.

In some embodiments, the second interpolymer composition has density from 0.952 g/cm$^3$ to 0.955 g/cm$^3$; a melt index, $I_2$, from 0.5 g/10 min to 3.0 g/10 min; and a polydispersity ($M_w/M_n$) from 7.0 to 8.0; and a 1-octene content from 0.01 mol. % to 0.75 mol. %, as measured by $^{13}$C NMR.

In some embodiments, the second interpolymer composition has a density of from 0.949 to 0.956 g/cm$^3$; a melt index, $I_2$, from 0.5 to 3.0 g/10 min; a molecular weight distribution from 4.0 to 10.0; a number average molecular weight, $M_n$, below 30,000; a shear viscosity at 105 $s^{-1}$ (240°

C.) of less than 10 (Pa·s), a hexane extractables of less than 0.55%, a notched Izod impact strength of more than 60 J/m, and an ESCR B at 10% of at least 20 hours.

In some embodiments, the second interpolymer composition has a density of from 0.949 to 0.956 g/cm$^3$; a melt index, $I_2$, from 0.5 to 3.0 g/10 min; a molecular weight distribution from 4.5 to 9.5; a number average molecular weight, $M_n$, below 30,000; a shear viscosity at 105 $s^{-1}$ (240° C.) of less than 7 (Pa·s), a hexane extractables of less than 0.55%, a notched Izod impact strength of more than 60 J/m and an ESCR of at least 80 hours, as measured according to ASTM D1693, Condition B, 10% IGEPAL CO-360.

In some embodiments, the second interpolymer composition can include a first ethylene interpolymer and a second ethylene interpolymer.

In some embodiments, the second interpolymer composition includes 10 wt. % to 70 wt. % of the first ethylene interpolymer and 30 wt. % to 90 wt. % of the second ethylene interpolymer. For example, the first interpolymer composition can include 30 wt. % to 60 wt. % of the first ethylene interpolymer and 40 wt. % to 70 wt. % of the second ethylene interpolymer.

In some embodiments, the one or more additives can present in the second interpolymer composition an amount of up to 20 wt. %.

In some embodiments, the second interpolymer composition includes an additive chosen from an antioxidant, an acid scavenger, an antiblock additive, a slip additive (e.g., erucimide), a colorant, a filler, a polymer processing aid, a UV additive, a stabilizer, and combinations thereof.

In some embodiments, the UV additive includes a hindered amine light stabilizer (HAL). In some embodiments, the UV additive includes a hindered amine light stabilizer chosen from TINUVIN 494, TINUVIN 622 (butanedioic acid, dimethylester, polymer with 4-hydroxy-2,2,6,6-tetramethyl-1-piperidine ethanol; CAS number 65447-77-0), TINUVIN 111, CHIMASSORB 119 (CAS number 106990-43-6), CHIMASSORB 944 (poly[[6-[(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino]]; CAS number 70624-18-9), CHIMASSORB 2020, (1,6-Hexanediamine, N,N'-bis(2,2,6,6-tetramethyl-4-piperidinyl)-polymer with 2,4,6-trichloro-1,3,5-triazine, reaction products with N-butyl-1-butanamine and N-butyl-2,2,6,6-tetramethyl-4-piperidinamine; CAS number 192268-64-7, and combinations thereof. For example, the second interpolymer composition can include CHIMASSORB 944 FDL and TINUVIN 622.

In some embodiments, the additive includes a zinc oxide. For example, the second interpolymer composition can include ZOCO 102 (CAS number 1314-13-2).

In some embodiments, the additive includes a phosphite stabilizer.

In some embodiments, the phosphite stabilizer includes a monophosphite stabilizer.

For example, the phosphite stabilizer can include a monophosphite stabilizer chosen from triphenyl phosphite, tris(2,4-di-tert-butylphenyl) phosphite (CAS number 31570-04-4; e.g., IRGAFOS 168, available from BASF), bis(2,4-di-tert-butyl-6-methylphenyl) ethyl phosphite (CAS number 145650-60-8; e.g., IRGAFOS 38, available from BASF), 2,2',2"-nitrilo[triethyltris(3,3'5,5'-tetra-tert-butyl-1,1'-biphenyl-2,2-'-diyl) phosphite (CAS number 80410-33-9; e.g., IRGAFOS 12, available from BASF), and combinations thereof. In some embodiments, the second interpolymer composition includes tris(2,4-di-tert-butylphenyl) phosphite (CAS number 31570-04-4; e.g., IRGAFOS 168).

In some embodiments, the phosphite stabilizer includes a diphosphite stabilizer. For example, the phosphite stabilizer can include a diphosphite stabilizer chosen from distearyl pentaerythritol diphosphite, diisodecyl pentaerythritol diphosphite, bis(2,4 di-tert-butylphenyl) pentaerythritol diphosphite (e.g., ULTRANOX 626, by Chemtura Corporation), bis(2,6-di-tert-butyl-4-methylpenyl) pentaerythritol diphosphite, bisisodecyloxy-pentaerythritol diphosphite, bis(2,4-di-tert-butyl-6-methylphenyl) pentaerythritol diphosphite, bis(2,4,6-tri-tert-butylphenyl) pentaerythritol diphosphite, bis(2,4-dicumylphenyl)pentaerythritol diphosphite (CAS number 154862-43-8; e.g., DOVERPHOS S9228-T and DOVERPHOS S9228-CT by Dover Chemicals Corporation).

In some embodiments, the second interpolymer composition includes bis(2,4-dicumylphenyl)pentaerythritol diphosphite (CAS number 154862-43-8; e.g., DOVERPHOS S9228-T).

In some embodiments, the additive includes a phenolic antioxidant, such as a hindered phenolic antioxidant. The hindered phenolic antioxidant can include a hindered phenolic antioxidant chosen from 2-tert-butyl-4,6-dimethylphenol, 2,6-di-tert-butyl-4-ethylphenol, 2,6-di-tert-butyl-4-n-butylphenol, 2,6-di-tert-butyl-4isobutylphenol, 2,6-dicyclopentyl-4-methylphenol, 2-(alpha-methylcyclohexyl)-4,6 dimethylphenol, 2,6-di-octadecyl-4-methylphenol, 2,4,6,-tricyclohexyphenol, 2,6-di-tert-butyl-4-methoxymethylphenol, octadecyl-3-(3,5-di-tert-butyl-4-hydroxyphenyl)-propionate (e.g., IRGANOX 1076; CAS number 2082-79-3), pentaerythritol tetrakis[3-[3,5-di-tert-butyl-4-hydroxyphenyl]propionate (e.g., IRGANOX 1010; CAS number 6683-19-8), and combinations thereof. In some embodiments, the second interpolymer composition includes octadecyl-3-(3,5-di-tert-butyl-4-hydroxyphenyl)-propionate (e.g., IRGANOX 1076; CAS number 2082-79-3) and pentaerythritol tetrakis[3-[3,5-di-tert-butyl-4-hydroxyphenyl]propionate (e.g., IRGANOX 1010; CAS number 6683-19-8).

In some embodiments, the additive includes IRGASTAB FS301, a mixture of oxidized bis(hydrogenated tallow alkyl) amines (IRGASTAB FS 042; CAS number 143925-92-2) and tris(2,4-di-tert-butylphenyl) phosphite (CAS number 31570-04-4; e.g., IRGAFOS 168, available from BASF available from BASF.

In some embodiments, the second interpolymer composition includes CHIMASSORB 944 FDL, TINUVIN 622, ZOCO 102, IRGASTAB FS301, tris(2,4-di-tert-butylphenyl) phosphite (CAS number 31570-04-4; e.g., IRGAFOS 168), bis(2,4-dicumylphenyl)pentaerythritol diphosphite (CAS number 154862-43-8; e.g., DOVERPHOS S9228-T), octadecyl-3-(3,5-di-tert-butyl-4-hydroxyphenyl)-propionate (e.g., IRGANOX 1076; CAS number 2082-79-3) and pentaerythritol tetrakis[3-[3,5-di-tert-butyl-4-hydroxyphenyl] propionate (e.g., IRGANOX 1010; CAS number 6683-19-8).

In some embodiments, the second interpolymer composition includes tris(2,4-di-tert-butylphenyl) phosphite (CAS number 31570-04-4; e.g., IRGAFOS 168), octadecyl-3-(3,5-di-tert-butyl-4-hydroxyphenyl)-propionate (e.g., IRGANOX 1076; CAS number 2082-79-3) and pentaerythritol tetrakis[3-[3,5-di-tert-butyl-4-hydroxyphenyl]propionate (e.g., IRGANOX 1010; CAS number 6683-19-8).

First Ethylene Interpolymer of the Second Interpolymer Composition

As disclosed herein, the first interpolymer composition can include a first ethylene interpolymer and a second ethylene interpolymer In some embodiments, the density of the first ethylene interpolymer is from 0.925 g/cm$^3$ to 0.955 g/cm$^3$. For example, the density of the first ethylene interpolymer can be from 0.925 g/cm$^3$ to 0.950 g/cm$^3$, 0.925 g/cm$^3$ to 0.945 g/cm$^3$, 0.925 g/cm$^3$ to 0.940 g/cm$^3$, 0.925 g/cm$^3$ to 0.935 g/cm$^3$, 0.927 g/cm$^3$ to 0.945 g/cm$^3$, 0.927 g/cm$^3$ to 0.940 g/cm$^3$, or from 0.927 g/cm$^3$ to 0.935 g/cm$^3$.

The density of the first ethylene interpolymer can be estimated from GPC (gel permeation chromatography) or GPC-FTIR (gel permeation chromatography with Fourier transform infra-red detection) experiments and deconvolutions carried out on the second interpolymer composition.

In some embodiments, the weight average molecular weight, $M_w$, of the first ethylene interpolymer of the second interpolymer composition is from 110,000 to 225,000.

For example, the weight average molecular weight, $M_w$, of the first ethylene interpolymer can be from 135,000 to 200,000.

The first ethylene interpolymer of the second interpolymer composition can include an alpha-olefin. In some embodiments, alpha-olefin is present in an amount of 0.05 mol. % to 3.0 mol. % of the first ethylene interpolymer.

The alpha-olefin can be chosen from 1-butene, 1-hexene, 1-octene, or a combination thereof. In some embodiments, the alpha-olefin is 1-octene.

The short chain branching in the first ethylene interpolymer can be from 0.25 to 15 short chain branches per thousand carbons ($SCB^21/1000$ Cs). In some embodiments, the short chain branching in the first ethylene interpolymer is from 0.5 to 15, 0.5 to 12, or from 0.5 to 10 branches per thousand carbons ($SCB^21/1000$ Cs). In some embodiments, the short chain branching in the first ethylene interpolymer is from 0.75 to 15, 0.75 to 12, or from 0.75 to 10 branches per thousand carbons ($SCB^21/1000$ Cs). In some embodiments, the short chain branching in the first ethylene interpolymer is from 1.0 to 10, 1.0 to 8.0, 1.0 to 5, or from 1.0 to 3 branches per thousand carbon atoms ($SCB^21/1000$ Cs). The short chain branching is the branching due to the presence of alpha-olefin comonomer in the ethylene interpolymer and will, for example, have two carbon atoms for a 1-butene comonomer, or four carbon atoms for a 1-hexene comonomer, or six carbon atoms for a 1-octene comonomer. The number of short chain branches in the first ethylene interpolymer can determined by mathematical deconvolution methods applied to a bimodal polyethylene composition (see the Examples section). The comonomer can be one or more suitable alpha-olefin such as but not limited to 1-butene, 1-hexene, and 1-octene. For example, the comonomer can be 1-octene.

In some embodiments, the comonomer content in the first ethylene interpolymer of the second interpolymer composition is substantially similar or approximately equal (e.g. within about ±0.05 mol. %) to the comonomer content of the second ethylene interpolymer (as reported for example in mol. %) of the second interpolymer composition.

In some embodiments, the mol. % of comonomer in the first ethylene interpolymer of the second interpolymer composition is greater than the mol. % of comonomer in the second ethylene interpolymer of the second interpolymer composition.

The short chain branching in the first ethylene interpolymer of the second interpolymer composition can be within ±0.50 SCB/1000 Cs of the short chain branching in the second ethylene interpolymer, as reported in short chain branches, SCB per thousand carbon in the polymer backbone, 1000 Cs. In some embodiments, the short chain branching in the first ethylene interpolymer of the second interpolymer composition is within ±0.25 SCB/1000 Cs of the short chain branching in the second ethylene interpolymer, as reported in short chain branches, SCB per thousand carbons in the polymer backbone, 1000 Cs.

In some embodiments, the melt index of the first ethylene interpolymer of the second interpolymer composition is from 0.01 g/10 min to 0.4 g/10 min.

The density and the melt index, $I_2$, of the first ethylene interpolymer can be estimated from GPC (gel permeation chromatography) and GPC-FTIR (gel permeation chromatography with Fourier transform infra-red detection) experiments and deconvolutions carried out on the bimodal polyethylene composition.

In some embodiments, the first ethylene interpolymer of the second interpolymer composition has a molecular weight distribution of ≤2.7. For example, the first ethylene interpolymer can have a molecular weight distribution of ≤2.5, ≤2.4, or ≤2.3. In some embodiments, the first ethylene interpolymer has a molecular weight distribution of 1.8 to 2.3.

In some embodiments, the first ethylene interpolymer of the second interpolymer composition is a homogeneously branched ethylene interpolymer and has a CDBI of greater than 50%. For example, the first ethylene interpolymer can have a CDBI of greater than 60%, or greater than 65%, or greater than 70%.

In some embodiments, the first ethylene interpolymer of the second interpolymer composition is a homogeneously branched ethylene interpolymer having a weight average molecular weight, $M_w$, of at least 110,000; a molecular weight distribution, $M_w/M_n$, of less than 2.7 and a density of from 0.925 g/cm$^3$ to 0.948 g/cm$^3$.

In some embodiments, the second interpolymer composition can include 10 wt. % to 70 wt. % of the first ethylene interpolymer. For example, the second interpolymer composition can include 20 wt. % to 60 wt. %, 30 wt. % to 60 wt. %, or 40 wt. % to 50 wt. % of the first ethylene interpolymer.

Second Ethylene Interpolymer of the Second Interpolymer Composition

The second ethylene interpolymer of the second interpolymer composition can have a weight average molecular weight, $M_w$, of less than 45,000. For example, the second ethylene interpolymer can have a weight average molecular weight $M_w$ of less than 25,000.

In some embodiments, the second ethylene interpolymer has a weight average molecular weight, $M_w$, from 7,500 to 23,000. For example, the second ethylene interpolymer can have a weight average molecular weight, $M_w$, of from 9,000 to 22,000 or from 10,000 to 17,500.

In some embodiments, the second ethylene interpolymer has a weight average molecular weight, $M_w$, from 7,500 to 17,500.

In some embodiments, the second ethylene interpolymer of the second interpolymer composition has from 0.05 mol. % to 3 mol. % of the comonomer as measured by FTIR.

In some embodiments, the second ethylene interpolymer of the second interpolymer composition has from 0.05 mol. % to 3 mol. % of the comonomer as measured by $^{13}C$ NMR.

The comonomer of the second ethylene interpolymer of the second interpolymer composition can include an alpha-olefin. The alpha-olefin can be an alpha-olefin chosen from 1-butene, 1-hexene, 1-octene, or a combination thereof. In some embodiments, the alpha-olefin is 1-octene.

In some embodiments, the second ethylene interpolymer of the second interpolymer composition is a homogeneously branched interpolymer.

In some embodiments, the short chain branching in the second ethylene interpolymer of the second interpolymer composition is from 0.25 to 15 short chain branches per thousand carbon atoms ($SCB^22/1000$ Cs). For example, the short chain branching in the second ethylene interpolymer can be from 0.25 to 12, 0.25 to 8, 0.25 to 5, 0.25 to 3, or from 0.25 to 2 branches per thousand carbon atoms ($SCB^22/1000$ Cs). The short chain branching is the branching due to the presence of alpha-olefin comonomer in the ethylene interpolymer and will for example have two carbon atoms for a 1-butene comonomer, four carbon atoms for a 1-hexene comonomer, six carbon atoms for a 1-octene comonomer, etc. The number of short chain branches in the second ethylene interpolymer can be measured by $^{13}C$ NMR, FTIR, or GPC-FTIR methods. Alternatively, the number of short chain branches in the second ethylene interpolymer can be determined by mathematical deconvolution methods applied to a bimodal polyethylene composition (see the Examples section).

In some embodiments, the comonomer content in the second ethylene interpolymer of the second interpolymer composition is within ±0.05 mol. % of the comonomer content of the first ethylene interpolymer of the second interpolymer composition.

In some embodiments, the mol. % of comonomer in the second ethylene interpolymer of the second interpolymer composition is less than the comonomer content of the first ethylene interpolymer of the second interpolymer composition.

In some embodiments, the amount of short chain branching in the second ethylene interpolymer of the second interpolymer composition is within ±0.25 SCB/1000 C of the amount of short chain branching in the first ethylene interpolymer of the second interpolymer composition.

In some embodiments, the amount of short chain branching in the second ethylene interpolymer of the second interpolymer composition is less than the amount of short chain branching in the first ethylene interpolymer of the second interpolymer composition, as reported in short chain branches, SCB per thousand carbons in the polymer backbone, 1000 Cs.

The second ethylene interpolymer of the second interpolymer composition can have a density of less than 0.966 g/cm$^3$. For example, the second ethylene interpolymer can have a density of less than 0.966 g/cm$^3$, less than 0.965 g/cm$^3$, less than 0.964 g/cm$^3$ or less than 0.963 g/cm$^3$. In some embodiments, the density of the second ethylene interpolymer is less than 0.962 g/cm$^3$.

In some embodiments, the second ethylene interpolymer of the second interpolymer composition has a density from 0.952 g/cm$^3$ to 0.966 g/cm$^3$.

The density of the second ethylene interpolymer may be measured according to ASTM D792. Alternatively, the melt index, $I_2$, of the second ethylene interpolymer can optionally be estimated from GPC and GPC-FTIR experiments and deconvolutions carried out on a bimodal polyethylene composition (see the below Examples section).

In some embodiments, the second ethylene interpolymer of the second interpolymer composition has a polydispersity ($M_w/M_n$) of at least 2.7. For example, the second ethylene interpolymer can have a molecular weight distribution ($M_w/M_n$) of at least 2.7, at least 2.5, at least 2.5, or at least 2.3. In some embodiments, the second ethylene interpolymer of the second interpolymer composition has molecular weight distribution ($M_w/M_n$) from 1.8 to 2.3.

In some embodiments, the melt index, $I_2$, of the second ethylene interpolymer of the second interpolymer composition is from 20 g/10 min to 10,000 g/10 min or from 100 g/10 min to 10,000 g/10 min. For example, the melt index, $I_2$, of the second ethylene interpolymer is from 1,000 to 7,000 g/10 min or from 1,500 g/10 min to 7,000 g/10 min. In some embodiments, the melt index, $I_2$, of the second ethylene interpolymer is from 1,200 to 10,000 g/10 min or from 1,500 to 10,000 g/10 min.

In some embodiments, the melt index, $I_2$, of the second ethylene interpolymer is greater than 200 g/10 min, greater than 500 g/10 min, greater than 1,000 g/10 min, greater than 1,200 g/10 min, or greater than 1,500 g/10 min.

The melt index, $I_2$, of the second ethylene interpolymer cay be measured according to ASTM D1238 (when conducted at 190° C., using a 2.16 kg weight). Alternatively, the melt index, $I_2$, of the second ethylene interpolymer can optionally be estimated from GPC and GPC-FTIR experiments and deconvolutions carried out on a bimodal polyethylene composition (see the below Examples section).

In some embodiments, the second ethylene interpolymer of the second interpolymer composition is a homogeneous ethylene interpolymer having a weight average molecular weight, $M_w$, of at least 45,000; a molecular weight distribution, $M_w/M_n$, of less than 2.7 and a density higher than the density of the first ethylene interpolymer in the second interpolymer composition, but less than 0.967 g/cm$^3$.

In some embodiments, the second ethylene interpolymer of the second interpolymer composition is a homogeneously branched ethylene interpolymer and has a CDBI of greater than 50%, 55%, 60%, 65%, or greater than 70%.

In some embodiments, the second ethylene interpolymer of the second interpolymer composition has a density which is higher than the density of the first ethylene interpolymer of the second interpolymer composition, but less than 0.037 g/cm$^3$ higher than the density of the first ethylene interpolymer. In some embodiments, the second ethylene interpolymer has a density which is higher than the density of the first ethylene interpolymer, but less than 0.035 g/cm$^3$ higher than the density of the first ethylene interpolymer. In some embodiments, the second ethylene interpolymer has a density which is higher than the density of the first ethylene interpolymer, but less than 0.031 g/cm$^3$ higher than the density of the first ethylene interpolymer. In some embodiments, the second ethylene interpolymer has a density which is higher than the density of the first ethylene interpolymer, but less than 0.030 g/cm$^3$ higher than the density of the first ethylene interpolymer.

In some embodiments, the $I_2$ of the second ethylene interpolymer of the second interpolymer composition is at least 100 times, or at least 1,000 times, or at least 10,000 the $I_2$ of the first ethylene interpolymer of the second interpolymer composition.

The second interpolymer composition can include 30 wt. % to 90 wt. % of the second ethylene interpolymer. For example, the second interpolymer composition can include 40 wt. % to 80 wt. %, 40 wt. % to 70 wt. %, or 50 wt. % to 60 wt. % of the second ethylene interpolymer.

In some embodiments, the second interpolymer composition includes from 10 wt. % to 70 wt. % of the first ethylene interpolymer, wherein the first ethylene interpolymer has a melt index, $I_2$, of less than 0.4 g/10 min, a molecular weight distribution, $M_w/M_n$, of less than 3.0, and a density of from 0.920 to 0.955 g/cm$^3$; and from 30 wt. % to 90 wt. % of the second ethylene interpolymer, wherein the second ethylene interpolymer has a melt index, 12, from 100 g/10 min to 10,000 g/10 min, a polydispersity, $M_w/M_n$, of less than 3.0, and a density higher than the density of the first ethylene interpolymer, but less than 0.967 g/cm$^3$.

In some embodiments, the density of the second ethylene interpolymer is less than 0.037 g/$cm^3$ higher than the density of the first ethylene interpolymer and the ratio of short chain branching in the first ethylene interpolymer (SCB1) to the short chain branching in the second ethylene interpolymer (SCB2) is greater than 0.

In some embodiments, the second interpolymer composition includes from 30 wt. % to 60 wt. % of the first ethylene interpolymer, wherein the first ethylene interpolymer has a melt index, $I_2$, of less than 0.4 g/10 min, a molecular weight distribution, $M_w/M_n$, of less than 2.7, and a density of from 0.925 to 0.950 g/$cm^3$; and 40 wt. % to 70 wt. % of the second ethylene interpolymer, wherein the second ethylene interpolymer has a melt index, $I_2$, from 100 g/10 min to 10,000 g/10 min, a molecular weight distribution, $M_w/M_n$, of less than 2.7, and a density higher than the density of the first ethylene interpolymer, but less than 0.966 g/$cm^3$.

Second Interpolymer Composition: Polymerization Process

The second interpolymer composition can be made using a solution phase reactor system. For example, the second interpolymer composition can be produced in a continuous solution polymerization process, such as a dual reactor solution process.

In some embodiments, the second interpolymer composition is prepared by a process that includes providing a catalyst formulation that includes a catalyst and contacting ethylene and an alpha-olefin with the catalyst under solution phase polymerization conditions in at least two polymerization reactors.

When the first interpolymer composition is prepared using a dual reactor solution process, an inert hydrocarbon solvent can be used. The inert hydrocarbon solvent can be chosen from a $C_{5-12}$ hydrocarbon, which may be unsubstituted or substituted by a $C_{1-4}$ alkyl group, such as pentane, methyl pentane, hexane, heptane, octane, cyclohexane, methylcyclohexane and hydrogenated naphtha. An example of a suitable solvent that is commercially available is "ISOPAR E" ($C_{8-12}$ aliphatic solvent, ExxonMobil Chemical Co.).

In some embodiments, a group 4 single site catalyst system, that includes a single site catalyst and an activator, is used in a solution phase dual reactor system to prepare a bimodal second interpolymer composition by polymerization of ethylene in the presence of an alpha-olefin comonomer (e.g., 1-octene).

In some embodiments, a group 4 phosphinimine catalyst system, that includes a phosphinimine catalyst and an activator, is used in a solution phase dual reactor system to prepare a bimodal second interpolymer composition by polymerization of ethylene in the presence of an alpha-olefin comonomer (e.g., 1-octene).

The solution phase dual reactor system can include two solution phase reactors connected in series.

In some embodiments, the polymerization process to prepare the second interpolymer composition includes contacting at least one single site polymerization catalyst system with ethylene and at least one alpha-olefin comonomer under solution polymerization conditions in at least two polymerization reactors. For example, the polymerization process to prepare the second interpolymer composition can include contacting at least one single site polymerization catalyst system with ethylene and at least one alpha-olefin comonomer under solution polymerization conditions in a first reactor and a second reactor configured in series.

In some embodiments, the polymerization process to prepare the second interpolymer composition includes contacting at least one single site polymerization catalyst system with ethylene and at least one alpha-olefin comonomer under solution polymerization conditions in a first reactor and a second reactor configured in series, with the at least one alpha-olefin comonomer (e.g., 1-octene) being fed exclusively to the first reactor.

In some embodiments, the temperature of the reactors is from 80° C. to 300° C. For example, the temperature of the reactors can be from 120° C. to 250° C. The upper temperature limit will be influenced by considerations that are well known to those skilled in the art, such as a desire to maximize operating temperature (so as to reduce solution viscosity), while still maintaining good polymer properties (as increased polymerization temperatures generally reduce the molecular weight of the polymer).

In some embodiments, the reaction process is a "medium pressure process," wherein the pressure in the reactor(s) is less than 42,000 kilopascals (kPa) (about 6,000 psi). For example, the pressure in one or more reactors can be from 10,000 kPa to 40,000 kPa (1,450 psi to 5,800 psi) or from 14,000 kPa to 22,000 kPa (2,000 psi to 3,000 psi).

In some embodiments, the catalyst in the catalyst formulation is a phosphinimine catalyst. The phosphinimine catalyst can be a phosphinimine catalyst of Formula (1):

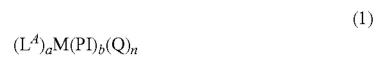

$$(L^A)_a M(PI)_b(Q)_n \quad (1)$$

wherein ($L^A$) is a cyclopentadienyl-type ligand; M is a metal atom chosen from Ti, Zr, and Hf; PI is a phosphinimine ligand; Q is an activatable ligand; a is 0 or 1; b is 1 or 2; (a+b)=2; n is 1 or 2; and the sum of (a+b+n) equals the valance of the metal M.

As used herein, the term "cyclopentadienyl-type" ligand includes ligands having at least one five-carbon ring, which is bonded to the metal via eta-5 (or in some cases eta-3) bonding. Thus, the term "cyclopentadienyl-type" includes, for example, unsubstituted cyclopentadienyl, singly or multiply substituted cyclopentadienyl, unsubstituted indenyl, singly or multiply substituted indenyl, unsubstituted fluorenyl, and singly or multiply substituted fluorenyl. Hydrogenated versions of indenyl and fluorenyl ligands are also contemplated for use in the current disclosure, so long as the five-carbon ring which bonds to the metal via eta-5 (or in some cases eta-3) bonding remains intact. Substituents for a cyclopentadienyl ligand, an indenyl ligand (or hydrogenated version thereof) and a fluorenyl ligand (or hydrogenated version thereof) may be chosen from a $C_{1-30}$ hydrocarbyl radical (which hydrocarbyl radical may be unsubstituted or further substituted by for example a halide and/or a hydrocarbyl group; for example a substituted $C_{1-30}$ hydrocarbyl radical is a pentafluorobenzyl group such as $—CH_2C_6F_5$); a halogen atom; a $C_{1-8}$ alkoxy radical; a $C_{6-10}$ aryl or aryloxy radical (each of which may be further substituted by for example by a halide and/or a hydrocarbyl group); an amido radical which is unsubstituted or substituted by up to two $C_{1-8}$ alkyl radicals; a phosphido radical which is unsubstituted or substituted by up to two $C_{1-8}$ alkyl radicals; a silyl radical of the formula $—Si(R')_3$ wherein each R' is independently chosen from hydrogen, a $C_{1-8}$ alkyl or alkoxy radical, $C_{6-10}$ aryl or aryloxy radicals; and a germanyl radical of the formula $—Ge(R')_3$ wherein R' is as defined directly above.

The phosphinimine ligand, PI, is defined by Formula (2):

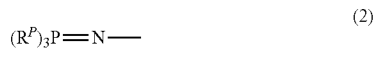

(2)

wherein each $R^p$ groups is independently selected from a hydrogen; a halogen; a $C_{1-20}$ hydrocarbyl radical which is unsubstituted or substituted with one or more halogen atoms; a $C_{1-8}$ alkoxy radical; a $C_{6-10}$ aryl radical; a $C_{6-10}$ aryloxy radical; an amido radical; a silyl radical of the formula —$Si(R^s)_3$, wherein each $R^s$ groups is independently selected from, a hydrogen, a $C_{1-8}$ alkyl or alkoxy radical, a $C_{6-10}$ aryl radical, a $C_{6-10}$ aryloxy radical, or a germanyl radical of formula —$Ge(R^G)_3$, wherein the $R^G$ groups are defined as $R^s$ is defined in this paragraph.

The metal, M, in the phosphinimine catalyst can be titanium, Ti.

The activatable ligand, Q, can be chosen from a halogen, a $C_{1-4}$ alkyl radical, a $C_{6-20}$ aryl radical, a $C_{7-12}$ arylalkyl radical, a $C_{6-10}$ phenoxy radical, an amido radical which may be substituted by up to two $C_{1-4}$ alkyl radicals, and a $C_{1-4}$ alkoxy radical. In some embodiments, Q is chosen from chlorine, a methyl radical, an ethyl radical, and a benzyl radical.

In some embodiments, the phosphinimine catalyst used to make the first polyethylene is cyclopentadienyl tri(tertiary-butyl)phosphinimine titanium dichloride, $Cp((t\text{-}Bu)_3PN)TiCl_2$.

The catalyst formulation can also include an activator. In some embodiments, the activator is chosen from an aluminoxane, an ionic activator, or a combination thereof.

The aluminoxane can be of the formula: $(R^4)_2AlO(R^4AlO)_mAl(R^4)_2$ wherein each $R^4$ is independently chosen from a $C_{1-20}$ hydrocarbyl radicals and m is from 0 to 50. In some embodiments, $R^4$ is a $C_{1-4}$ alkyl radical and m is from 5 to 30. In some embodiments, the activator is methylalumoxane (MMAO).

Commercially available MMAO may contain free aluminum alkyl (e.g., trimethylaluminum or "TMA"), which may reduce catalyst activity and/or broaden the molecular weight distribution of the polymer. If a narrow molecular weight distribution polymer is required, commercially available MAO can be treated with an additive that is capable of reacting with the TMA. For example, MAO can be treated with an alcohol (e.g., a hindered phenol, such as 2,6-di-tert-butyl-4-ethylphenol).

In some embodiments, the molar ratio of aluminoxane to the metal, M, of the catalyst in the catalyst formulation is from 20:1 to 1000:1. For example, the molar ratio of aluminoxane to the metal, M, of the catalyst in the catalyst formulation can be from 50:1 to 250:1.

In some embodiments, the ionic activator is a boron ionic activator of Formula (3):

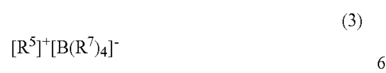

(3)

B is a boron. $R^5$ is an aromatic hydrocarbyl (e.g., a triphenyl methyl cation). Each $R^7$ is chosen independently from a phenyl radical which is unsubstituted or substituted with from 3 to 5 substituents chosen from a fluorine, a $C_{1-4}$ alkyl which is unsubstituted or substituted by a fluorine, or an alkoxy radical which is unsubstituted or substituted by a fluorine atom; and a silyl radical of the formula —Si—$(R^9)_3$; wherein each $R^9$ is independently chosen from a hydrogen or a $C_{1-4}$ alkyl radical.

In some embodiments, $R^7$ is a pentafluorophenyl radical and $R^5$ is a triphenylmethyl cation.

In some embodiments, the ionic activator is a boron ionic activator of Formula (4):

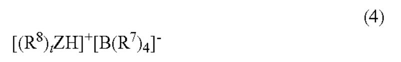

(4)

B is boron. H is hydrogen. Z is nitrogen or phosphorus. Each $R^8$ is independently chosen from a $C_{1-8}$ alkyl radical, a phenyl radical which is unsubstituted or substituted by up to three $C_{1-4}$ alkyl radicals, or one $R^s$ taken together with the nitrogen, when Z is nitrogen, may form an anilinium radical. The subscript t is 2 or 3. Each $R^7$ is chosen independently from a phenyl radical which is unsubstituted or substituted with from 3 to 5 substituents chosen from a fluorine, a $C_{1-4}$ alkyl which is unsubstituted or substituted by a fluorine, or an alkoxy radical which is unsubstituted or substituted by a fluorine atom; and a silyl radical of the formula Si—$(R^9)_3$; wherein each $R^9$ is independently chosen from a hydrogen or a $C_{1-4}$ alkyl radical.

In some embodiments, $R^7$ is a pentafluorophenyl radical and Z is nitrogen and $R^8$ is a $C_{1-4}$ alkyl radical.

In some embodiments, $R_7$ is a pentafluorophenyl radical and Z is nitrogen and $R^8$ taken together with the nitrogen forms an anilinium radical which is substituted by two $C_{1-4}$ alkyl radicals.

In some embodiments, the ionic activator is a boron ionic activator of Formula (5):

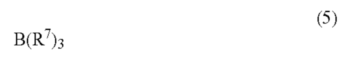

(5)

B is boron. Each $R^7$ is chosen independently from a phenyl radical which is unsubstituted or substituted with from 3 to 5 substituents chosen from a fluorine, a $C_{1-4}$ alkyl which is unsubstituted or substituted by a fluorine, or an alkoxy radical which is unsubstituted or substituted by a fluorine atom; and a silyl radical of the formula —Si—$(R^9)_3$; wherein each $R^9$ is independently chosen from a hydrogen or a $C_{1-4}$ alkyl radical.

In some embodiments, $R_7$ is a pentafluorophenyl radical.

In some embodiments the ionic activator is chosen from triethylammonium tetra(phenyl)boron; tripropylammonium tetra(phenyl)boron; tri(n-butyl)ammonium tetra(phenyl)boron; trimethylammonium tetra(p-tolyl)boron; trimethylammonium tetra(o-tolyl)boron; tributylammonium tetra(pentafluorophenyl)boron; tripropylammonium tetra(o,p-dimethylphenyl)boron; tributylammonium tetra(m,m-dimethylphenyl)boron; tributylammonium tetra(p-trifluoromethylphenyl)boron; tributylammonium tetra (pentafluorophenyl)boron; tri(n-butyl)ammonium tetra(o-tolyl)boron; N,N-dimethylanilinium tetra(phenyl)boron; N,N-diethylanilinium tetra(phenyl)boron; N,N-diethylanilinium tetra(phenyl)n-butylboron, N,N-2,4,6-pentamethylanilinium tetra(phenyl)boron; di-(isopropyl)ammonium tetra(pentafluorophenyl)boron; dicyclohexylammonium tetra(phenyl)boron, triphenylphosphonium tetra(phenyl)boron; tri(methylphenyl)phosphonium tetra(phenyl)boron; tri(dimethylphenyl)phosphonium tetra(phenyl)boron; tropillium tetrakispentafluorophenyl borate; triphenylmethylium tetrakispentafluorophenyl borate; benzene (diazonium) tetrakispentafluorophenyl borate; tropillium phenyltrispentafluorophenyl borate; triphenylmethylium phenyltrispentafluorophenyl borate; benzene (diazonium) phenyltrispentafluorophenyl borate; tropillium tetrakis (2,3,5,6-tetrafluorophenyl) borate; triphenylmethylium tetrakis (2,3,5,6-tetrafluorophenyl) borate; benzene (diazonium) tetrakis (3,4,5-trifluorophenyl) borate; tropillium tetrakis (3,4,5-trifluorophenyl) borate; benzene (diazonium) tetrakis (3,4,5-trifluorophenyl) borate; tropillium tetrakis (1,2,2-trifluoroethenyl) borate; triphenylmethylium tetrakis (1,2,2-trifluoroethenyl) borate; benzene (diazonium) tetrakis (1,2,2-trifluoroethenyl) borate; tropillium tetrakis (2,3,4,5-tetrafluorophenyl) borate; triphenylmethylium tetrakis (2,3,4,5-tetrafluorophenyl) borate; and benzene (diazonium) tetrakis (2,3,4,5-tetrafluorophenyl) borate; or a combination thereof.

In some embodiments, the ionic activator is chosen from N,N-dimethylaniliniumtetrakispentafluorophenyl borate; triphenylmethylium tetrakispentafluorophenyl borate; trispentafluorophenyl borane; or a combination thereof.

In some embodiments, the molar ratio of the ionic activator to the Ti, Zr, or Hf of the catalyst is from 1:1 to 3:1. For example, the molar ratio of the ionic activator to the Ti, Zr, or Hf of the catalyst can be from 1:1 to 1:2.

In some embodiments, the phosphinimine catalyst used to make the first polyethylene is cyclopentadienyl tri(tertiarybutyl)phosphinimine titanium dichloride, $Cp((t-Bu)_3PN)TiCl_2$, and the molar ratio of the ionic activator to the Ti is from 1:1 to 3:1 or from 1:1 to 1:2.

In some embodiments, the ionic activator is used in combination with an alkylating activator (which may also serve as a scavenger). The alkylating activator can be chosen from $(R^3)_pMgX_{2-p}$ wherein X is a halide and each $R^3$ is independently chosen from a $C_{1-10}$ alkyl radical and p is 1 or 2; $R^3Li$ wherein $R^3$ is a $C_{1-10}$ alkyl radical, $(R^3)_qZ_nX_{2-q}$ wherein each $R^3$ is independently chosen from a $C_{1-10}$ alkyl radical, X is a halogen and q is 1 or 2; $(R^3)_sAlX_{3-s}$ wherein each $R^3$ is independently chosen from a $C_{1-10}$ alkyl radical, X is halogen, and s is an integer from 1 to 3. In some embodiments, $R^3$ in the above compounds is a $C_{1-4}$ alkyl radical, and X is chlorine. Commercially available compounds include triethyl aluminum (TEAL), diethyl aluminum chloride (DEAC), dibutyl magnesium ($(Bu)_2Mg$), and butyl ethyl magnesium (BuEtMg).

In some embodiments, the catalyst formulation includes cyclopentadienyl tri(tertiarybutyl)phosphinimine titanium dichloride, $Cp((t-Bu)_3PN)TiCl_2$, methylalumoxane (MAO), and trityl tetrakis(pentafluorophenyl)borate. In some embodiments, the catalyst formulation includes cyclopentadienyl tri(tertiarybutyl)phosphinimine titanium dichloride, $Cp((t-Bu)_3PN)TiCl_2$, methylalumoxane (MAO), trityl tetrakis(pentafluorophenyl)borate, and 2,6-di-tert-butyl-4-ethylphenol.

In some embodiments, the catalyst formulation includes cyclopentadienyl tri(tertiarybutyl)phosphinimine titanium dichloride, $Cp((t-Bu)_3PN)TiCl_2$, modified methylalumoxane (MMAO), and trityl tetrakis(pentafluorophenyl) borate wherein the ratio of trityl tetrakis(pentafluorophenyl) borate to $Cp((t-Bu)_3PN)TiCl_2$ is from 1:0.5 to 1:2.0 and the ratio of MMAO to $Cp((t-Bu)_3PN)TiCl_2$ is from 10:1 to 150:1. For example, the catalyst formulation can include cyclopentadienyl tri(tertiarybutyl)phosphinimine titanium dichloride, $Cp((t-Bu)_3PN)TiCl_2$, modified methylalumoxane (MMAO), and trityl tetrakis(pentafluorophenyl) borate wherein the ratio of trityl tetrakis(pentafluorophenyl) borate to $Cp((t-Bu)_3PN)TiCl_2$ is from 1:0.1 to 1:1.3 and the ratio of MMAO to $Cp((t-Bu)_3PN)TiCl_2$ is from 25:1 to 100:1.

In some embodiments, the catalyst formulation includes cyclopentadienyl tri(tertiarybutyl)phosphinimine titanium dichloride, $Cp((t-Bu)_3PN)TiCl_2$, modified methylalumoxane (MMAO), trityl tetrakis(pentafluorophenyl)borate, and 2,6-di-tert-butyl-4-ethylphenol, wherein the ratio of trityl tetrakis(pentafluorophenyl)borate to $Cp((t-Bu)_3PN)TiCl_2$ is from 1:0.5 to 1:2.0, the ratio of MMAO to $Cp((t-Bu)_3PN)TiCl_2$ is from 10:1 to 150:1, and the ratio of MMAO to 2,6-di-tert-butyl-4-ethylphenol is from 0:1 to 1:1.

For example the catalyst formulation can include cyclopentadienyl tri(tertiarybutyl)phosphinimine titanium dichloride, $Cp((t-Bu)_3PN)TiCl_2$, modified methylalumoxane (MMAO), trityl tetrakis(pentafluorophenyl)borate, and 2,6-di-tert-butyl-4-ethylphenol, wherein the ratio of trityl tetrakis(pentafluorophenyl)borate to $Cp((t-Bu)_3PN)TiCl_2$ is from 1:0.5 to 1:2.0, the ratio of MMAO to $Cp((t-Bu)_3PN)TiCl_2$ is from 10:1 to 150:1, and the ratio of MMAO to 2,6-di-tert-butyl-4-ethylphenol is from 0:1 to 0.4:1.

This disclosure is further illustrated by the following embodiments, which are not intended to limit the claims.

Embodiment 1: An ethylene interpolymer composition including a first ethylene interpolymer, a second ethylene interpolymer, and a third ethylene interpolymer, wherein the ethylene interpolymer composition has a density of at least 0.945 g/cm$^3$; an environmental stress crack resistance (ESCR), measured according to ASTM D1693, Condition B, 10% IGEPAL CO-360, of at least 90 hours; and an IZOD impact strength of greater than 1.5 ft·lb/inch.

Embodiment 2. The ethylene interpolymer composition of Embodiment 1, wherein the density of the ethylene interpolymer composition is from 0.945 g/cm$^3$ to 0.949 g/cm$^3$.

Embodiment 3. The ethylene interpolymer composition of Embodiment 1, wherein the density of the ethylene interpolymer composition is from 0.949 g/cm$^3$ to 0.953 g/cm$^3$.

Embodiment 4. The ethylene interpolymer composition of Embodiment 1, wherein the density of the ethylene interpolymer composition is from 0.953 g/cm$^3$ to 0.957 g/cm$^3$.

Embodiment 5. The ethylene interpolymer composition of any one of Embodiments 1-4, wherein the ethylene interpolymer composition has a melt index, $I_2$, of at least 0.5 g/10 min.

Embodiment 6. The ethylene interpolymer composition of any one of Embodiments 1-4, wherein the ethylene interpolymer composition has a melt index, $I_2$, from 0.5-10 g/10 min.

Embodiment 7. The ethylene interpolymer composition of any one of Embodiments 1-4, wherein the ethylene interpolymer composition has a melt index, $I_2$, from 0.5-5 g/10 min.

Embodiment 8. The ethylene interpolymer composition of any one of Embodiments 1-7, wherein the ethylene interpolymer composition has a number average molecular weight, $M_n$, from 10,000 to 40,000.

Embodiment 9. The ethylene interpolymer composition of any one of Embodiments 1-7, wherein the ethylene interpolymer composition has a number average molecular weight, $M_n$, from 14,000 to 20,000.

Embodiment 10. The ethylene interpolymer composition of any one of Embodiments 1-9, wherein the ethylene interpolymer composition has a weight-average molecular weight, $M_w$, from 40,000 to 150,000.

Embodiment 11. The ethylene interpolymer composition of any one of Embodiments 1-9, wherein the ethylene interpolymer composition has a weight-average molecular weight, $M_w$, from 90,000 to 100,000.

Embodiment 12. The ethylene interpolymer composition of any one of Embodiments 1-11, wherein the ethylene interpolymer composition has a z-average molecular weight, $M_z$, from 200,000 to 800,000.

Embodiment 13. The ethylene interpolymer composition of any one of Embodiments 1-11, wherein the ethylene interpolymer composition has a z-average molecular weight, $M_z$, from 240,000 to 260,000.

Embodiment 14. The ethylene interpolymer composition of any one of Embodiments 1-13, wherein the ethylene interpolymer composition has a polydispersity index ($M_w$/$M_n$) from 3 to 11.

Embodiment 15. The ethylene interpolymer composition of any one of Embodiments 1-13, wherein the ethylene interpolymer composition has a polydispersity index ($M_w$/$M_n$) from 5 to 6.

Embodiment 16. The ethylene interpolymer composition of any one of Embodiments 1-15, wherein the ethylene interpolymer composition has an ESCR from 90 hours to 500 hours, as measured according to ASTM D1693, Condition B, 10% IGEPAL CO-360.

Embodiment 17. The ethylene interpolymer composition of any one of Embodiments 1-15, wherein the ethylene interpolymer composition has an ESCR from 130 hours to 160 hours, as measured according to ASTM D1693, Condition B, 10% IGEPAL CO-360.

Embodiment 18. The ethylene interpolymer composition of any one of Embodiments 1-17, wherein the Izod impact strength of the ethylene interpolymer composition is from 1.5 ft·lb/$in^2$ to 10 ft·lb/$in^2$.

Embodiment 19. The ethylene interpolymer composition of any one of Embodiments 1-17, wherein the Izod impact strength of the ethylene interpolymer composition is from 1.5 ft·lb/$in^2$ to 3 ft·lb/$in^2$.

Embodiment 20. The ethylene interpolymer composition of any one of Embodiments 1-19, wherein the ethylene interpolymer has a tensile impact of at least 150 ft·lb/$in^2$.

Embodiment 21. The ethylene interpolymer composition of any one of Embodiments 1-19, wherein the ethylene interpolymer has a tensile impact from 200 ft·lb/$in^2$ to 250 ft·lb/$in^2$.

Embodiment 22. The ethylene interpolymer composition of any one of Embodiments 1-21, wherein the ethylene interpolymer has a flex modulus (1% secant) of at least 1,000 MPa.

Embodiment 23. The ethylene interpolymer composition of any one of Embodiments 1-21, wherein the ethylene interpolymer has a flex modulus (1% secant) from 1,000-1,200 MPa.

Embodiment 24. The ethylene interpolymer composition of any one of Embodiments 1-13, wherein at least one of the first ethylene interpolymer, the second ethylene interpolymer, or the third ethylene interpolymer includes an α-olefin chosen from butene, pentene, hexene, heptene, octene, nonene, decene, or a combination thereof.

Embodiment 25. The ethylene interpolymer composition of any one of Embodiments 1-23, wherein at least one of the first ethylene interpolymer, the second ethylene interpolymer, or the third ethylene interpolymer includes 1-octene.

Embodiment 26. The ethylene interpolymer composition of any one of Embodiments 1-25, wherein at least one of the first ethylene interpolymer, the second ethylene interpolymer, or the third ethylene interpolymer includes an α-olefin chosen from butene, pentene, hexene, heptene, octene, nonene, decene, or a combination thereof; and the α-olefin is present in an amount from 0.05 mol. % to 5 mol. % of the ethylene interpolymer composition.

Embodiment 27. The ethylene interpolymer composition of any one of Embodiments 1-26, wherein at least one of the first ethylene interpolymer, the second ethylene interpolymer, or the third ethylene interpolymer includes an α-olefin chosen from butene, pentene, hexene, heptene, octene, nonene, decene, or a combination thereof; and the α-olefin is present in an amount from 1.8 mol. % to 2.8 mol. % of the ethylene interpolymer composition.

Embodiment 28. The ethylene interpolymer composition of any one of Embodiments 1-26, wherein at least one of the first ethylene interpolymer, the second ethylene interpolymer, or the third ethylene interpolymer includes 1-octene and the 1-octene is present in an amount from 0.05 mol. % to 5 mol. % of the ethylene interpolymer composition.

Embodiment 29. The ethylene interpolymer composition of any one of Embodiments 1-26, wherein at least one of the first ethylene interpolymer, the second ethylene interpolymer, or the third ethylene interpolymer includes 1-octene and the 1-octene is present in an amount from 1.8 mol. % to 2.8 mol. % of the ethylene interpolymer composition.

Embodiment 30. The ethylene interpolymer composition of any one of Embodiments 1-29, wherein the ethylene interpolymer composition has a bimodal profile in a gel permeation chromatograph.

Embodiment 31. The ethylene interpolymer composition of any one of Embodiments 1-30, wherein the ethylene interpolymer composition further includes a catalyst residue.

Embodiment 32. The ethylene interpolymer composition of any one of Embodiments 1-30, wherein the ethylene interpolymer composition further includes at least one catalyst residue chosen from titanium, aluminum, magnesium, and chlorine.

Embodiment 33. The ethylene interpolymer composition of Embodiment 32, wherein the ethylene interpolymer composition includes from 0.100 parts per million (ppm) to 1.000 ppm titanium.

Embodiment 34. The ethylene interpolymer composition of Embodiment 32, wherein the ethylene interpolymer composition includes from 0.200 ppm to 0.400 ppm titanium.

Embodiment 35. The ethylene interpolymer composition of any one of Embodiments 32-34, wherein the ethylene interpolymer composition includes from 1.00 ppm aluminum to 10.00 ppm aluminum.

Embodiment 36. The ethylene interpolymer composition of any one of Embodiments 32-34, wherein the ethylene interpolymer composition includes from 5.00 ppm aluminum to 6.00 ppm aluminum.

Embodiment 37. The ethylene interpolymer composition of any one of Embodiments 32-36, wherein the ethylene interpolymer composition includes less than 2.0 ppm magnesium.

Embodiment 38. The ethylene interpolymer composition of any one of Embodiments 32-37, wherein the ethylene interpolymer composition includes from 0.100 ppm chlorine to 1.000 ppm chlorine.

Embodiment 39. The ethylene interpolymer composition of any one of Embodiments 32-37, wherein the ethylene interpolymer composition includes from 0.300 ppm to 0.600 ppm chlorine.

Embodiment 40. The ethylene interpolymer composition of any one of Embodiments 1-39, wherein the first interpolymer includes 15 wt. % to 60 wt. % of the ethylene interpolymer composition.

Embodiment 41. The ethylene interpolymer composition of any one of Embodiments 1-39, wherein the first interpolymer includes 35 wt. % to 50 wt. % of the ethylene interpolymer composition.

Embodiment 42. The ethylene interpolymer composition of any one of Embodiments 1-39, wherein the first interpolymer includes 40 wt. % to 45 wt. % of the ethylene interpolymer composition.

Embodiment 43. The ethylene interpolymer composition of any one of Embodiments 1-42, wherein the first interpolymer has a polydispersity ($M_w/M_n$) less than 3.

Embodiment 44. The ethylene interpolymer composition of any one of Embodiments 1-42, wherein the first interpolymer has a polydispersity ($M_w/M_n$) from 1.5 to 3.

Embodiment 45. The ethylene interpolymer composition of any one of Embodiments 1-44, wherein the first interpolymer has a weight average molecular weight, $M_w$, from 100,000 to 400,000.

Embodiment 46. The ethylene interpolymer composition of any one of Embodiments 1-44, wherein the first interpolymer has a weight average molecular weight, $M_w$, from 150,000 to 300,000.

Embodiment 47. The ethylene interpolymer composition of any one of Embodiments 1-46, wherein the first interpolymer has a number average molecular weight, $M_n$, from 10,000 to 250,000.

Embodiment 48. The ethylene interpolymer composition of any one of Embodiments 1-46, wherein the first interpolymer has a number average molecular weight, $M_n$, from 50,000 to 200,000.

Embodiment 49. The ethylene interpolymer composition of any one of Embodiments 1-48, wherein the first interpolymer has a z-average molecular weight, $M_z$, from 200,000 to 500,000.

Embodiment 50. The ethylene interpolymer composition of any one of Embodiments 1-48, wherein the first interpolymer has a z-average molecular weight, $M_z$, from 250,000 to 400,000.

Embodiment 51. The ethylene interpolymer composition of any one of Embodiments 1-50, wherein the first interpolymer has a melt index, $I_2$, less than 0.4.

Embodiment 52. The ethylene interpolymer composition of any one of Embodiments 1-50, wherein the first interpolymer has a melt index, $I_2$, from 0.01 g/10 min to 0.4 g/10 min.

Embodiment 53. The ethylene interpolymer composition of any one of Embodiments 1-52, wherein the first interpolymer has a density from 0.900 g/cm$^3$ to 0.945 g/cm$^3$.

Embodiment 54. The ethylene interpolymer composition of any one of Embodiments 1-52, wherein the first interpolymer has a density from 0.920 g/cm$^3$ to 0.940 g/cm$^3$.

Embodiment 55. The ethylene interpolymer composition of any one of Embodiments 1-54, wherein the second interpolymer includes 30 wt. % to 85 wt. % of the ethylene interpolymer composition.

Embodiment 56. The ethylene interpolymer composition of any one of Embodiments 1-54, wherein the second interpolymer includes 45 wt. % to 75 wt. % of the ethylene interpolymer composition.

Embodiment 57. The ethylene interpolymer composition of any one of Embodiments 1-54, wherein the second interpolymer includes 50 wt. % to 60 wt. % of the ethylene interpolymer composition.

Embodiment 58. The ethylene interpolymer composition of any one of Embodiments 1-57, wherein the second interpolymer has a polydispersity ($M_w/M_n$) of at least 2.

Embodiment 59. The ethylene interpolymer composition of any one of Embodiments 1-57, wherein the second interpolymer has a polydispersity ($M_w/M_n$) from 2 to 5.

Embodiment 60. The ethylene interpolymer composition of any one of Embodiments 1-59, wherein the second interpolymer has a weight average molecular weight, $M_w$, from 5,000 to 60,000.

Embodiment 61. The ethylene interpolymer composition of any one of Embodiments 1-59, wherein the second interpolymer has a weight average molecular weight, $M_w$, from 10,000 to 50,000.

Embodiment 62. The ethylene interpolymer composition of any one of Embodiments 1-59, wherein the second interpolymer has a weight average molecular weight, $M_w$, from 10,000 to 40,000.

Embodiment 63. The ethylene interpolymer composition of any one of Embodiments 1-62, wherein the second interpolymer has a number average molecular weight, $M_n$, from 3,000 to 20,000.

Embodiment 64. The ethylene interpolymer composition of any one of Embodiments 1-62, wherein the second interpolymer has a number average molecular weight, $M_n$, from 5,000 to 15,000.

Embodiment 65. The ethylene interpolymer composition of any one of Embodiments 1-64, wherein the second interpolymer has a z-average molecular weight, $M_z$, from 10,000 to 70,000.

Embodiment 66. The ethylene interpolymer composition of any one of Embodiments 1-64, wherein the second interpolymer has a z-average molecular weight, $M_z$, from 15,000 to 45,000.

Embodiment 67. The ethylene interpolymer composition of any one of Embodiments 1-66, wherein the second interpolymer has a melt index, $I_2$, greater than 1 g/10 min.

Embodiment 68. The ethylene interpolymer composition of any one of Embodiments 1-66, wherein the second interpolymer has a melt index, $I_2$, from 1 g/10 min to 10,000 g/10 min.

Embodiment 69. The ethylene interpolymer composition of any one of Embodiments 1-66, wherein the second interpolymer has a melt index, $I_2$, up to 7,000 g/10 min.

Embodiment 70. The ethylene interpolymer composition of any one of Embodiments 1-69, wherein the second interpolymer has a density from 0.945 g/cm$^3$ to 0.975 g/cm$^3$.

Embodiment 71. The ethylene interpolymer composition of any one of Embodiments 1-69, wherein the second interpolymer has a density from 0.950 g/cm$^3$ to 0.975 g/cm$^3$.

Embodiment 72. The ethylene interpolymer composition of any one of Embodiments 1-71, wherein the third interpolymer includes up to 30 wt. % of the ethylene interpolymer composition.

Embodiment 73. The ethylene interpolymer composition of any one of Embodiments 1-71, wherein the third interpolymer includes 10 wt. % to 30 wt. % of the ethylene interpolymer composition.

Embodiment 74. The ethylene interpolymer composition of any one of Embodiments 1-71, wherein the third interpolymer includes 10 wt. % to 20 wt. % of the ethylene interpolymer composition.

Embodiment 75. The ethylene interpolymer composition of any one of Embodiments 1-74, wherein the third interpolymer has a polydispersity ($M_w$/Ma) less than 3.

Embodiment 76. The ethylene interpolymer composition of any one of Embodiments 1-74, wherein the third interpolymer has a polydispersity ($M_w/M_n$) from 1.5 to 3.

Embodiment 77. The ethylene interpolymer composition of any one of Embodiments 1-76, wherein the third interpolymer has a weight average molecular weight, $M_w$, from 25,000 to 90,000.

Embodiment 78. The ethylene interpolymer composition of any one of Embodiments 1-76, wherein the third interpolymer has a weight average molecular weight, $M_w$, from 30,000 to 75,000.

Embodiment 79. The ethylene interpolymer composition of any one of Embodiments 1-76, wherein the third interpolymer has a weight average molecular weight, $M_w$, from 30,000 to 60,000.

Embodiment 80. The ethylene interpolymer composition of any one of Embodiments 1-79, wherein the third interpolymer has a number average molecular weight, $M_n$, from 10,000 to 50,000.

Embodiment 81. The ethylene interpolymer composition of any one of Embodiments 1-79, wherein the third interpolymer has a number average molecular weight, $M_n$, from 10,000 to 40,000.

Embodiment 82. The ethylene interpolymer composition of any one of Embodiments 1-81, wherein the third interpolymer has a z-average molecular weight, $M_z$, from 50,000 to 100,000.

Embodiment 83. The ethylene interpolymer composition of any one of Embodiments 1-82, wherein the third interpolymer has a z-average molecular weight, $M_z$, from 50,000 to 85,000.

Embodiment 84. The ethylene interpolymer composition of any one of Embodiments 1-83, wherein the third interpolymer has a melt index, $I_2$, from 0.5 g/10 min to 200 g/10 min.

Embodiment 85. The ethylene interpolymer composition of any one of Embodiments 1-83, wherein the third interpolymer has a melt index, $I_2$, from 0.5 g/10 min to 100 g/10 min.

Embodiment 86. The ethylene interpolymer composition of any one of Embodiments 1-83, wherein the third interpolymer has a melt index, $I_2$, from 0.5 g/10 min to 30 g/10 min.

Embodiment 87. The ethylene interpolymer composition of any one of Embodiments 1-86, wherein the third interpolymer has a density from 0.940 g/cm$^3$ to 0.975 g/cm$^3$.

Embodiment 88. The ethylene interpolymer composition of any one of Embodiments 1-86, wherein the third interpolymer has a density from 0.945 g/cm$^3$ to 0.965 g/cm$^3$.

Embodiment 89. The ethylene interpolymer composition of any one of Embodiments 1-88, wherein the ethylene interpolymer composition includes 10 wt. % to 60 wt. % of the first ethylene interpolymer; 30 wt. % to 90 wt. % of the second ethylene interpolymer; and up to 30 wt. % of the third ethylene interpolymer.

Embodiment 90. The ethylene interpolymer composition of any one of Embodiments 1-88, wherein the ethylene interpolymer composition includes 15 wt. % to 60 wt. % of the first ethylene interpolymer; 30 wt. % to 90 wt. % of the second ethylene interpolymer; and 10 wt. % to 20 wt. % of the third ethylene interpolymer.

Embodiment 91. The ethylene interpolymer composition of any one of Embodiments 1-90, wherein the first ethylene interpolymer has a density from 0.900 g/cm$^3$ to 0.945 g/cm$^3$, the second ethylene interpolymer has a density from 0.930 g/cm$^3$ to 0.980 g/cm$^3$, and the third ethylene interpolymer has a density greater than that of the first and the second interpolymers.

Embodiment 92. The ethylene interpolymer composition of any one of Embodiments 1-90, wherein the first ethylene interpolymer has a density of 0.920 g/cm$^3$ to 0.945 g/cm$^3$, the second ethylene interpolymer has a density of 0.940 g/cm$^3$ to 0.970 g/cm$^3$, and the third ethylene interpolymer has a density greater than that of the first and the second interpolymers.

Embodiment 93. The ethylene interpolymer composition of any one of Embodiments 1-92, wherein the first ethylene interpolymer includes a number-average molecular weight, $M_n$, of 50,000 to 200,000; the second ethylene interpolymer includes a number-average molecular weight, $M_n$, from 5,000 to 15,000; and the third ethylene interpolymer includes a number-average molecular weight, $M_n$, from 10,000 to 50,000.

Embodiment 94. The ethylene interpolymer composition of any one of Embodiments 1-92, wherein the first ethylene interpolymer has a weight average molecular weight, $M_w$, from 175,000 to 225,000; the second ethylene interpolymer has a weight average molecular weight, $M_w$, from 10,000 to 25,000; and the third ethylene interpolymer has a weight average molecular weight, $M_w$, from 30,000 to 70,000.

Embodiment 95. The ethylene interpolymer composition of any one of Embodiments 1-94, wherein the first ethylene interpolymer has a z-average molecular weight, $M_z$, from 150,000 to 500,000; the second ethylene interpolymer has a z-average molecular weight, $M_z$, from 15,000 to 45,000, and the third ethylene interpolymer has a z-average molecular weight, $M_z$, from 45,000 to 150,000.

Embodiment 96. The ethylene interpolymer composition of any one of Embodiments 1-94, wherein the first ethylene interpolymer has a z-average molecular weight, $M_z$, from 250,000 to 350,000; the second ethylene interpolymer has a z-average molecular weight, $M_z$, from 17,000 to 30,000; and the third ethylene interpolymer has a z-average molecular weight, $M_z$, from 50,000 to 100,000.

Embodiment 97. The ethylene interpolymer composition of any one of Embodiments 1-96, wherein the first ethylene interpolymer has a polydispersity ($M_w/M_n$) less than 3, the second ethylene interpolymer has a polydispersity ($M_w/M_n$) of at least 2, and the third ethylene interpolymer has a polydispersity ($M_w/M_n$) less than 3.

Embodiment 98. The ethylene interpolymer composition of any one of Embodiments 1-96, wherein the first ethylene interpolymer has a polydispersity ($M_w/M_n$) less than 3, the second ethylene interpolymer has a polydispersity ($M_w/M_n$) of greater than 2, and the third ethylene interpolymer has a polydispersity ($M_w/M_n$) less than 3.

Embodiment 99. The ethylene interpolymer composition of any one of Embodiments 1-98 wherein the polydispersity ($M_w/M_n$) of the first ethylene interpolymer is less than each of the polydispersity ($M_w/M_n$) of the second ethylene interpolymer and the polydispersity ($M_w/M_n$) of the third ethylene interpolymer.

Embodiment 100. The ethylene interpolymer composition of any one of Embodiments 1-99, wherein the first ethylene interpolymer has a melt index, $I_2$, less than 0.4 g/10 min; the second ethylene interpolymer has a melt index, $I_2$, from 1 g/10 min to 10,000 g/10 min; and the third ethylene interpolymer has a melt index, $I_2$, from 10 g/10 min to 10,000 g/10 min.

Embodiment 101. The ethylene interpolymer composition of any one of Embodiments 1-99, wherein the first ethylene interpolymer has a melt index, $I_2$, less than 0.4 g/10 min; the second ethylene interpolymer has a melt index, $I_2$, from 1 g/10 min to 7,000 g/10 min; and the third ethylene interpolymer has a melt index, $I_2$, from 100 g/10 to 10,000 g/10 min.

Embodiment 102. The ethylene interpolymer composition of anyone of Embodiments 1-101, wherein the ethylene interpolymer composition is prepared by a process including melt blending a first interpolymer composition and a second interpolymer composition.

Embodiment 103. The ethylene interpolymer composition of Embodiment 102, wherein the first interpolymer composition includes from 5 wt. % to 80 wt. % of the ethylene interpolymer composition; and the second interpolymer composition includes from 20 wt. % to 95 wt. % of the ethylene interpolymer composition.

Embodiment 104. The ethylene interpolymer composition of Embodiment 102, wherein the first interpolymer composition includes from 25 wt. % to 35 wt. % of the ethylene interpolymer composition; and the second interpolymer composition includes from 65 wt. % to 75 wt. % of the ethylene interpolymer composition.

Embodiment 105. The ethylene interpolymer composition of any one of Embodiments 102-104, wherein the first interpolymer composition has a density of at least 0.940 g/cm$^3$; a melt index, $I_2$, from 1.25 g/10 min to 2.5 g/10 min; and a molecular weight distribution ($M_w/M_n$) from 3.0 to 6.0.

Embodiment 106. The ethylene interpolymer composition of Embodiment 105, wherein the first interpolymer composition has a density from 0.940 g/cm$^3$ to 0.949 g/cm$^3$.

Embodiment 107. The ethylene interpolymer composition of Embodiment 105, wherein the first interpolymer composition has a density from 0.945 g/cm$^3$ to 0.946 g/cm$^3$.

Embodiment 108. The ethylene interpolymer composition of any one of Embodiments 105-107, wherein the first interpolymer composition has a melt index, $I_2$, from 1.25 g/10 min to 2.5 g/10 min.

Embodiment 109. The ethylene interpolymer composition of any one of Embodiments 105-107, wherein the first interpolymer composition has a melt index, $I_2$, from 1.5 g/10 min to 2.0 g/10 min.

Embodiment 110. The ethylene interpolymer composition of any one of Embodiments 105-109, wherein the first interpolymer composition has a melt index, $I_6$, from 2.0 g/10 min to 20.0 g/10 min.

Embodiment 111. The ethylene interpolymer composition of any one of Embodiments 105-109, wherein the first interpolymer composition has a melt index, $I_6$, from 6.0 g/10 min to 9.0 g/10 min.

Embodiment 112. The ethylene interpolymer composition of any one of Embodiments 105-111, wherein the first interpolymer composition has a melt index, $I_{10}$, from 5.0 g/10 min to 25.0 g/10 min.

Embodiment 113. The ethylene interpolymer composition of any one of Embodiments 105-111, wherein the first interpolymer composition has a melt index, $I_{10}$, from 12.0 g/10 min to 18.0 g/10 min.

Embodiment 114. The ethylene interpolymer composition of any one of Embodiments 105-113, wherein the first interpolymer composition has a high load melt index, $I_{21}$, from 30.0 g/10 min to 100.0 g/10 min.

Embodiment 115. The ethylene interpolymer composition of any one of Embodiments 105-113, wherein the first interpolymer composition has a high load melt index, $I_{21}$, from 60.0 g/10 min to 70.0 g/10 min.

Embodiment 116. The ethylene interpolymer composition of any one of Embodiments 105-115, wherein the first interpolymer composition has a melt flow ratio ($I_{21}/I_2$) from 20 to 50.

Embodiment 117. The ethylene interpolymer composition of any one of Embodiments 105-115, wherein the first interpolymer composition has a melt flow ratio ($I_{21}/I_2$) from 30 to 40.

Embodiment 118. The ethylene interpolymer composition of any one of Embodiments 105-117, wherein the first interpolymer composition has a polydispersity index, $M_w/M_n$, from 2.0 to 9.0.

Embodiment 119. The ethylene interpolymer composition of any one of Embodiments 105-118, wherein the first interpolymer composition has a polydispersity index, $M_w/M_n$, from 4.25 to 4.75.

Embodiment 120. The ethylene interpolymer composition of any one of Embodiments 105-119, wherein the first interpolymer composition has a number average molecular weight, $M_n$, of less than 40,000.

Embodiment 121. The ethylene interpolymer composition of any one of Embodiments 105-119, wherein the first interpolymer composition has a number average molecular weight, $M_n$, from 10,000 to 40,000.

Embodiment 122. The ethylene interpolymer composition of any one of Embodiments 105-119, wherein the first interpolymer composition has a number average molecular weight, $M_n$, from 17,000 to 23,000.

Embodiment 123. The ethylene interpolymer composition of any one of Embodiments 105-122, wherein the first interpolymer composition has a weight average molecular weight, $M_w$, from 60,000 to 120,000.

Embodiment 124. The ethylene interpolymer composition of any one of Embodiments 105-122, wherein the first interpolymer composition has a weight average molecular weight, $M_w$, from 90,000 to 96,000.

Embodiment 125. The ethylene interpolymer composition of any one of Embodiments 105-124, wherein the first interpolymer composition has a Z-average molecular weight, $M_z$, 150,000 to 350,000.

Embodiment 126. The ethylene interpolymer composition of any one of Embodiments 105-124, wherein the first interpolymer composition has a Z-average molecular weight, $M_z$, 255,000 to 275,000.

Embodiment 127. The ethylene interpolymer composition of any one of Embodiments 105-126, wherein the first interpolymer composition has a stress exponent of less than 1.5.

Embodiment 128. The ethylene interpolymer composition of any one of Embodiments 105-126, wherein the first interpolymer composition has a stress exponent from 1.2 to 1.45.

Embodiment 129. The ethylene interpolymer composition of any one of Embodiments 105-128, wherein the first interpolymer composition has a comonomer content from 0.01 mol. % to 1.0 mol. % as measured by FTIR.

Embodiment 130. The ethylene interpolymer composition of any one of Embodiments 105-128, wherein the first interpolymer composition has a comonomer content from 0.4 mol. % to 0.6 mol. % as measured by FTIR.

Embodiment 131. The ethylene interpolymer composition of any one of Embodiments 105-128, wherein the first interpolymer composition has a comonomer content from 1.6 wt. % to 2.6 wt. % as measured by FTIR.

Embodiment 132. The ethylene interpolymer composition of any one of Embodiments 105-128, wherein the first interpolymer composition has a comonomer content from 1.9 wt. % to 2.3 wt. % as measured by FTIR.

Embodiment 133. The ethylene interpolymer composition of any one of Embodiments 105-132, wherein the comonomer includes a comonomer chosen from 1-butene, 1-hexene, 1-octene, or a combination thereof.

Embodiment 134. The ethylene interpolymer composition of any one of Embodiments 105-132, wherein the comonomer is 1-octene.

Embodiment 135. The ethylene interpolymer composition of any one of Embodiments 105-134, wherein the first interpolymer composition has a hexane extractables level below 0.55 wt. %.

Embodiment 136. The ethylene interpolymer composition of any one of Embodiments 105-134, wherein the first interpolymer composition has a hexane extractables level below 0.30 wt. %.

Embodiment 137. The ethylene interpolymer composition of any one of Embodiments 105-136, wherein the first interpolymer composition has a primary melting peak from 126° C. to 129° C., as determined by differential scanning calorimetry.

Embodiment 138. The ethylene interpolymer composition of any one of Embodiments 105-137, wherein the first interpolymer composition has a heat of fusion from 175 J/g to 210 J/g, as determined by differential scanning calorimetry.

Embodiment 139. The ethylene interpolymer composition of any one of Embodiments 105-138, wherein the first interpolymer composition has a heat of fusion from 188 J/g to 198 J/g, as determined by differential scanning calorimetry.

Embodiment 140. The ethylene interpolymer composition of any one of Embodiments 105-139, wherein the first interpolymer composition has a molecular weight distribution, $M_w/M_n$, from 2.0 to 9.0; a density from 0.940 g/cm$^3$ to 0.949 g/cm$^3$; a melt index $I_2$, of from 1.25 g/10 min to 2.5 g/10 min; a comonomer content of less than 0.01 mol. % as determined by $^{13}$C NMR; an $M_z$ of less than 275,000; a stress exponent of less than 1.50.

Embodiment 141. The ethylene interpolymer composition of any one of Embodiments 105-140, wherein the first interpolymer composition is bimodal.

Embodiment 142. The ethylene interpolymer composition of any one of Embodiments 105-141, wherein the first interpolymer composition includes a first ethylene interpolymer and a second ethylene interpolymer.

Embodiment 143. The ethylene interpolymer composition of Embodiment 142, wherein the first interpolymer composition includes 20 wt. % to 50 wt. % of the first ethylene interpolymer and 50 wt. % to 80 wt. % of the second ethylene interpolymer.

Embodiment 144. The ethylene interpolymer composition of Embodiment 142, wherein the first interpolymer composition includes 30 wt. % to 40 wt. % of the first ethylene interpolymer and 60 wt. % to 70 wt. % of the second ethylene interpolymer.

Embodiment 145. The ethylene interpolymer composition of any one of Embodiments 142-144, wherein the first ethylene interpolymer of the first interpolymer composition has a $M_w$ of at least 120,000.

Embodiment 146. The ethylene interpolymer composition of any one of Embodiments 142-144, wherein the first ethylene interpolymer of the first interpolymer composition has a $M_w$ from 140,000 to 300,000.

Embodiment 147. The ethylene interpolymer composition of any one of Embodiments 142-144, wherein the first ethylene interpolymer of the first interpolymer composition has a $M_w$ from 160,000 to 240,000.

Embodiment 148. The ethylene interpolymer composition of any one of Embodiments 142-147, wherein the first ethylene interpolymer of the first interpolymer composition has a density from 0.918 g/cm$^3$ to 0.934 g/cm$^3$.

Embodiment 149. The ethylene interpolymer composition of any one of Embodiments 142-147, wherein the first ethylene interpolymer of the first interpolymer composition has a density from 0.920 g/cm$^3$ to 0.932 g/cm$^3$.

Embodiment 150. The ethylene interpolymer composition of any one of Embodiments 142-147, wherein the first ethylene interpolymer of the first interpolymer composition has a density from 0.922 g/cm$^3$ to 0.932 g/cm$^3$.

Embodiment 151. The ethylene interpolymer composition of any one of Embodiments 142-150, wherein the first ethylene interpolymer of the first interpolymer composition has a degree of short chain branching per 1,000 carbons from 1.5 to 5.

Embodiment 152. The ethylene interpolymer composition of any one of Embodiments 142-150, wherein the first ethylene interpolymer of the first interpolymer composition has a degree of short chain branching per 1,000 carbons from 1.8 to 5.

Embodiment 153. The ethylene interpolymer composition of any one of Embodiments 142-150, wherein the first ethylene interpolymer of the first interpolymer composition has a degree of short chain branching per 1,000 carbons from 1.8 to 4.

Embodiment 154. The ethylene interpolymer composition of any one of Embodiments 142-153, wherein the second ethylene interpolymer of the first interpolymer composition has a $M_w$ of less than 100,000.

Embodiment 155. The ethylene interpolymer composition of any one of Embodiments 142-153, wherein the second ethylene interpolymer of the first interpolymer composition has a $M_w$ from 20,000 to 80,000.

Embodiment 156. The ethylene interpolymer composition of any one of Embodiments 142-153, wherein the second ethylene interpolymer of the first interpolymer composition has a $M_w$ from 25,000 to 50,000.

Embodiment 157. The ethylene interpolymer composition of any one of Embodiments 142-156, wherein the second ethylene interpolymer of the first interpolymer composition has a density of at least 0.942 g/cm$^3$.

Embodiment 158. The ethylene interpolymer composition of any one of Embodiments 142-156, wherein the second ethylene interpolymer of the first interpolymer composition has a density from 0.945 g/cm$^3$ to 0.946 g/cm$^3$.

Embodiment 159. The ethylene interpolymer composition of any one of Embodiments 142-156, wherein the second ethylene interpolymer of the first interpolymer composition has a density from 0.950 g/cm$^3$ to 0.958 g/cm$^3$.

Embodiment 160. The ethylene interpolymer composition of any one of Embodiments 142-159, wherein the difference in the density between the first ethylene interpolymer of the first interpolymer composition and the density of the second ethylene interpolymer of the first interpolymer composition is less than 0.030 g/cm$^3$.

Embodiment 161. The ethylene interpolymer composition of any one of Embodiments 142-159, wherein the difference in the density between the first ethylene interpolymer of the first interpolymer composition and the density of the second ethylene interpolymer of the first interpolymer composition is less than 0.025 g/cm$^3$ to 0.029 g/cm$^3$.

Embodiment 162. The ethylene interpolymer composition of any one of Embodiments 142-161, wherein the second ethylene interpolymer of the first interpolymer composition has a degree of short chain branching per 1,000 carbons from 0.50 to 0.95.

Embodiment 163. The ethylene interpolymer composition of any one of Embodiments 142-161, wherein the second ethylene interpolymer of the first interpolymer composition has a degree of short chain branching per 1,000 carbons from 0.50 to 0.90.

Embodiment 164. The ethylene interpolymer composition of any one of Embodiments 102-163, wherein the second interpolymer composition has a density of at least 0.949 g/cm$^3$; a melt index, $I_2$, from 0.4 to 5.0 g/10 min; and a molecular weight distribution, $M_w/M_n$, from 3.0 to 11.0.

Embodiment 165. The ethylene interpolymer composition of Embodiment 164, wherein the second interpolymer composition has a density from 0.949 g/cm$^3$ to 0.960 g/cm$^3$.

Embodiment 166. The ethylene interpolymer composition of Embodiment 164, wherein the second interpolymer composition has a density from 0.952 g/cm$^3$ to 0.955 g/cm$^3$.

Embodiment 167. The ethylene interpolymer composition of any one of Embodiments 164-166, wherein the second interpolymer composition has a melt index, $I_2$, from 0.5 g/10 min to 3.0 g/10 min.

Embodiment 168. The ethylene interpolymer composition of any one of Embodiments 164-166, wherein the second interpolymer composition has a melt index, $I_2$, from 1.0 g/10 min to 1.2 g/10 min.

Embodiment 169. The ethylene interpolymer composition of any one of Embodiments 164-168, wherein the second interpolymer composition has a melt index, Is, of at least 1.0 g/min.

Embodiment 170. The ethylene interpolymer composition of any one of Embodiments 164-169, wherein the second interpolymer composition has a melt index, $I_6$, from 1 g/10 min to 10 g/10 min.

Embodiment 171. The ethylene interpolymer composition of any one of Embodiments 164-169, wherein the second interpolymer composition has a melt index, $I_6$, from 3 g/10 min to 7 g/10 min.

Embodiment 172. The ethylene interpolymer composition of any one of Embodiments 164-171, wherein the second interpolymer composition has a melt index, $I_{10}$, from 5 g/10 min to 15 g/10 min.

Embodiment 173. The ethylene interpolymer composition of any one of Embodiments 164-171, wherein the second interpolymer composition has a melt index, $I_1$, from 8 g/10 min to 12 g/10 min.

Embodiment 174. The ethylene interpolymer composition of any one of Embodiments 164-173, wherein the second interpolymer composition has a high load melt index, $I_{21}$, of at least 25 g/10 min.

Embodiment 175. The ethylene interpolymer composition of any one of Embodiments 164-173, wherein the second interpolymer composition has a high load melt index, $I_{21}$, from 25 g/10 min to 100 g/10 min.

Embodiment 176. The ethylene interpolymer composition of any one of Embodiments 164-173, wherein the second interpolymer composition has a high load melt index, $I_{21}$, from 60 g/10 min to 70 g/10 min.

Embodiment 177. The ethylene interpolymer composition of any one of Embodiments 164-176, wherein the second interpolymer composition has a melt flow ratio ($I_{21}/I_2$) of greater than 40.

Embodiment 178. The ethylene interpolymer composition of any one of Embodiments 164-176, wherein the second interpolymer composition has a melt flow ratio ($I_{21}/I_2$) from 45 to 90.

Embodiment 179. The ethylene interpolymer composition of any one of Embodiments 164-176, wherein the second interpolymer composition has a melt flow ratio ($I_{21}/I_2$) from 50 to 70.

Embodiment 180. The ethylene interpolymer composition of any one of Embodiments 164-179, wherein the second interpolymer composition has a molecular weight distribution, $M_w/M_n$, from 5.0 to 9.0.

Embodiment 181. The ethylene interpolymer composition of any one of Embodiments 164-179, wherein the second interpolymer composition has a molecular weight distribution, $M_w/M_n$, from 7.0 to 8.0.

Embodiment 182. The ethylene interpolymer composition of any one of Embodiments 164-181, wherein the second interpolymer composition has a number average molecular weight, $M_n$, of less than 30,000.

Embodiment 183. The ethylene interpolymer composition of any one of Embodiments 164-181, wherein the second interpolymer composition has a number average molecular weight, $M_n$, from 10,000 to 20,000.

Embodiment 184. The ethylene interpolymer composition of any one of Embodiments 164-181, wherein the second interpolymer composition has a number average molecular weight, $M_n$, from 11,000 to 15,000.

Embodiment 185. The ethylene interpolymer composition of any one of Embodiments 164-184, wherein the second interpolymer composition has a weight average molecular weight, $M_w$, from 50,000 to 150,000.

Embodiment 186. The ethylene interpolymer composition of any one of Embodiments 164-184, wherein the second interpolymer composition has a weight average molecular weight, $M_w$, from 80,000 to 120,000.

Embodiment 187. The ethylene interpolymer composition of any one of Embodiments 164-186, wherein the second interpolymer composition has a Z-average molecular weight, $M_z$, of less than 400,000.

Embodiment 188. The ethylene interpolymer composition of any one of Embodiments 164-186, wherein the second interpolymer composition has a Z-average molecular weight, $M_z$, of less than 350,000.

Embodiment 189. The ethylene interpolymer composition of any one of Embodiments 164-186, wherein the second interpolymer composition has a Z-average molecular weight, $M_z$, 200,000 to 300,000.

Embodiment 190. The ethylene interpolymer composition of any one of Embodiments 164-189, wherein the second interpolymer composition has a stress exponent of less than 1.50.

Embodiment 191. The ethylene interpolymer composition of any one of Embodiments 164-189, wherein the second interpolymer composition has a stress exponent from 1.2 to 1.45.

Embodiment 192. The ethylene interpolymer composition of any one of Embodiments 164-191, wherein the second interpolymer composition has a comonomer content from 0.01 mol. % to 0.75 mol. %, as measured by FTIR.

Embodiment 193. The ethylene interpolymer composition of any one of Embodiments 164-191, wherein the second interpolymer composition has a comonomer content from 0.3 mol % to 0.5 mol. %, as measured by FTIR.

Embodiment 194. The ethylene interpolymer composition of any one of Embodiments 164-191, wherein the second interpolymer composition has a comonomer content from 0.5 wt. % to 5 wt. %, as measured by FTIR.

Embodiment 195. The ethylene interpolymer composition of any one of Embodiments 164-191, wherein the second interpolymer composition has a comonomer content from 1.3 wt. % to 2.2 wt. %, as measured by FTIR.

Embodiment 196. The ethylene interpolymer composition of any one of Embodiments 164-195, wherein the second interpolymer composition has a hexane extractables level below 0.55 wt. %.

Embodiment 197. The ethylene interpolymer composition of any one of Embodiments 164-195, wherein the second interpolymer composition has a hexane extractables level below 0.40 wt. %.

Embodiment 198. The ethylene interpolymer composition of any one of Embodiments 164-197, wherein the second interpolymer composition has an ESCR Condition B (10% IGEPAL) of at least 20 hours.

Embodiment 199. The ethylene interpolymer composition of any one of Embodiments 164-198, wherein the second interpolymer composition has a molecular weight distribution, $M_w/M_n$, from 4.0 to 10.0; a density from 0.949 to 0.957 $g/cm^3$; a melt index $I_2$, of from 0.4 to 5.0 g/10 min; a comonomer content of less than 0.75 mol. % as determined by $^{13}C$ NMR; an $M_z$ of less than 400,000; a stress exponent of less than 1.50; and an ESCR Condition B (10% IGEPAL) of at least 20 hours.

Embodiment 200. The ethylene interpolymer composition of any one of Embodiments 164-199, wherein the second interpolymer composition includes a first ethylene interpolymer and a second ethylene interpolymer.

Embodiment 201. The ethylene interpolymer composition of any one of Embodiments 164-200, wherein the second interpolymer composition includes 10 wt. % to 70 wt. % of a first ethylene interpolymer having a melt index, $I_2$, of less than 0.4 g/10 min, a molecular weight distribution, $M_w/M_n$, of less than 3.0, and a density of from 0.920 to 0.955 $g/cm^3$; and 30 wt. % to 90 wt. % of a second ethylene interpolymer having a melt index, $I_2$, from 100 to 10,000 g/10 min, a molecular weight distribution, $M_w/M_n$, of less than 3.0, and a density higher than the density of the first ethylene interpolymer, but less than 0.967 $g/cm^3$; wherein the density of the second ethylene interpolymer is less than 0.037 $g/cm^3$ higher than the density of the first ethylene interpolymer; the ratio of short chain branching in the first ethylene interpolymer (SCB1) to the short chain branching in the second ethylene interpolymer (SCB2) is greater than 0.

Embodiment 202. The ethylene interpolymer composition of any one of Embodiments 164-201, wherein the second interpolymer composition includes 30 wt. % to 60 wt. % of a first ethylene interpolymer having a melt index, $I_2$, of less than 0.4 g/10 min, a molecular weight distribution, $M_w/M_n$, of less than 2.7; and a density of from 0.925 to 0.950 $g/cm^3$; and 40 wt. % to 70 wt. % of a second ethylene interpolymer having a melt index $I_2$, of from 100 to 10,000 g/10 min, a molecular weight distribution, $M_w/M_n$, of less than 2.7, and a density higher than the density of the first ethylene interpolymer, but less than 0.966 $g/cm^3$.

Embodiment 203. The ethylene interpolymer composition of any one of Embodiments 200-202, wherein the first ethylene interpolymer of the second interpolymer composition includes an alpha-olefin.

Embodiment 204. The ethylene interpolymer composition of Embodiment 203, wherein the alpha-olefin includes from 0.05 mol. % to 3.0 mol. % of the first ethylene interpolymer.

Embodiment 205. The ethylene interpolymer composition of Embodiment 203, wherein the alpha-olefin is chosen from 1-butene, 1-hexene, 1-octene, or a combination thereof.

Embodiment 206. The ethylene interpolymer composition of Embodiment 203, wherein the alpha-olefin includes 1-octene.

Embodiment 207. The ethylene interpolymer composition of any one of Embodiments 200-206, wherein the short chain branching of the first ethylene interpolymer of the second interpolymer composition is from 0.25 to 15 short chain branches per thousand carbon atoms (SCB1/1000 Cs).

Embodiment 208. The ethylene interpolymer composition of any one of Embodiments 200-207, wherein the comonomer content of the first ethylene interpolymer of the second interpolymer composition is within ±0.05 mol. % of the comonomer content of the second ethylene interpolymer.

Embodiment 209. The ethylene interpolymer composition of any one of Embodiments 200-208, wherein the mol. % of comonomer of the first ethylene interpolymer of the second interpolymer composition is greater than the mol. % of comonomer in the second ethylene interpolymer.

Embodiment 210. The ethylene interpolymer composition of anyone of Embodiments 200-209, wherein the short chain branching of the first ethylene interpolymer of the second interpolymer composition is within ±0.25 SCB/1000 Cs of the short chain branching in the second ethylene interpolymer.

Embodiment 211. The ethylene interpolymer composition of any one of Embodiments 200-210, wherein the melt index of the first ethylene interpolymer of the second interpolymer composition is from 0.01 g/10 min to 0.4 g/10 min.

Embodiment 212. The ethylene interpolymer composition of any one of Embodiments 200-211, wherein the weight average molecular weight, $M_w$, of the first ethylene interpolymer of the second interpolymer composition is from 110,000 to 225,000.

Embodiment 213. The ethylene interpolymer composition of any one of Embodiments 200-213, wherein the density of the first ethylene interpolymer of the second interpolymer composition is from 0.925 $g/cm^3$ to 0.955 $g/cm^3$.

Embodiment 214. The ethylene interpolymer composition of any one of Embodiments 200-212, wherein the first ethylene interpolymer of the second interpolymer composition has a molecular weight distribution of ≤2.7.

Embodiment 215. The ethylene interpolymer composition of any one of Embodiments 200-214, wherein the first ethylene interpolymer of the second interpolymer composition is a homogeneously branched ethylene interpolymer having a weight average molecular weight, $M_w$, of at least 110,000; a molecular weight distribution, $M_w/M_n$, of less than 2.7 and a density of from 0.925 to 0.948 $g/cm^3$.

Embodiment 216. The ethylene interpolymer composition of any one of Embodiments 200-215, wherein the first ethylene interpolymer of the second interpolymer composition is homogeneously branched ethylene interpolymer and has a CDBI of greater than 50%.

Embodiment 217. The ethylene interpolymer composition of any one of Embodiments 200-216, wherein the second ethylene interpolymer of the second interpolymer composition has a weight average molecular weight, $M_w$, of less than 45,000.

Embodiment 218. The ethylene interpolymer composition of any one of Embodiments 200-217, wherein the second ethylene interpolymer of the second interpolymer composition is a homogeneously branched interpolymer.

Embodiment 219. The ethylene interpolymer composition of any one of Embodiments 200-218, wherein the second ethylene interpolymer of the second interpolymer composition is made with a single site catalyst.

Embodiment 220. The ethylene interpolymer composition of any one of Embodiments 200-219, wherein the second ethylene interpolymer of the second interpolymer composition is made with a phosphinimine catalyst.

Embodiment 221. The ethylene interpolymer composition of any one of Embodiments 200-219, wherein the comonomer of the second ethylene interpolymer of the second interpolymer composition includes an alpha-olefin.

Embodiment 222. The ethylene interpolymer composition of Embodiment 221, wherein the alpha-olefin includes an alpha-olefin chosen from 1-butene, 1-hexene, 1-octene, and combinations thereof.

Embodiment 223. The ethylene interpolymer composition of Embodiment 221, wherein the alpha-olefin includes 1-octene.

Embodiment 224. The ethylene interpolymer composition of any one of Embodiments 221-223, wherein the short chain branching in the second ethylene interpolymer of the second interpolymer composition is from 0.25 to 15 short chain branches per thousand carbon atoms (SCB2/1000 Cs).

Embodiment 225. The ethylene interpolymer composition of any one of Embodiments 221-224, wherein the comonomer content in the second ethylene interpolymer of the second interpolymer composition is within ±0.05 mol. % of the comonomer content of the first ethylene interpolymer of the second interpolymer composition.

Embodiment 226. The ethylene interpolymer composition of any one of Embodiments 221-225, wherein the mol. % of comonomer in the second ethylene interpolymer of the second interpolymer composition is less than the comonomer content of the first ethylene interpolymer of the second interpolymer composition.

Embodiment 227. The ethylene interpolymer composition of any one of Embodiments 221-226, wherein the amount of short chain branching in the second ethylene interpolymer of the second interpolymer composition is within ±0.25 SCB/1000 C of the amount of short chain branching in the first ethylene interpolymer of the second interpolymer composition.

Embodiment 228. The ethylene interpolymer composition of any one of Embodiments 221-227, wherein the amount of short chain branching in the second ethylene interpolymer of the second interpolymer composition is less than the amount of short chain branching in the first ethylene interpolymer of the second interpolymer composition.

Embodiment 229. The ethylene interpolymer composition of any one of Embodiments 200-228, wherein the second ethylene interpolymer of the second interpolymer composition has a density of less than 0.966 g/cm$^3$.

Embodiment 230. The ethylene interpolymer composition of any one of Embodiments 200-228, wherein the second ethylene interpolymer of the second interpolymer composition has a density from 0.952 g/cm$^3$ to 0.966 g/cm$^3$.

Embodiment 231. The ethylene interpolymer composition of any one of Embodiments 200-230, wherein the second ethylene interpolymer of the second interpolymer composition a has molecular weight distribution, $M_w/M_n$, of ≤2.7.

Embodiment 232. The ethylene interpolymer composition of any one of Embodiments 200-231, wherein the second ethylene interpolymer of the second interpolymer composition a has a melt index, $I_2$, from 1,000 g/10 min to 7,000 g/10 min.

Embodiment 233. The ethylene interpolymer composition of any one of Embodiments 200-232, wherein the second ethylene interpolymer of the second interpolymer composition is a homogeneous ethylene interpolymer having a weight average molecular weight, $M_w$, of ≤45,000; a molecular weight distribution, $M_w/M_n$, of less than 2.7 and a density higher than the density of the first ethylene interpolymer in the second interpolymer composition, but less than 0.967 g/cm$^3$.

Embodiment 234. The ethylene interpolymer composition of any one of Embodiments 200-233, wherein the second ethylene interpolymer includes from 40 wt. % to 80 wt. % of the second interpolymer composition.

EXAMPLES

Test Methods

Prior to testing, each specimen was conditioned for at least 24 hours at 23±2° C. and 50±10% relative humidity. Testing was conducted at 23±2° C. and 50±10% relative humidity. As generally used herein, the term "ASTM conditions" refers to a laboratory that is maintained at 23±2° C. and 50±10% relative humidity. ASTM refers to the American Society for Testing and Materials.

Plaques molded from the polyethylene compositions were tested according to the following ASTM methods: Bent Strip Environmental Stress Crack Resistance (ESCR) at Condition B at 10% IGEPAL at 50° C., ASTM D1693; notched IZOD impact properties, ASTM D 256; Flexural properties, ASTM D 790; Tensile properties, ASTM D 638.

Density

Densities were determined using ASTM D792-13 (Nov. 1, 2013).

Melt Index

Melt index was determined using ASTM D1238 (Aug. 1, 2013). Melt indexes, $I_2$, $I_6$, $I_{10}$ and $I_{21}$ were measured at 190° C., using weights of 2.16 kg, 6.48 kg, 10 kg and a 21.6 kg respectively. As generally used herein, the term "stress exponent" or its acronym "S.Ex.", is defined by the following relationship:

$$S.Ex. = \log(I_6/I_2)/\log(6480/2160)$$

wherein $I_6$ and $I_2$ are the melt flow rates measured at 190° C. using 6.48 kg and 2.16 kg loads, respectively. In this disclosure, melt index was expressed using the units of g/10 min or dg/min; these units are equivalent.

Environmental Stress Crack Resistance (ESCR)

ESCR was determined according to ASTM D1693-13 (Nov. 1, 2013). Both ESCR Condition A and B were employed. In Condition A, the specimen thickness was within the range of 3.00-3.30 mm (0.120-0.130 in) and the notch depth was within the range of 0.50-0.65 mm (0.020-0.025 in). Condition A was conducted using 100% IGEPAL CO-630 (nonylphenoxy polyoxyethylene nonylphenylether). In Condition B, the specimen thickness was within the range of 1.84-1.97 mm (0.0725-0.0775 in) and a notch depth was within the range of 0.30-0.40 mm (0.012-0.015 in). Condition B experiments were conducted using 100% IGEPAL CO-630 or a solution of 10% IGEPAL CO-630 in water.

Gel Permeation Chromatography (GPC)

Molecular weights, $M_n$, $M_w$ and $M_z$ (g/mol), as well as polydispersity ($M_w/M_n$), were determined by high temperature Gel Permeation Chromatography (GPC) with differential refractive index (DRI) detection using universal calibration (e.g., ASTM-D6474-99). GPC data was determined using a Waters Model 150 Gel Permeation Chromatography (GPC) apparatus equipped with a differential refractive index detector with 1,2,4-trichlorobenzene as the mobile phase at 140° C. The samples were prepared by dissolving the polymer in this solvent and were run without filtration.

Molecular weights are expressed as polyethylene equivalents with a relative standard deviation of 2.9% for the number average molecular weight ("$M_n$") and 5.0% for the weight average molecular weight ("$M_w$"). The molecular weight distribution (MWD) is the weight average molecular weight divided by the number average molecular weight, $M_w/M_n$. The z-average molecular weight distribution is $M_z/M_n$.

Sample solutions (1 to 2 mg/mL) were prepared by heating the interpolymer in 1,2,4-trichlorobenzene (TCB) and rotating on a wheel for 4 hours at 150° C. in an oven. The antioxidant 2,6-di-tert-butyl-4-methylphenol (BHT) was added to the mixture to stabilize the polymer against oxidative degradation. The BHT concentration was 250 ppm. Sample solutions were chromatographed at 140° C. on a PL 220 high-temperature chromatography unit equipped with four SHODEX® columns (HT803, HT804, HT805 and HT806) using TCB as the mobile phase with a flow rate of 1.0 mL/minute, with a differential refractive index (DRI) as the concentration detector. BHT was added to the mobile phase at a concentration of 250 ppm to protect the columns from oxidative degradation. The sample injection volume was 200 microliter. The GPC raw data were processed with CIRRUS® GPC software. The GPC columns were calibrated with narrow distribution polystyrene standards. The polystyrene molecular weights were converted to polyethylene molecular weights using the Mark-Houwink equation, as described in the ASTM standard test method D6474.

GPC-FTIR was used to determine the comonomer content as a function of molecular weight. After separation of the polymer by GPC, an on-line FTIR measures the concentration of the polymer and methyl end groups. Methyl end groups are used in the branch frequency calculations. Conventional calibration allows for the calculation of a molecular weight distribution.

Mathematical deconvolutions were performed to determine the relative amount of polymer, molecular weight, and comonomer content of the component made in each reactor, by assuming that each polymer component follows a Flory's molecular weight distribution function and it has a homogeneous comonomer distribution across the whole molecular weight range. Estimates were also compared to predictions obtained using fundamental kinetic models (with kinetic constants specific for each catalyst formulation) as well as feed and reactor conditions. The simulation was based on the configuration of the solution pilot plant described below; which was used to produce the examples of ethylene interpolymer compositions disclosed herein.

The following equations were used to calculate the density and melt index I2:

$$\text{Density} = 0.979863 - 5.95808\times10^{-3}\left(\frac{SCB}{1000C}\right)^{0.65} - 3.83133\times10^{-4}[\log_{10}(M_n)]^3 - 5.77986\times10^{-6}\left(\frac{M_w}{M_n}\right)^3 + 5.57395\times10^{-3}\left(\frac{M_z}{M_w}\right)^{0.25} \quad \text{Equation (1)}$$

$$\log_{10}(\text{Melt Index } I_2) = 7.900 - 3.909\left[\log_{10}\left(\frac{M_w}{1000}\right)\right] - 0.2799\left(\frac{M_w}{M_n}\right)^{-1} \quad \text{Equation (2)}$$

where $M_n$, $M_w$, $M_z$, and SCB/1000 C are the deconvoluted values of the individual ethylene polymer components, as obtained from the results of the deconvolution described above. The uniform comonomer distribution (which results from the use of a single site catalyst) of the resin components (e.g., the first and second ethylene copolymers) allowed the estimation of the short chain branching content (SCB) from the GPC-FTIR data, in branches per 1000 carbon atoms and calculation of comonomer content (in mol. %) and density (in g/cm$^3$) for the first and second ethylene copolymers, based on the deconvoluted relative amounts of first and second ethylene copolymer components in the polyethylene composition, and their estimated resin molecular weight parameters from the above procedure. See Duncan E. Thompson, Kim B. McAuley, and P. James McLellan. *Exploring reaction kinetics of a multi-site Ziegler-Natta catalyst using deconvolution of molecular weight distributions for ethylene-hexene copolymers*. Macromolecular Reaction Engineering, 1(2):264-274, 2007. doi:10.1002/mren.200600028; Duncan E. Thompson, Kim B. McAuley, and P. James McLellan. *A simplified model for prediction of molecular weight distributions in ethylene-hexene copolymerization using Ziegler-Natta catalysts*. Macromolecular Reaction Engineering, 1(5):523-536, 2007. doi:10.1002/mren.200700018; Alfred Rudin, *The elements of polymer science and engineering,* 2nd edition, Academic Press, 1999. See also U.S. Pat. No. 8,022,143.

Unsaturation Content

The quantity of unsaturated groups, i.e., double bonds, in an ethylene interpolymer composition was determined according to ASTM D3124-98 (vinylidene unsaturation, published March 2011) and ASTM D6248-98 (vinyl and trans unsaturation, published July 2012). An ethylene interpolymer sample was: a) first subjected to a carbon disulfide extraction to remove additives that may interfere with the analysis; b) the sample (pellet, film or granular form) was pressed into a plaque of uniform thickness (0.5 mm); and c) the plaque was analyzed by FTIR.

Short Chain Branching Frequency (SCBF)

The short chain branch frequency (SCB per 1000 carbon atoms) of samples was determined by Fourier Transform Infrared Spectroscopy (FTIR) according to ASTM D6645-01 method. A Thermo-Nicolet 750 Magna-IR Spectrophotometer equipped with OMNIC® version 7.2a software was used for the measurements. Comonomer content may be measured using 13C NMR techniques as discussed in Randall, Rev. Macromol. Chem. Phys., C29 (2&3), p 285; U.S. Pat. No. 5,292,845 and WO 2005/121239.

Differential Scanning Calorimetry (DSC)

The melting behavior including a peak melting point ($T_m$), the number of peaks, heat of fusion (J/g), and the percent crystallinity of the interpolymers may be determined by using a TA Instrument DSC Q1000 Thermal Analyzer at a rate of 10° C./min compliant with ASTM D3418-12. In a DSC measurement, the instrument was calibrated with indium; after calibration, a sample is equilibrated at 0° C. and then the temperature was increased to 200° C. at a heating rate of 10° C./min; the melt was then kept isothermally at 200° C. for five minutes; the melt was then cooled to 0° C. at a cooling rate of 10° C./min and kept at 0° C. for five minutes; the specimen was then heated to 200° C. at a heating rate of 10° C./min. The melting point, heat of fusion, and percent of crystallinity are determined by the primary peak temperature and the total area under the DSC curve respectively from the second heating data. The peak melting temperature $T_m$ is the higher temperature peak, when two peaks are present in a bimodal DSC profile (typically also having the greatest peak height).

Primary Structure Parameter (PSP2)

The PSP2 calculation is described by DesLauriers and Rohlfing in Macromolecular Symposia (2009), 282 (Polyolefin Characterization—ICPC 2008), pages 136-149. The PSP2 calculation may be generally described as a multistep process. The first step involves estimating the homopolymer (or low comonomer polymer) density of a sample from the sample's molecular weight distribution as described by Equation (3):

$$1/\rho = \sum(w_i/\rho_i) = \int 1/\rho(dw/d\text{Log}M)d\text{Log}M \qquad \text{Equation (3)}$$

where: $\rho$=1.0748−(0.0241)Log M. The first step takes into account the effects of molecular weight on sample density. Density values at molecular weights less than 720 g/mol are equal to 1.006 g/cm$^3$ according to this method.

In the second step, to further account for the added contributions to density suppression by the presence of short chain branching for each molecular weight (MW) slice, the difference between the measured bulk density of interpolymer and the calculated homopolymer density is divided by the overall short chain branching (SCB) level (as measured by size exclusion chromatography-Fourier transform infrared spectroscopy or by C13-NMR) and subsequently applied to the SCB level in each MW slice. The original observed bulk density of the interpolymer (down to 0.852 g/cm$^3$) is obtained through summation of the MW slices as described above. The calculations have been simplified by assuming that all SCB levels will have the same effect on density suppression. However, it is to be understood that the effectiveness of a particular SCB level to suppress density will vary (i.e., the ability of SCB to disrupt crystallinity decreases as the level of SCB increases). Alternately, if the density of the interpolymer is not known, then the effects of SCB on sample density can be estimated in the second step by using Equation (4) as described U.S. Patent Appl. Pub. No. 2007/0298508, now U.S. Pat. No. 7,803,629, where the change in density $\Delta\rho$ refers to the value that is subtracted from the value given in Equation (3) on a molecular slice by slice basis: $\Delta\rho=C_1(\text{SCB/PDI}^n)^{C2}-C_3(\text{SCB/PDI}^n)^{C4}$ (Equation 4), where $C_1$=1.25E−02, $C_2$=0.5, $C_3$=7.51E−05, $C_4$=0.62 and n=0.32.

The third step is to calculate the quantity of 2 $l_c+l_a$ where $l_c$ is the estimated crystalline lamella thickness (in nm) and $l_a$ is the estimated thickness (in nm) of the amorphous material at a particular molecular weight given by the following equations (Equations (5) and (6)):

$$T_m(°\text{ C.}) = (20587.5149640828)\rho^3 - (63826.2771547794)\rho^2 + (65965.7028912473) - 22585.2457979131 \qquad \text{Equation 5}$$

$$l_c(\text{nm}) = \frac{0.624\text{ nm}\cdot T_m^0(K)}{T_m^0(K) - T_m(K)} \qquad \text{Equation 6}$$

In Equation 5, assigned values of 20° C. and 142.5° C. are given for density values of 0.852 g/cm$^3$ and 1.01 g/cm$^3$, respectively. Equation 6 is a form of the well accepted Gibbs Thompson equation. The thickness of the amorphous layer ($l_a$) is calculated using the Equations (7A) and (7B):

$$w_c = \left(\frac{\rho_c}{\rho}\right)\left(\frac{\rho - \rho_a}{\rho_c - \rho_a}\right) \qquad \text{Equation 7A}$$

$$l_a = \rho_c l_c (1 - w_c)/\rho_a w_c \qquad \text{Equation 7B}$$

where, $w_c$=weight fraction crystallinity, $\rho$=calculated density of MW slice, $\rho_c$=density of 100% crystalline sample (assigned 1.006 g/cm$^3$), and $\rho_a$=density of amorphous phase (0.852 g/cm$^3$). The fourth step calculates the tie molecule probability (P) for each molecular weight and respective $2(l_c+l_a)$ value according to Equations (8A) and (8B):

$$P = \frac{1}{3}\frac{\int_L^\infty r^2\exp(-b^2r^2)dr}{\int_0^\infty r^2\exp(-b^2r^2)dr} \qquad \text{Equation 8A}$$

$$\text{where } b^2 = \frac{3}{2\bar{r}^2} \text{ and } \bar{r}^2 = (Dnl^2).$$

$$P = \frac{1}{3}\frac{\frac{\sqrt{\pi}}{4b^3} - \int_0^L r^2\exp(-b^2r^2)dr}{\frac{\sqrt{\pi}}{4b^3}} = \frac{1}{3}\left(1 - \frac{4b^3}{\sqrt{\pi}}\int_0^L r^2\exp(-b^2r^2)dr\right) \qquad \text{Equation 8B}$$

The symbols above have the following meanings: P=Probability of tie-chain formation, L=Critical distance (nm)=2 $l_e+l_a$, D=Chain extension factor in melt=6.8 for polyethylene, n=Number of links=$M_w$/14 for polyethylene, and 1=The link length=0.153 nm for polyethylene.

Finally, PSP2 values are calculated from Equations (8A) and (8B) by treating this value essentially as a weighing factor ($P_i$) for each slice of the MWD, where $P_i$ was arbitrarily multiplied×100 and subsequently defined as PSP2$_i$. As in all of the aforementioned calculations, this value at each slice is multiplied by the respective weight fraction ($w_i$) of the MWD profile to obtain a value for the bulk polymer.

Composition Distribution Branching Index (CDBI)

The composition distribution of a polymer can be characterized by the short chain distribution index (SCDI) or composition distribution breadth index (CDBI). Frequently, the composition distribution breadth index "CDBI" is used to differentiate ethylene interpolymers produced with different catalysts or processes. Typically, the CDBI50 of homogeneous ethylene interpolymers are greater than 70%. In contrast, the CDBI50 of α-olefin containing heterogeneous ethylene interpolymers are generally lower than the CDBI50 of homogeneous ethylene interpolymers. The definition of composition distribution breadth index (CDBI) can be found in WO 93/03093 and U.S. Pat. No. 5,376,439. The CDBI was determined using a crystal-TREF unit commercially available form Polymer Char (Valencia, Spain). The acronym "TREF" refers to Temperature Rising Elution Fractionation. A polymer sample (80 to 100 mg) was introduced into the reactor vessel of the Polymer Char crystal-TREF unit. The reactor vessel was filled with 35 ml 1,2,4-trichlorobenzene (TCB), heated to the desired dissolution temperature (e.g. 150° C.) for 2 hours. The solution (1.5 ml) was then loaded into the TREF column filled with stainless steel beads. After allowed to equilibrate at a given stabilization temperature (e.g. 110° C.) for 45 minutes, the polymer solution was allowed to crystallize with a temperature drop from the stabilization temperature to 30° C. (0.09° C./minute). After equilibrating at 30° C. for 30 minutes, the crystallized sample was eluted with TCB (0.75 mL/minute) with a temperature ramp from 30° C. to the stabilization temperature (0.25° C./minute). The TREF column was cleaned at the end of the run for 30 minutes at the dissolution temperature. The data were processed using Polymer Char software, EXCEL spreadsheet and TREF software developed in-house. CDBI is defined to be the percent of polymer whose composition is within 50% of the median comonomer composition. It is calculated from the composition distribution cure and the normalized cumulative integral of the composition distribution curve, as illustrated in U.S. Pat. No. 5,376,439.

Those skilled in the art will understand that a calibration curve is required to convert a TREF elution temperature to comonomer content, i.e., the amount of comonomer in the ethylene interpolymer fraction that elutes at a specific temperature. The generation of such calibration curves are described in, e.g., Wild, et al., J. Polym. Sci., Part B, Polym. Phys., Vol. 20 (3), pages 441-455. Generally, Ziegler-Natta catalysts produce ethylene interpolymers with a CDBI of less than 50%, consistent with a heterogeneously branched interpolymer. In contrast, metallocenes and other single site catalysts will most often produce ethylene interpolymers having a CDBI of greater than 55%, consistent with a homogeneously branched interpolymer.

Dynamic Mechanical Analysis (DMA) Rheological Measurements

Dynamic Mechanical Analysis (DMA) rheological measurements (e.g., small-strain (10%) oscillatory shear measurements) were carried out on a Rheometrics Dynamic Spectrometer (RDS-II) or Rheometrics SR5 or ATS Stresstech, on compression molded samples under nitrogen atmosphere at 190° C., using 25 mm diameter cone and plate geometry. The polymer samples were appropriately stabilized with the antioxidant additives and then inserted into the test fixture for at least one minute preheating to ensure the normal force decreasing back to zero. DMA experiments are conducted at 10% strain, 0.05 to 100 rad/s and 190° C. Orchestrator Software was used to determine the viscoelastic parameters including the storage modulus (G) and loss modulus (G"). The values of storage modulus G' were estimated at a constant value of loss modulus G" at 500 Pa at 190° C. (G' at $G''_{(500\ Pa)}$). This is to characterize and discriminate the viscoelastic properties of the comparative and interpolymers of this disclosure. This test technique provides an opportunity to study the various characteristics of a polymer melt where the elastic and viscous modulus (G' and G"), viscosity (η*), and tan 8 as a function of dynamic oscillation (frequency) are generated to provide information on the rheological behavior in correlation with the molecular architecture.

Dilution Index ($Y_d$) Measurements

A series of small amplitude frequency sweep tests were run on each sample using an Anton Paar MCR501 Rotational Rheometer equipped with the "TruGap™ Parallel Plate measuring system". A gap of 1.5 mm and a strain amplitude of 10% were used throughout the tests. The frequency sweeps were from 0.05 to 100 rad/s at the intervals of seven points per decade. The test temperatures were 170° C., 190° C., 210° C., and 230° C. Master curves at 190° C. were constructed for each sample using the Rheoplus/32 V3.40 software through the Standard TTS (time-temperature superposition) procedure, with both horizontal and vertical shift enabled.

In some cases, dynamic mechanical analysis was carried out only at 190° C. and the dynamic moduli crossover point occurred at frequencies outside the experimental range used to generate the data points. The crossover frequency was estimated by extrapolating the G' and G" curves, as a function of frequency, on a logarithmic scale, using a 33-mode generalized Maxwell model as described in Rheologica Acta 28.6 (1989): 511-519. For such cases, a sensitivity analysis was carried out to estimate the propagated uncertainty in the evaluation of the dilution index Yd. The sensitivity analysis consisted in generating 100 random sample numbers within 10%, 25% and 50% of the extrapolated crossover frequency.

The following defines the Dilution Index ($Y_d$) and Dimensionless Modulus ($X_d$). In addition to having molecular weights, molecular weight distributions and branching structures, blends of ethylene interpolymers may exhibit a hierarchical structure in the melt phase. In other words, the ethylene interpolymer components may be, or may not be, homogeneous down to the molecular level depending on interpolymer miscibility and the physical history of the blend. Such hierarchical physical structure in the melt is expected to have a strong impact on flow and hence on processing and converting, as well as the end-use properties of manufactured articles. The nature of this hierarchical physical structure between interpolymers can be characterized.

The hierarchical physical structure of ethylene interpolymers can be characterized using melt rheology. A convenient method can be based on the small amplitude frequency sweep tests. Such rheology results are expressed as the phase angle δ as a function of complex modulus G*, referred to as van Gurp-Palmen plots (as described in M. Van Gurp, J. Palmen, Rheol. Bull. (1998) 67(1): 5-8; and Dealy J, Plazek D. Rheol. Bull. (2009) 78(2): 16-31). For a typical ethylene interpolymer, the phase angle δ increases toward its upper bound of 900 with G* becoming sufficiently low. The VGP plots are a signature of resin architecture. The rise of δ toward 900 is monotonic for an ideally linear, monodisperse interpolymer. The δ (G*) for a branched interpolymer or a blend containing a branched interpolymer may show an inflection point that reflects the topology of the branched interpolymer (see S. Trinkle, P. Walter, C. Friedrich, Rheo. Acta (2002) 41: 103-113). The deviation of the phase angle δ from the monotonic rise may indicate a deviation from the ideal linear interpolymer either due to presence of long chain branching if the inflection point is low (e.g., δ≤20°) or a blend containing at least two interpolymers having dissimilar branching structure if the inflection point is high (e.g., δ≥70°).

For commercially available linear low density polyethylenes, inflection points are not observed; with the exception of some commercial polyethylenes that contain a small amount of long chain branching (LCB). To use the VGP plots regardless of presence of LCB, an alternative is to use the point where the frequency $\omega_c$ is two decades below the cross-over frequency $\omega_c$, i.e., $\omega_c=0.01\omega_x$. The cross-over point is taken as the reference as it is known to be a characteristic point that correlates with MI, density and other specifications of an ethylene interpolymer. The cross-over modulus is related to the plateau modulus for a given molecular weight distribution (see S. Wu. J Polym Sci, Polym Phys Ed (1989) 27:723; M. R. Nobile, F. Cocchini. Rheol Acta (2001) 40:111). The complex modulus $G_c^*$ for this point is normalized to the cross-over modulus, $G_x^*/(\sqrt{2})$, as $(\sqrt{2})G_c^*/G_x^*$, to minimize the variation due to overall molecular weight, molecular weight distribution and the short chain branching. As a result, the coordinates on VGP plots for this low frequency point at $\omega_c=0.01\omega_x$, namely ($\sqrt{2})G_c^*/G_x^*$ and $\delta_c$, characterize the contribution due to blending. Similar to the inflection points, the closer the (($\sqrt{2})G_c^*/G_x^*$, $\delta_c$) point is toward the 90° upper bound, the more the blend behaves as if it were an ideal single component.

As an alternative way to avoid interference due to the molecular weight, molecular weight distribution and the short branching of the ethylene $\delta_c$ interpolymer ingredients, the coordinates ($G_c^*$, $\delta_c$) are compared to a reference sample of interest to form the following two parameters: "Dilution Index ($Y_d$)" represented by $Y_d=\delta_c-(C_0-C_1e^{C_2\ ln\ G^*_c})$ and "Dimensionless Modulus ($X_d$)" represented by $X_d=G_{0.01\omega_c}/G_r^*$, in which the constants $C_0$, $C_1$, and $C_2$ are determined by fitting the VGP data $\delta(G^*)$ of the reference sample to the following equation: $\delta=C_0-C_1e^{C_2 ln\ G^*}$, in which $G_r^*$ is the complex modulus of this reference sample at its $\delta_c=\delta(0.01\omega_x)$. When an ethylene interpolymer, synthesized with an in-line Ziegler-Natta catalyst employing one solution reactor, having a density of 0.920 g/cm$^3$ and a melt index (MI or $I_2$) of 1.0 dg/min is taken as a reference sample, the constants are: $C_0$=93.43°, $C_1$=1.3160, $C_2$=0.2945, and $G_r^*$=9432 Pa. The values of these constants can be different if the rheology test protocol differs from that specified herein.

These regrouped coordinates ($X_d$, $Y_d$) from ($G_c^*$, $\delta_c$) allows comparison between ethylene interpolymer compositions disclosed herein with Comparative examples. The Dilution Index ($Y_d$) reflects whether the blend behaves like a simple blend of linear ethylene interpolymers (lacking hierarchical structure in the melt) or shows a distinctive response that reflects a hierarchical physical structure within the melt. The lower the $Y_d$, the more the sample shows separate responses from the ethylene interpolymers that include the blend; the higher the $Y_d$ the more the sample behaves like a single component, or single ethylene interpolymer.

The Dimensionless Modulus ($X_d$), reflects differences (relative to the reference sample) that are related to the overall molecular weight, molecular weight distribution ($M_w/M_1$) and short chain branching. Without wishing to be bound to any particular theory, it is believed that the Dimensionless Modulus ($X_d$) may be considered to be related to the $M_w/M_n$ and the radius of gyration ($<R_g>2$) of the ethylene interpolymer in the melt, and increasing $X_d$ may have similar effects as increasing $M_w/M_n$ and/or $<R_g>2$, without the risk of including lower molecular weight fraction and sacrificing certain related properties.

Tensile Properties

The following tensile properties were determined using ASTM D638: tensile break strength (MPa), elongation at yield (%), yield strength (MPa), ultimate elongation (%), ultimate strength (MPa) and 1 and 2% secant modulus (MPa).

Flexural Properties

Flexural properties, i.e., 2% flexural secant modulus was determined using ASTM D790-10 (published in April 2010).

ARM Impact Testing

The ARM impact test was performed in accordance with ASTM D5628 at a test temperature of −40° C. This test was adapted from the Association of Rotational Molders International, Low Temperature Impact Test, Version 4.0 dated July 2003. The purpose of this test was to determine the impact properties of the rotomolded parts. ARM Impact test specimens, 5 inch×5 inch×0.250 inch (12.7 cm×12.7 cm×0.635 cm) were cut from a side wall of the cubical rotomolded part. Test specimens were thermally equilibrated in a refrigerated testing laboratory maintained at −40±3.5° F. (−40° C.±2° C.) for at least 24 hours prior to impact testing. The testing technique employed is commonly called the Bruceton Staircase Method or the Up-and-Down Method. The procedure establishes the height of a specific dart that will cause 50% of the specimens to fail, i.e., testing (dart falling on specimens) was carried out until there was a minimum of 10 passes and 10 fails. Each failure was characterized as a ductile or a brittle failure. Ductile failure was characterized by penetration of the dart though the specimen and the impact area was elongated and thinned leaving a hole with stringy fibers at the point of failure. Brittle failure was evident when the test specimen cracked, where the cracks radiated outwardly from point of failure and the sample showed very little to no elongation at the point of failure. The "ARM Ductility %" was calculated as follows: 100×[(number of ductile failures)/(total number of all failures)]. The "ARM Mean Failure Energy (ft·lbs)" was calculated by multiplying the drop height (ft) by the nominal dart weight (lbs).

Samples were impact tested using a drop weight impact tester; impact darts available consisted of 10 lb (4.54 kg), 15 lb (6.80 kg), 20 lb (9.07 kg) or 30 lb (13.6 kg) darts. All impact darts had a rounded dart tip having a diameter of 1.0±0.005 inch (2.54 cm), the dart tip transitioned into a lower cylindrical shaft (1.0 inch diameter), the length of the lower cylindrical shaft (to dart tip) was 4.5 inch (11.4 cm). Impact dart included an upper cylindrical shaft having a diameter of 2.0 inch (5.08 cm), the length of the upper cylinder shaft varied depending on the desired weight of the dart, e.g., 10.5 inch (26.7 cm) or 16.5 inch (41.9 cm) for the 10 lb or 20 lb dart, respectively. Preferably a dart weight is selected such that the drop height is between 2.5 ft and 7.5 ft (0.8 m to 2.3 m). Test specimens were oriented in the impact tester such that the falling dart impacted the surface of the part that was in contact with the mold (when molded). If the sample did not fail at a given height and weight, either the height or weight was increased incrementally until part failure occurred. Once failure occurred, the height or weight is decreased by the same increment and the process is repeated. The "ARM Mean Failure Energy" was calculated by multiplying the drop height (ft) by the nominal dart weight (lbs). After impact, both the upper and lower surface of the specimen were inspected for failure. For the ethylene interpolymer compositions disclosed herein, a ductile failure was desired failure mode.

In the ARM Impact test, a rotomolded part having an ARM Mean Failure Energy equal to or greater than or equal to 100 ft·lbs in combination with an ARM Ductility equal to or greater than or equal to 50% was considered a good part, i.e., the part passed the ARM Impact test. To be clear, a wall structure having an ARM Mean Failure Energy ≥100 ft·lbs and an ARM Ductility ≥50% passed the ARM Impact test. In contrast, a wall structure having an ARM Mean Failure Energy <100 ft·lbs or an ARM Ductility <50% failed the ARM Impact test.

Ethylene Interpolymer Compositions

The following examples are presented for the purpose of illustrating selected embodiments of this disclosure; it being understood that the examples presented do not limit the claims presented.

Examples of the ethylene interpolymer compositions were produced in a dual reactor solution polymerization process in which the contents of the first reactor flow into the second reactor. This in-series "dual reactor" process produces an "in-situ" polyethylene blend (i.e., the polyethylene composition). When an in-series reactor configuration is used, un-reacted ethylene monomer, and un-reacted α-olefin comonomer present in the first reactor may flow into the downstream second reactor for further polymerization. Although no co-monomer may be feed directly to the downstream second reactor, an ethylene interpolymer may be formed in the second reactor due to the presence of unreacted 1-octene flowing from the first reactor to the second reactor where it is copolymerized with ethylene. Each reactor may be sufficiently agitated to give conditions in which components are well mixed. Reactor feeds and conditions used to make the disclosed examples are shown in Table 1.

TABLE 1

| | Example 1 | Comparative Example 2 | Comparative Example 3 (Ex. #3 in U.S. Pat. No. 9,982,077) | Comparative Example 4 | Comparative Example 5 (Ex. #1 in U.S. Pat. No. 9,321,865) |
|---|---|---|---|---|---|
| Split between reactor systems R1-R2-R3 and R4-R5 | 0.7/0.3 | 1/0 | 1/0 | 1/0 | 1/0 |
| Ethylene split between R1, R2 andR3 | 0.45/0.55/0 | 0.45/0.55/0 | 0.35/0.65/0 | 0.35/0.65/0 | 0.35/0.65/0 |
| Ethylene split between R4 and R5 | 0.35/0.65 | | | | |
| Octene split between R1, R2 and R3 | 1/0 | 1/0 | 1/0/0 | 1/0/0 | 1/0/0 |
| Octene split between R4 and R5 | 1/0 | | | | |
| Octene to ethylene ratio in fresh feed for reactor system R1-R2-R3 | 0.035 | 0.035 | 0.021 | 0.028 | 0.061 |
| Octene to ethylene ratio in fresh feed for reactor system R4-R5 | 0.059 | | | | |
| Hydrogen in Reactor 1 (ppm) | 1.2 | 1.2 | 0.8 | 1.2 | 1.0 |
| Hydrogen in Reactor 4 (ppm) | 1.1 | | | | |
| Hydrogen in Reactor 2 (ppm) | 28.5 | 28.5 | 4.5 | 6.0 | 10 |
| Hydrogen in Reactor 5 (ppm) | 7.6 | | | | |
| Reactor 1 Temperature (° C.) | 136 | 136 | 143 | 144 | 141 |
| Reactor 4 Temperature (° C.) | 139 | | | | |
| Reactor 2 Temperature (° C.) | 190 | 190 | 208 | 211 | 210 |
| Reactor 5 Temperature (° C.) | 206 | | | | |
| Reactor 1 ethylene conversion (%) | 91 | 91 | | | 93 |
| Reactor 4 ethylene conversion (%) | 89 | | | | |
| Reactor 2 ethylene conversion (%) | 84 | 84 | | | 85 |
| Reactor 5 ethylene conversion (%) | 88 | | | | |
| Catalyst Feed in reactor 1 (ppm) | 0.095 | | 0.10 | 0.10 | 0.34 |
| Catalyst Feed in reactor 4 (ppm) | 0.08 | | | | |
| Catalyst Feed in reactor 2 (ppm) | 0.21 | | 0.22 | 0.38 | 0.24 |
| Catalyst Feed in reactor 5 (ppm) | 0.29 | | | | |

| | Comparative Example 6 (Ex. #3 in U.S. Pat. No. 9,321,865) | Example 30 | Example 31 | Example 32 |
|---|---|---|---|---|
| Split between reactor systems R1-R2-R3 and R4-R5 | 1/0 | 1/0 | 1/0 | 0.5/0.5 |
| Ethylene split between R1, R2 and R3 | 0.35/0.65/0 | 0.435/0.564/0 | 0.435/0.565/0 | 0.435/0.565/0 |
| Ethylene split between R4 and R5 | | | | 0.435/0.565 |
| Octene split between R1, R2 and R3 | 1/0/0 | 1/0 | 1/0 | 1/0 |
| Octene split between R4 and R5 | | | | 1/0 |
| Octene to ethylene ratio in fresh feed for reactor system R1-R2-R3 | 0.048 | 0.050 | 0.050 | 0.050 |
| Octene to ethylene ratio in fresh feed for reactor system R4-R5 | | | | 0.050 |
| Hydrogen in Reactor 1 (ppm) | 1.0 | 1.6 | 1.6 | 1.6 |
| Hydrogen in Reactor 4 (ppm) | | | | 1.6 |
| Hydrogen in Reactor 2 (ppm) | 7.5 | 10.0 | 35.0 | 35.0 |
| Hydrogen in Reactor 5 (ppm) | | | | 10.0 |
| Reactor 1 Temperature (° C.) | 140 | 139 | 139 | 139 |
| Reactor 4 Temperature (° C.) | | | | 139 |
| Reactor 2 Temperature (° C.) | 210 | 200 | 200 | 200 |
| Reactor 5 Temperature (° C.) | | | | 200 |
| Reactor 1 Ethylene Conversion (%) | | 89 | 89 | 89 |
| Reactor 4 Ethylene Conversion (%) | | | | 89 |
| Reactor 2 Ethylene Conversion (%) | | 80 | 80 | 80 |
| Reactor 5 Ethylene Conversion (%) | | | | 80 |
| Catalyst Feed in Reactor 1 - (ppm) | 0.08 | 0.34 | 0.26 | 0.26 |
| Catalyst Feed in Reactor 4- (ppm) | | | | 0.34 |
| Catalyst Feed in Reactor 2 - (ppm) | 0.41 | 0.34 | 0.38 | 0.38 |
| Catalyst Feed in Reactor 5 - (ppm) | | | | 0.34 |

Example 1 was prepared by melt blending two interpolymer compositions manufactured using a commercial scale facility (dual reactor solution phase, single-site catalyst). Example 32 was prepared by melt blending two interpolymer compositions manufactured using a pilot scale facility (dual reactor solution phase, single-site catalyst). For each example, the first interpolymer composition is referred to as one prepared using the first reactor system R1-R2-R3. The second interpolymer composition is referred to as one prepared using the second reactor system R4-R5.

For examples 3, 4, 5, 6, 30 and 31, the volume of the first reactor was 12 liters and the volume of the second reactor was 22 liters. These are the pilot plant scales. The first reactor was operated at a pressure of 10,500-35,000 kPa and the second reactor was operated at a lower pressure to facilitate continuous flow from the first reactor to the second. The solvent was methylpentane. The process operates using continuous feed streams. The catalyst employed in the dual reactor solution process experiments was $Cp((t\text{-}Bu)_3PN)TiCl_2$. A boron-based co-catalyst, trityl tetrakis(pentafluorophenyl)borate. The ratio of catalyst to co-catalyst in R1 and R2 was 1.2:1 Commercially available modified methylaminoxane (MMAO) was included as a scavenger at an Al:Ti of 100:1 R1 and 25:1 in R2. In addition, 2,6-di-tert-butylhydroxy-4-ethylbenzene was added to scavenge free trimethylaluminum within the MAO in a ratio of OH:Al of 0.3:1 to R1 and R2.

Example 1 was made by melt compounding two commercial resins. Additives were incorporated in the preparation of each commercial resin by use of mastertach and melt extrusion. Additives were also added to the final composition during the melt compounding of the two commercial resins. Example 1 was prepared by melt compounding the components using a brabender mixhead blender. The additives were added in powder form. Example 1 was also prepared by melt compounding the resin using a Leistritz twin screw extruder. Some additives were added in the form of a masterbatch while others were in powder form. The composition shown in example 1 contained the following additives (All amounts shown in parts per million by weight of the polyethylene): Hindered phenol (1010 and 1076): 506 ppm total (156 ppm for 1076 and 350 ppm for 1010); Phosphite (CAS Registry number 31570-04-4): 1415 ppm; Diphosphite (CAS Registry number 154862-43-8): 585 ppm; Hydroxylamine (CAS Registry number 143925-92-2): 325 ppm; Hindered Amine Light Stabilizer (HALS CHIMASSORB 944): 975 ppm; Zinc Oxide: 975 ppm.

Example 32 was made by melt compounding examples 30 and 31, in a 50:50 weight fraction ratio. Example 32 was prepared by melt compounding the components using a Leistritz LSM 30.34 twin screw extruder. Example 32 was also prepared by melt compounding the components using a Coperion ZSK26 twin screw extruder. Additives were added in the form of a masterbatch. The composition shown in example 32 contained the following additives (All amounts shown in parts per million by weight of the polyethylene): Hindered phenol (1076): 570 ppm; Phosphite (CAS Registry number 31570-04-4): 839 ppm; Diphosphite (CAS Registry number 154862-43-8): 560 ppm; Hydroxylamine (CAS Registry number 143925-92-2): 307 ppm; Hindered Amine Light Stabilizer (HALS CHIMASSORB 944): 750 ppm; Zinc Oxide: 750 ppm.

Example 1 and comparative polyethylene compositions properties are presented in Table 2.

TABLE 2

| | Example 1 | Comparative Example 2 | Comparative Example 3 (Ex. #3 in U.S. Pat. No. 9,982,077) | Comparative Example 4 | Comparative Example 5 (Ex. #1 in U.S. Pat. No. 9,321,865) |
|---|---|---|---|---|---|
| Density (g/cm$^3$) | 0.9514 | 0.9534 | 0.9480 | 0.9483 | 0.9439 |
| Melt Index $I_2$ (g/10 min) | 1.47 | 1.2 | 1.2 | 2.0 | 1.74 |
| I21 MI (g/min) | 67 | 68.8 | 38.9 | 64.6 | 68.9 |
| I21/I2 | 45.7 | 56.0 | 32.4 | 32.1 | 39.6 |
| Branch Freq/1000 C (FTIR) | 3.0 | 2.4 | 1.2 | 1.9 | 2.8 |
| Comonomer | octene | octene | octene | octene | octene |
| Comonomer wt. % | 2.3 | 1.9 | 0.9 | 1.5 | 2.2 |
| $M_n$ (GPC) | 16,969 | 10,375 | 35,000 | 27,000 | 28,536 |
| $M_w$ (GPC) | 95,246 | 94,834 | 102,000 | 86,000 | 87,251 |
| $M_z$ (GPC) | 263,475 | 283,975 | 264,000 | 221,500 | 225,844 |
| Polydispersity Index ($M_w/M_n$) | 5.6 | 9.1 | 2.9 | 3.2 | 3.06 |
| Index (Mz/Mw) | 2.8 | 3.0 | 2.6 | 2.6 | 2.6 |
| C-TREF CDBI (50) | 78.7 | 71.6 | 92.6 | 87.6 | 87.2 |
| Dilution Index Yd | 0.97 | 0.88 | −4.76 | 0.02 | |
| Dimensionless Modulus Xd | −0.42 | −0.47 | −0.27 | −0.11 | |
| PSP2 (Buck et al. CPChem) based on GPC-FTIR Branching distribution profile | 5.8 | 8.2 | 2.8 | 4.8 | |
| PSP2 (Buck et al. CPChem) based on Branching content (FTIR) | 7.3 | 7.8 | 4.5 | 4.1 | |

| | Comparative Example 6 (Ex. #3 in U.S. Pat. No. 9,321,865) | Example 30 | Example 31 | Example 32 |
|---|---|---|---|---|
| Density (g/cm$^3$) | 0.9453 | 0.947 | 0.9545 | 0.9509 |
| Melt Index $I_2$ (g/10 min) | 1.5 | 1.03 | 2.01 | 1.42 |
| I21 MI (g/min) | 54.7 | 46.7 | 12.36 | 73.17 |
| I21/I2 | 35.6 | 45.3 | 67.0 | 51.5 |
| Branch Freq/1000 C (FTIR) | 2.4 | 1.8 | 2.4 | |
| Comonomer ID | octene | octene | octene | octene |
| Comonomer wt. % | 1.9 | 1.4 | 1.9 | |
| $M_n$ (GPC) | 28,699 | 32,175 | 13,322 | 15,771 |
| $M_w$ (GPC) | 88,479 | 113,360 | 94,996 | 97,296 |
| $M_z$ (GPC) | 229,456 | 366,498 | 324,311 | 331,616 |
| Polydispersity Index ($M_w/M_n$) | 3.1 | 3.5 | 7.1 | 6.2 |
| Index (Mz/Mw) | 2.6 | 3.2 | 3.4 | 3.4 |
| C-TREF CDBI (50) | 88.3 | 87.0 | 76.1 | 77.5 |
| Dilution Index Yd | | — | — | — |
| Dimensionless Modulus Xd | | — | — | — |
| PSP2 (Buck et al. CPChem) based on GPC-FTIR Branching distribution profile | | 6.4 | 5.4 | 4.9 |
| PSP2 (Buck et al. CPChem) based on Branching content (FTIR) | | 8.0 | 6.9 | not available |

Calculated properties for the first, second and third ethylene interpolymer for the selected comparative and polyethylene compositions of this disclosure, as obtained from GPC-FTIR deconvolution studies, are provided in Table 3.

TABLE 3

| | Example 1 | | |
|---|---|---|---|
| 1st ETHYLENE POLYMER (High Mw - Deconvolution Studies) | Contributions from R1 (kinetic model) | Contributions from R4 (kinetic model) | Combined fractions made in R1 and R4. Fraction used in the deconvolution study on overall composition (Flory Dist.) |
| Weight Fraction (%) | 0.315 | 0.105 | 0.420 |
| $M_n$ | 103,100 | 93,500 | 100,019 |
| $M_w$ | 209,900 | 188,800 | 203,570 |
| $M_z$ | 321,300 | 286,500 | 311,678 |
| Polydispersity Index ($M_w/M_n$) | 2.0 | 2.0 | 2.0 |
| Branch Freq/1000 C (SCB1) | 1.16 | 2.30 | 1.16 to 2.30 |
| Density Estimate (g/cm$^3$) (d1) | 0.9312 | 0.9287 | |
| Melt Index $I_2$ estimated based on Equation 2 (g/10 min) | 0.05 | 0.07 | |

| 2nd ETHYLENE POLYMER (Low Mw - Deconvolution Studies) | Contribution from R2 (kinetic model) | Defined from deconvolution study on overall composition (Flory Dist.) |
|---|---|---|
| Weight Fraction (%) | 0.39 | 0.435 |
| $M_n$ | 6,690 | 7,500 |
| $M_w$ | 13,900 | 15,000 |
| $M_z$ | 22,200 | 22,500 |
| Polydispersity Index ($M_w/M_n$) | 2.1 | 2.0 |
| Branch Freq/1000 C (SCB2) | 0.5 | |
| Density Estimate (g/cm$^3$) (d2) | 0.9609 | |
| Melt Index $I_2$ Estimated based on Equation 1 (g/10 min) | 3.4 | |
| Melt Index $I_2$ Estimated based on Equation 2 (g/10 min) | 1,983 | |

| 3rd ETHYLENE POLYMER (Deconvolution Studies) | Contribution from R5 (kinetic model) | Defined from deconvolution study on overall composition (Flory Dist.) |
|---|---|---|
| Weight Fraction (%) | 0.195 | 0.145 |
| $M_n$ | 20,900 | 28,000 |
| $M_w$ | 40,400 | 56,000 |
| $M_z$ | 70,300 | 84,000 |
| Polydispersity Index ($M_w/M_n$) | 2.2 | 2.0 |
| Branch Freq/1000 C (SCB2) | 1.4 | 0.0 |
| Density Estimate (g/cm$^3$) (d2) | 0.9479 | |
| Melt Index I2 Estimated based on Equation 1 (g/10 min) | 1.5 | 0.9 |
| Melt Index I2 Estimated based on Equation 2 (g/10 min) | 31.0 | 8.4 |

| | Comparative Example 2 | Comparative Example 4 (Ex. #3 in U.S. Pat. No. 9,982,077) | Comparative Example 4 | Comparative Example 5 (Ex. #1 in U.S. Pat. No. 9,321,865) |
|---|---|---|---|---|
| 1st ETHYLENE POLYMER (High Mw - Deconvolution Studies) | | | | |
| Weight Fraction (%) | 0.45 | 0.29 | 0.33 | 0.33 |
| $M_n$ | 103,100 | 111,200 | 83,500 | 94,588 |
| $M_w$ | 209,900 | 222,400 | 167,000 | 189,177 |
| $M_z$ | 321,300 | 333,600 | 250,500 | 283,765 |
| Polydispersity Index ($M_w/M_n$) | 2.0 | 2.0 | 2.0 | 2.0 |
| Branch Freq/1000 C (SCB1) | 1.16 | 2 | 2.3 | 3.2 |

TABLE 3-continued

| | | | | |
|---|---|---|---|---|
| Density Estimate (g/cm$^3$) (d1) | 0.9312 | 0.922 | 0.9301 | 0.9252 |
| Melt Index $I_2$ Estimated based on Equation 2 (g/10 min) | 0.05 | | | 0.08 |
| 2nd ETHYLENE POLYMER (Low Mw - Deconvolution Studies) | | | | |
| Weight Fraction (%) | 0.55 | 0.71 | 0.67 | 0.67 |
| $M_n$ | 6,690 | 23,700 | 19,700 | 17,187 |
| $M_w$ | 13,900 | 47,400 | 39,400 | 34,373 |
| $M_z$ | 22,200 | 71,100 | 59,100 | 51,560 |
| Polydispersity Index ($M_w/M_n$) | 2.1 | 2.0 | 2.0 | 2.0 |
| Branch Freq/1000 C (SCB2) | 0.5 | 0.0 | 0.0 | 0.4 |
| Density Estimate (g/cm$^3$) (d2) | | 0.948 | 0.9556 | 0.9526 |

| | Comparative Example 6 (Ex. #3 in U.S. Pat. No. 9,321,865) | Example 30 | Example 31 | Example 32 |
|---|---|---|---|---|
| 1st ETHYLENE POLYMER (High Mw - Deconvolution Studies) | | | | |
| Weight Fraction (%) | 0.33 | 0.312 | 0.388 | 0.329 |
| $M_n$ | 88,916 | 115,300 | 96,700 | 103,000 |
| $M_w$ | 177,832 | 230,600 | 193,400 | 206,000 |
| $M_z$ | 266,748 | 345,900 | 290,100 | 309,000 |
| Polydispersity Index ($M_w/M_n$) | 2.0 | 2.0 | 2.0 | 2.0 |
| Branch Freq/1000 C (SCB1) | 2.2 | 1.300 | 1.300 | 1.300 |
| Density Estimate (g/cm$^3$) (d1) | 0.9287 | 0.9292 | 0.9315 | 0.9307 |
| Melt Index $I_2$ Estimated based on Equation 2 (g/10 min) | 0.10 | 0.03 | 0.07 | 0.05 |
| 2nd ETHYLENE POLYMER (Low Mw - Deconvolution Studies) | | | | |
| Weight Fraction (%) | 0.67 | 0.688 | 0.612 | 0.311 |
| $M_n$ | 19,301 | 20,200 | 7,600 | 7,200 |
| $M_w$ | 38,601 | 40,400 | 15,200 | 14,400 |
| $M_z$ | 57,902 | 60,600 | 22,800 | 21,600 |
| Polydispersity Index ($M_w/M_n$) | 2.0 | 2.0 | 2.0 | 2.0 |
| Branch Freq/1000 C (SCB2) | 0.5 | 0.8 | 0.7 | 0.7 |
| Density Estimate (g/cm$^3$) (d2) | 0.9510 | 0.9501 | 0.9589 | 0.9593 |
| Melt Index $I_2$ estimated based on Equation 2 (g/10 min) | | 30 | 1,381 | 1,706 |
| 3rd ETHYLENE POLYMER (Deconvolution Studies) | | | | |
| Weight Fraction (%) | | | | 0.360 |
| $M_n$ | | | | 22,500 |
| $M_w$ | | | | 45,000 |
| $M_z$ | | | | 67,500 |
| Polydispersity Index ($M_w/M_n$) | | | | 2.0 |
| Branch Freq/1000 C (SCB2) | | | | 0.8 |
| Density Estimate (g/cm$^3$) (d2) | | | | 0.9493 |
| Melt Index I2 estimated based on Equation 2 (g/10 min) | | | | 20 |

Table 4 describes the peak and valleys of the molecular weight distribution profiles of example 1, and comparative examples 2, and 31. The valley location represents the local minimum seen in the molecular weight distribution profile. LMW peak location represents the molecular weight of the peak that is located at molecular weight lower than that of the valley. Valley intensity represents the weight fraction of the composition with a molecular weight equal to that of the valley location. LMW peak intensity represents the weight fraction of the composition with a molecular weight equal to that of the LMW peak molecular weight. HMW peak location represents the molecular weight of the peak that is located at molecular weight higher than that of the valley. HMW peak intensity represents the weight fraction of the composition with a molecular weight equal to that of the HMW peak molecular weight.

TABLE 4

| | Example 1 | Comparative Example 2 | Comparative Example 31 |
|---|---|---|---|
| LMW Peak Location (Mw) | 17,378 | 12,882 | 16,218 |
| LMW Peak Intensity (dw/dLogM) | 0.645 | 0.713 | 0.787 |
| Valley Location (Mw) | 60,256 | 46,774 | 61,660 |

TABLE 4-continued

| | Example 1 | Comparative Example 2 | Comparative Example 31 |
|---|---|---|---|
| Valley Intensity (dw/dLogM) | 0.411 | 0.188 | 0.240 |
| HMW Peak (Mw) | 186,209 | 177,828 | 165,959 |
| HMW Peak Intensity (dw/dLogM) | 0.535 | 0.536 | 0.407 |

The properties of pressed plaque and rotomolded parts made from comparative and polyethylene compositions of this disclosure are provided in Table 5.

TABLE 5

| | Example 1 | Comparative Example 2 | Comparative Example 3 (Ex. #3 in U.S. Pat. No. 9,982,077) | Comparative Example 4 | Comparative Example 5 (Ex. 1 in U.S. Pat. No. 9,321,865) |
|---|---|---|---|---|---|
| Flexural Properties | | | | | |
| Flex Secant Mod. 1% (MPa) | 1159 | 1337 | 1202 | 1057 | 957 |
| Flex Sec Mod 1% (MPa) Dev. | 61 | 23 | 24 | 25 | 13 |
| Environmental Stress Crack Resistance | | | | | |
| ESCR Cond. A10 (hours) 10% CO-630 | 151 | | 29-45 | 36 | 272 |
| ESCR Cond. B10 (hours) 10% CO-630 | 144 | 176 | 29-45 | 38 | 316 |
| ESCR Cond. A100 (hours) 100% CO-630 | >1000 | | 120 | 80 | >1000 |
| ESCR Cond. B100 (hours) 100% CO-630 | >1000 | >1000 | 112 | 141 | >1000 |
| Impact Performance (Test on Plaque) | | | | | |
| IZOD Impact (ft · lb/in) | 1.9 | 1.7 | | | |
| Tensile Impact (ft · lb/in$^2$) | 228.6 | 223.8 | | | |
| Low Temperature ARM Impact Performance | | | | | |
| Mean Failure Energy (ft · lb) at Optimal Conditions | 168-221 | 72.0-36.5 | 185 | 185 | 195 |
| Ductility (%) at Optimal Conditions | 55-100 | 0-0 | 92 | 100 | 100 |
| As is Density (g/cm$^3$) at Optimal Conditions | 0.9521-0.9535 | 0.953-0.956 | 0.952 | 0.9488 | 0.9418 |
| Oven Time at Oven Temperature of 560° F. (min) | 24-26 | 22-24 | | | 20 |

| | Comparative Example 6 (Ex. #3 in U.S. Pat. No. 9,321,865) | Example 30 | Example 31 | Example 32 |
|---|---|---|---|---|
| Flexural Properties | | | | |
| Flex Secant Mod. 1% (MPa) | 1006 | 1001 | 1276 | |
| Flex Sec Mod 1% (MPa) Dev. | 8 | | | |
| Environmental Stress Crack Resistance | | | | |
| ESCR Cond. A10 (hours) 10% CO-630 | 91 | <170 | 104 | 80 |
| ESCR Cond. B10 (hours) 10% CO-630 | 73 | 176 | 60 | 55 |
| ESCR Cond. A100 (hours) 100% CO-630 | >1000 | >1035 | 315 | 590 |
| ESCR Cond. B100 (hours) 100% CO-630 | >1000 | >1052 | 438 | 630 |
| Impact Performance (test on plaque) | | | | |
| IZOD Impact (ft · lb/in) | | 3.0 | 1.0 | 1.7 |
| Tensile Impact (ft · lb/in$^2$) | | 217.7 | 112 | 179.1 |
| Low Temperature ARM Impact Performance | | | | |
| Mean Failure Energy (ft · lb) at Optimal Conditions | 131-179 | 139-190 | 80 | 190 |
| Ductility (%) at Optimal Conditions | 70-100 | 91-90 | 0 | 80 |
| As is density (g/cm$^3$) at Optimal Conditions | 0.9439-0.9469 | 0.9481-0.9481 | 0.9564 | 0.9518 |
| Oven time at Oven Temperature of 560° F. (min) | 20-22 | 24-26 | 24 | 24 |

Figure 1B:
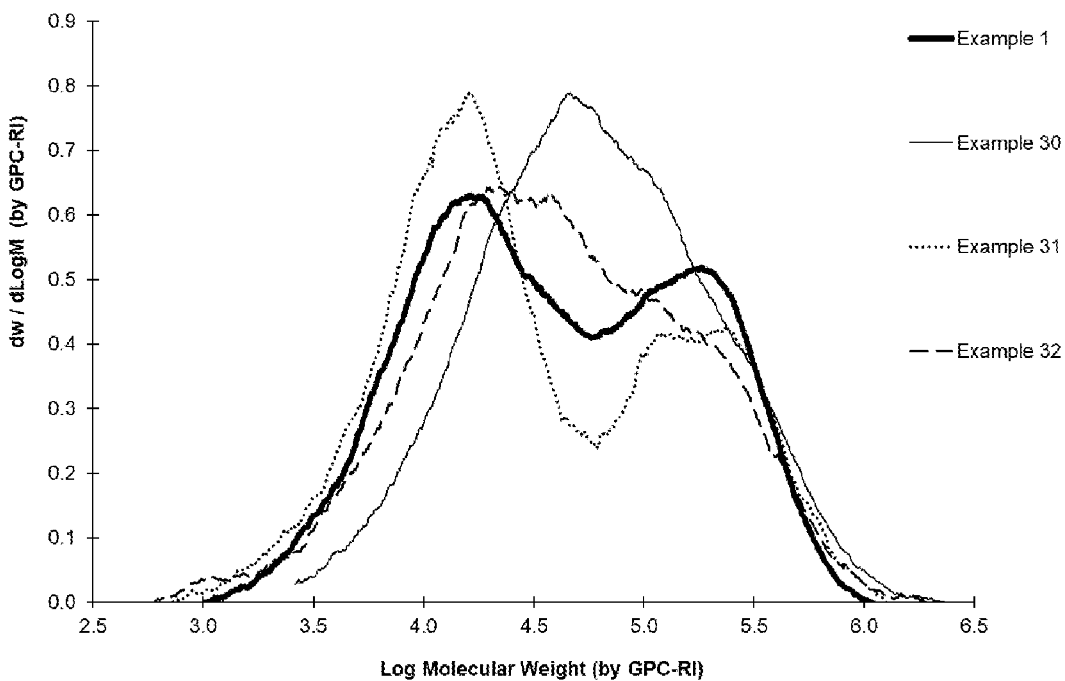

FIGS. 1A and 1B illustrate the molecular weight distribution obtained by GPC measurements of ethylene interpolymer compositions according to the present disclosure and comparative examples.

Figure 2:
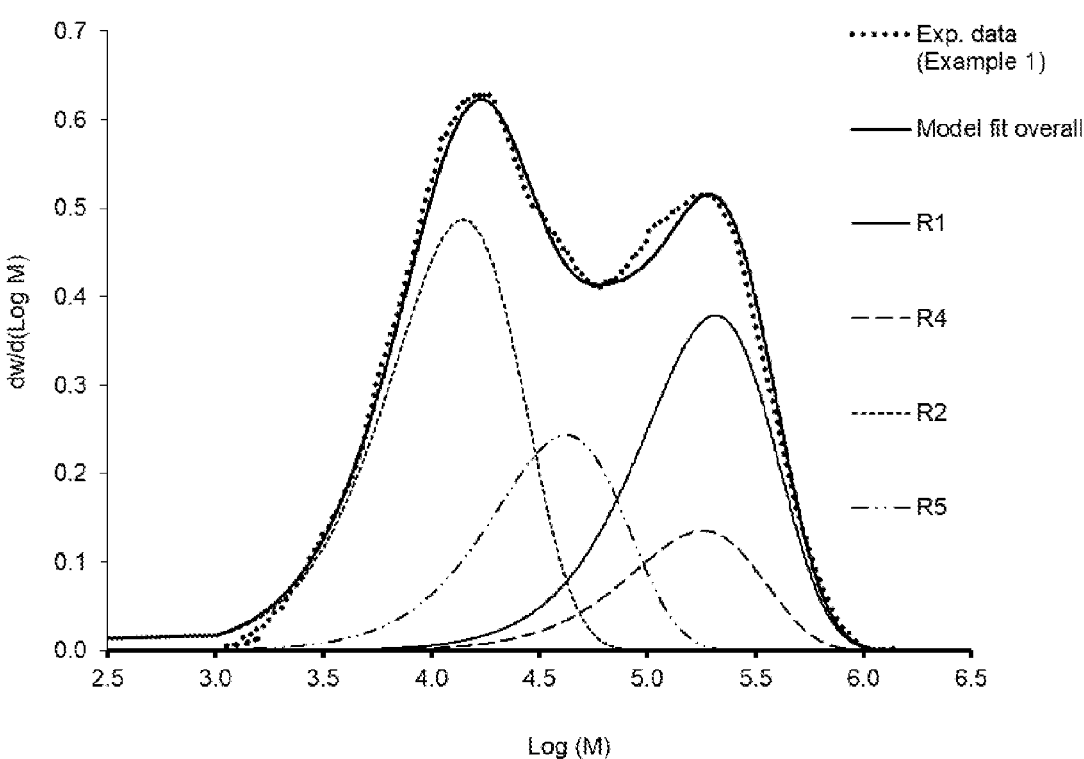
FIG. 2 illustrates the molecular weight distribution obtained by GPC measurement of an ethylene interpolymer polymer according to the present disclosure (Example 1) and computer model predictions of the molecular weight distributions of the ethylene polymers prepared in R1, R2, R4 and R5 that include Example 1.
Figure 3:
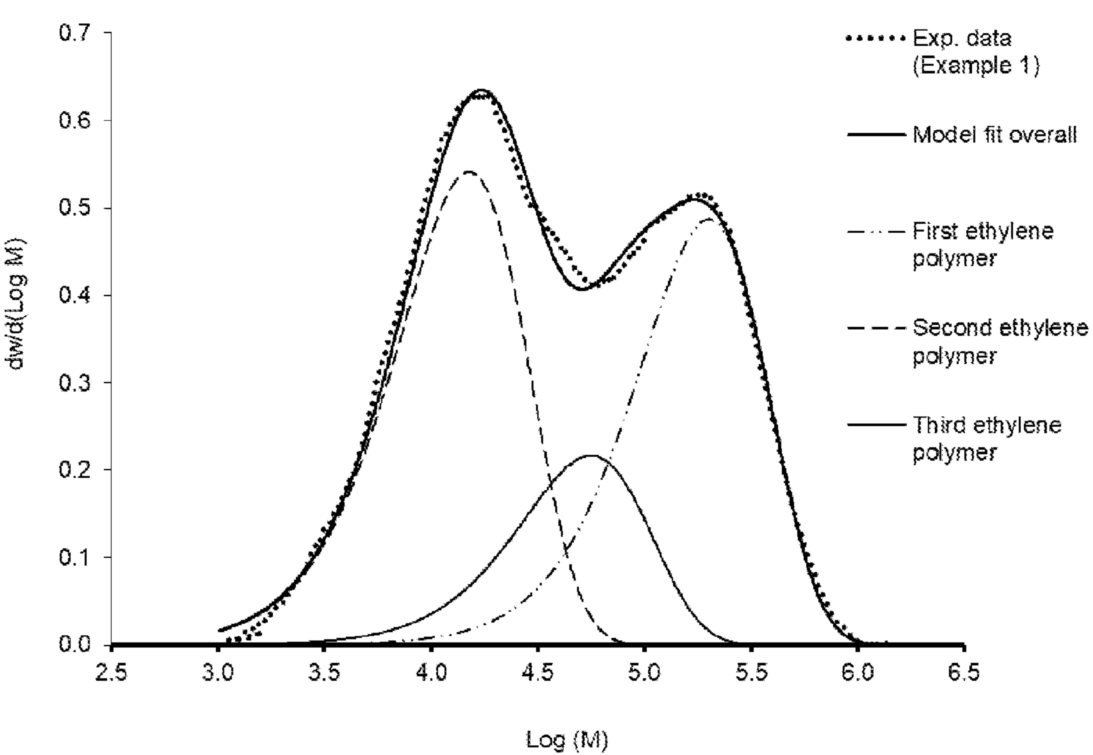
FIG. 3 illustrates the deconvolution of an ethylene interpolymer polymer according to the present disclosure (Example 1) and three idealized Flory's molecular weight distribution functions.

FIG. 2 illustrates the molecular weight distribution obtained by GPC measurement of the polymer of Example 1 and the computer model predictions of the molecular weight distributions of the ethylene polymers prepared in R1, R2, R4 and R5 that are included in the polymer of Example 1. The profile illustrates the goodness of the fit obtained from the deconvolution of the molecular weight distribution (Table 3). The high molecular weight components produced in R1 and R4, respectively, show great overlap in their molecular weights. While example 1 was prepared using components made in multiple reactors, the resulting composition can be described by fitting three idealized Flory distributions, as shown in FIG. 3.

Figure 4:
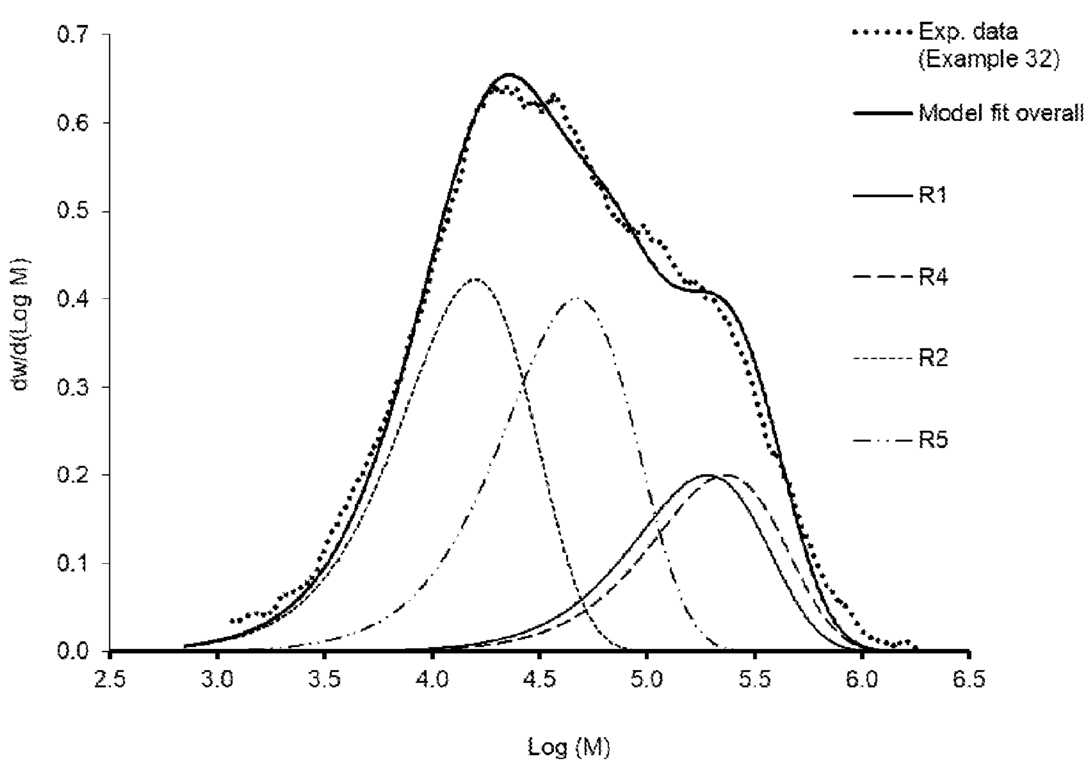
FIG. 4 illustrates the molecular weight distribution obtained by GPC measurement of Example 32 and computer model predictions of the molecular weight distributions of the ethylene polymers prepared in R1, R2, R4 and R5 from Example 32.
Figure 5:
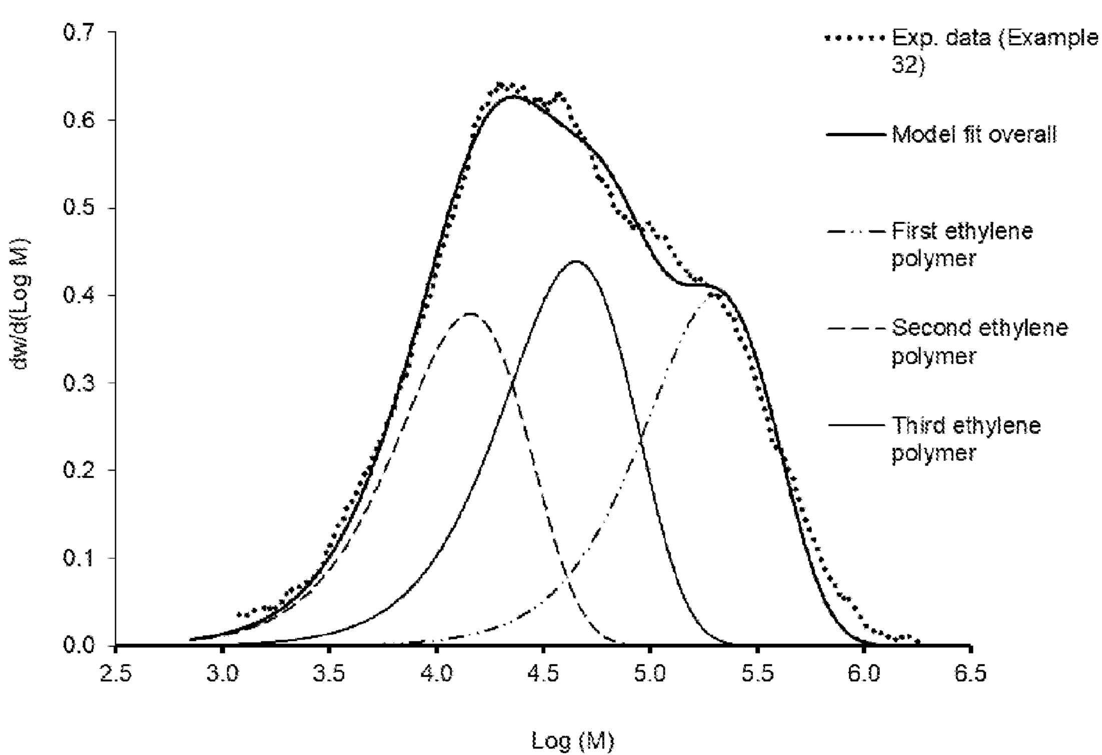
FIG. 5 illustrates the deconvolution of Example 32 and three idealized Flory's molecular weight distribution functions.
Figure 6:
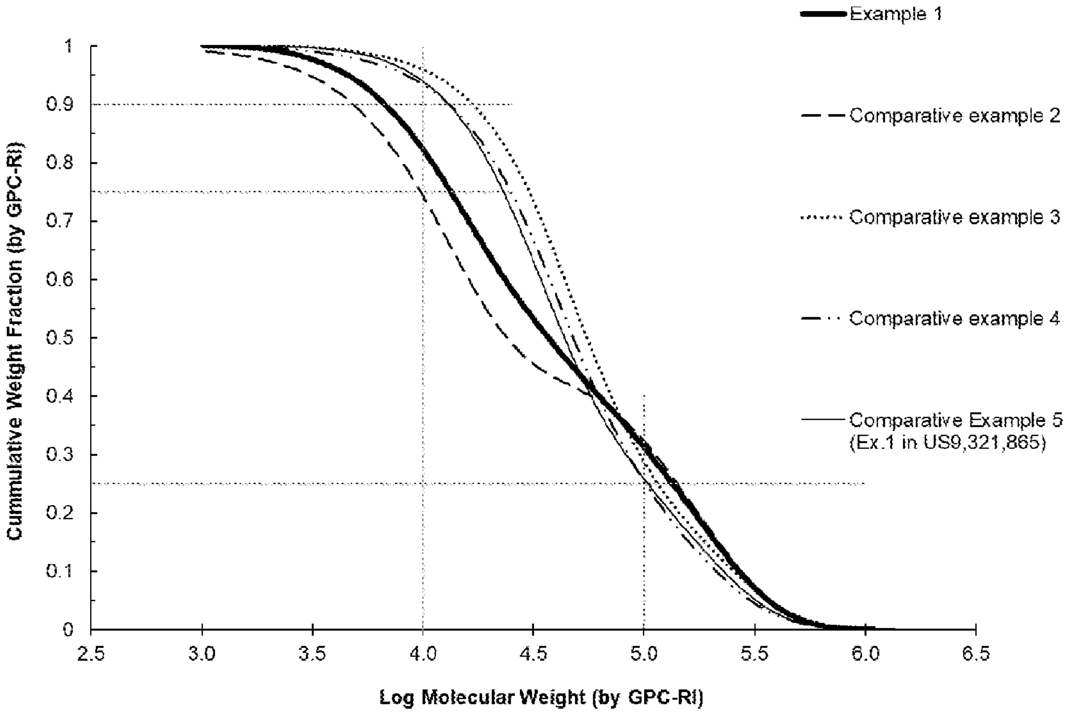
FIG. 6 illustrates the cumulative weight fraction of an ethylene interpolymer polymer according to the present disclosure (Example 1) and comparative examples.

Example 32 was prepared by melt compounding (blending) examples 30 and 31 (50:50 weight ratio). The contributions of each components making example 32 are illustrated in FIG. 4. Estimates for the four components that compose example 32 are based on those that define examples 30 and 31 (first and second interpolymer components used to prepare example 32). The profile shown in FIG. 4 illustrates the goodness of the fit obtained from the deconvolution of the molecular weight distribution (Table 3). The high molecular weight components show great overlap in their molecular weights. While the example was prepared using components made in multiple reactors, the resulting composition can be described by fitting three idealized Flory distributions, as shown in FIG. 5.

Table 5 presents performance characteristics of the examples disclosed in this application. Typically, excellent ESCR performance usually corresponds to having ESCR A10 and B10 with values greater than 100 hours, or ESCR A100 and B100 with values greater than 1,000 hours. Values for ESCR A100 and B100 greater than 500 hours are considered good. As used herein, high toughness, as evaluated from rotomolding trials, corresponds to a failure energy greater than 100 lb·ft in combination with ductility greater than 50% from ARM impact test carried out at −40° C. on rotomolded specimens with a thickness of ¼ inch.

Examples 5, 6 and 30 have excellent ESCR and toughness but a flexural secant modulus less than 1,100 MPa on the account of their density (Table 5). Conversely, examples 3 and 31 provide better stiffness (higher flexural secant modulus) but at the cost of ESCR performance and toughness as measured on compression molded plaques (Izod and tensile impact) and on rotomolded parts.

Example 32 has comparable stiffness compared to Example 1 but lacks ESCR performance. The composition of Example 1 has a higher fraction of material with a molecular weight, $M_w$, greater than 100,000 as compared to Example 32. The composition of Example 1 also has a higher fraction of material with a molecular weight, $M_w$, below 15,000 as compared to Example 32. Examples with densities greater than 0.948 g/cc with high ESCR performance are characterized herein by having a reverse comonomer distribution and a higher comonomer content for a comparable density. While maintaining the overall composition density on target, an increase in the overall comonomer content for compositions which contain a low molecular weight high density fraction was observed. While density is highly dependent on comonomer content, its dependence on molecular weight increases exponentially at low molecular weight (Tung and Buckser, 1958, "The effect of molecular weight ono the crystallinity of polyethylene" in J. Phys. Chem. Vol 62, no 12, pp. 1530-1534).

Example 1 shows superior performance over other examples with a high stiffness as evaluated from flexural secant modulus (1%) greater than 1100 MPa, combined with excellent ESCR performance and high toughness. In comparison, Example 2 shows poor toughness, as evidenced by a mean failure energy lower than 100 ft·lb and brittle type failure (0% ductility), as shown in Table 5.

The ethylene interpolymer composition according to the present disclosure has been shown to be beneficial for maintaining a better combination of stiffness, toughness and ESCR performance relative to conventional compositions. Melt solidification and crystallization during the rotomolding process occurs under very low shear and low cooling rate (order of magnitude of −10° C./min). Without wishing to be bound to any particular theory, it is believed that under such cooling conditions, the molecular components with very different molecular weight and compositions lead to the formation of non-uniform crystalline domains, which in turn would be unfavorable for energy dissipation during impact testing.

In general, the continuity in the molecular weight distribution may be described using one or more of the following characteristics of the cumulative molecular weight profile obtained from GPC-RI: (a) an upper limit on the weight fraction in the product composition with a molecular weight lower than 10,000 (weight fraction <25%) for compositions with a weight average molecular weight $M_w$>80,000; (b) a molecular weight distribution with at least 25 wt. % having a molecular weight >100,000; (c) a limit on the number average molecular weight of the high-density component of 10,000; and/or (d) from the cumulative molecular weight profile obtained from GPC-RI. The results suggest a lower limit on the weight fraction in the product composition with a molecular weight lower than 10,000 (weight fraction >10% required). Without wishing to be bound to any particular theory, a limit on 10,000 when defining continuity may be desirable based on the dependence of polyethylene crystallinity with molecular weight because it is linear and shows only slight variations at high molecular weight, but it becomes exponential as the molecular weight drops at values of 10,000. Without wishing to be bound to any particular theory, a limit on 100,000 for continuity may be desirable based on the comparison of the molecular weight profiles of interpolymer compositions according to the present disclosure and conventional compositions (see Example 1 and Comparative Example 2).

Examples of First Interpolymer Compositions and Second Interpolymer Compositions for Melt Blending to Provide Ethylene Interpolymer Compositions of the Present Disclosure As discussed herein, the ethylene interpolymer compositions provided in this disclosure can be formed by melt blending a first interpolymer composition and a second interpolymer composition. Provided in this section are examples of first interpolymer compositions and second interpolymer compositions that can be melt compounded to form the disclosed ethylene interpolymer compositions.

First Interpolymer Composition Examples

Examples of the first interpolymer compositions were prepared at a dual reactor pilot plant. In the dual reactor process, the content of the first reactor flowed into the second reactor, both of which were well mixed. The process operated using continuous feed streams. The catalyst formulation employed included (i) cyclopentadienyl tri(tertiarybutyl)phosphinimine titanium dichloride, Cp((t-Bu)$_3$PN)$TiCl_2$; MMAO-7; trityl tetrakis(pentafluorophenyl)borate; and 2,6-di-tert-butylhydroxy-4-ethylbenzene was fed to both reactors. The overall production rate was about 90 kg/hr.

The polymer compositions prepared at the pilot plant were stabilized by a conventional additive package. The composition contains an additive package comprising: a hindered monophosphite, a diphosphite, a hindered amine light stabilizer, and at least one additional additive selected from the group consisting of a hindered phenol and a hydroxylamine.

The polymerization conditions are provided in Table 6. The resulting interpolymer compositions are described in Table 7. Properties for the first ethylene interpolymer and the second ethylene interpolymer were estimated from deconvolution studies carried out on results obtained from GPC and GPC-FTIR. Results are set forth in Table 8.

TABLE 6

| | Example 7 | Example 8 | Example 9 |
|---|---|---|---|
| Ethylene split (based on wt. %) between first reactor (R1) and second reactor (R2) (R1/(R1 + R2) | 0.35 | 0.35 | 0.35 |
| Octene split between first Reactor (R1) and second reactor (R2) | 1 | 1 | 1 |
| Octene to ethylene ratio (based on wt. %) in fresh feed | 0.061 | 0.056 | 0.048 |
| Hydrogen in Reactor 1 (ppm) | 1 | 1 | 1 |
| Hydrogen in Reactor 2 (ppm) | 10 | 6 | 7.5 |
| Reactor 1 Temperature (° C.) | 141 | 142 | 140 |
| Reactor 2 Temperature (° C.) | 210 | 210 | 210 |
| Catalyst Feed in Reactor 1(ppm) | 0.34 | 0.1 | 0.08 |
| Catalyst Feed in Reactor 2 (ppm) | 0.24 | 0.42 | 0.41 |

TABLE 7

| | Example 7 | Example 8 | Example 9 |
|---|---|---|---|
| Density (g/cm$^3$) | 0.9439 | 0.9442 | 0.9453 |
| Melt Index $I_2$ (g/10 min) | 1.74 | 1.5 | 1.52 |
| Melt Index $I_5$ (g/10 min) | | | 4.64 |
| Melt Index $I_{10}$ (g/10 min) | | | 13.1 |
| Melt Index $I_{21}$ (g/10 min) | 68.9 | 52 | 54.7 |
| Melt Flow Ratio ($I_{21}/I_2$) | 39.6 | 35 | 35.6 |
| Zero Shear Viscosity - 190° C. (Pa-s) | 6460 | 7924 | 7177 |
| G' at G" = 500 MPa (MPa) | 69 | 43 | 168 |
| Branch Freq/1000 C | 2.8 | 2.3 | 2.4 |
| Comonomer ID | octene | octene | octene |
| Comonomer Content (wt %) | 2.2 | 1.8 | 1.9 |
| Internal Unsat/1000 C | 0.11 | 0.14 | 0.14 |
| Total Unsat/1000 C | 0.19 | 0.31 | 0.26 |
| $M_n$ | 28536 | 26727 | 28699 |
| $M_w$ | 87251 | 90848 | 88479 |
| $M_z$ | 225844 | 230637 | 229456 |
| Polydispersity Index ($M_w/M_n$) | 3.06 | 3.4 | 3.08 |
| Index (Mz/Mw) | 2.6 | 2.5 | 2.6 |
| CDBI-25: | 67.5 | 80.9 | 80.4 |
| CDBI-50: | 87.2 | 90.4 | 88.3 |
| Primary Melting Peak (° C.) | 127.2 | 127.8 | 128.1 |
| Heat of Fusion (J/g) | 190.8 | 188.7 | 187.3 |
| Crystallinity (%) | 65.8 | 65.1 | 64.6 |

TABLE 8

| | Example 7 | Example 8 | Example 9 |
|---|---|---|---|
| First Ethylene Interpolymer (Deconvolution Studies) | | | |
| $M_n$ | 94,588 | 86,063 | 88,916 |
| $M_w$ | 189,177 | 172,125 | 177,832 |
| Weight Fraction (%) | 0.33 | 0.31 | 0.33 |
| $M_z$ | 283,765 | 258,188 | 266,748 |
| Branch Freq/1000 C (SCB1) | 3.2 | 1.9 | 2.2 |
| Density Estimate (g/cm$^3$) (d1) | 0.9252 | 0.9300 | 0.9287 |
| Melt Index $I_2$ Estimate (g/10 min) | 0.08 | 0.11 | 0.10 |
| Second Ethylene Interpolymer (Deconvolution Studies) | | | |
| $M_n$ | 17,187 | 20,103 | 19,301 |
| $M_w$ | 34,373 | 40,207 | 38,601 |

TABLE 8-continued

| | Example 7 | Example 8 | Example 9 |
|---|---|---|---|
| Weight fraction (%) | 0.67 | 0.69 | 0.67 |
| $M_z$ | 51,560 | 60,310 | 57,902 |
| Branch Freq/1000 C (SCB2) | 0.4 | 0.6 | 0.5 |
| Density Estimate (g/cm$^3$) (d2) | 0.9526 | 0.9502 | 0.9510 |
| Melt Index $I_2$ Estimate (g/10 min) | 56.75 | 30.07 | 35.45 |
| Estimated d2 − d1 (g/cm3) | 0.0274 | 0.0202 | 0.0223 |

Second Interpolymer Composition Examples

Examples of the second interpolymer compositions were produced in a dual reactor solution polymerization process in which the contents of the first reactor flowed into the second reactor. This in-series dual reactor process produced an in-situ polyethylene blend (i.e., the second interpolymer composition). Due to the in-series reactor configuration, unreacted ethylene monomer, and unreacted alpha-olefin comonomer present in the first reactor flowed into the downstream second reactor for further polymerization.

For the second interpolymer composition examples, although no co-monomer was fed directly to the downstream second reactor, an ethylene interpolymer was nevertheless formed in the second reactor due to the presence of unreacted 1-octene flowing from the first reactor to the second reactor where it is copolymerized with ethylene. Each reactor was sufficiently agitated to give conditions in which components were well mixed. The volume of the first reactor was 12 liters and the volume of the second reactor was 22 liters. The first reactor was operated at a pressure of 10,500 to 35,000 kPa and the second reactor was operated at a lower pressure to facilitate continuous flow from the first reactor to the second. The solvent employed was methylpentane. The process was operated using continuous feed streams. The catalyst employed in the dual reactor solution process experiments was cyclopentadienyl tri(tertiarybutyl)phosphinimine titanium dichloride, $Cp((t\text{-}Bu)_3PN)TiCl_2$. Trityl tetrakis(pentafluorophenyl)borate was used in approximately stoichiometric amounts relative to the titanium complex. Commercially available modified methylaluminoxane (MMAO) was included as a scavenger at an Al:Ti of about 40:1. In addition, as 2,6-Di-tert-butyl-4-ethylphenol was added to scavenge free trimethylaluminum within the MMAO in a ratio of Al:OH of about 0.5:1.

The polymerization conditions used to make the examples of second interpolymer compositions are provided in Table 9.

TABLE 9

| | Example 10 | Example 11 | Example 12 | Example 13 | Example 14 |
|---|---|---|---|---|---|
| Reactor 1 | | | | | |
| Ethylene (kg/h) | 35.6 | 38.1 | 35.7 | 36.7 | 37.5 |
| 1-Octene (kg/h) | 4.9 | 4 | 5.3 | 4.1 | 4.8 |
| Hydrogen (g/h) | 0.51 | 0.58 | 0.51 | 0.50 | 0.50 |
| Solvent (kg/h) | 319.2 | 329 | 296.5 | 296.8 | 286.8 |
| Reactor Feed Inlet Temperature (° C.) | 30 | 30 | 30 | 30 | 30 |
| Reactor Temperature (° C.) | 138.2 | 140.5 | 141.1 | 143.8 | 149.2 |
| Catalyst Feed in Reactor 1 (ppm) | 0.14 | 0.10 | 0.12 | 0.1 | 0.1 |
| Reactor 2 | | | | | |
| Ethylene (kg/h) | 43.6 | 51.6 | 43.6 | 44.9 | 45.9 |
| 1-Octene (kg/h) | 0 | 0 | 0 | 0 | 0 |
| Hydrogen (g/h) | 22.2 | 13.46 | 22.2 | 16.4 | 21 |
| Solvent (kg/h) | 106.7 | 137.2 | 129.1 | 127.5 | 135 |
| Reactor Feed Inlet Temperature (° C.) | 30 | 30 | 30 | 31.3 | 29.8 |
| Reactor Temperature (° C.) | 186.9 | 192.1 | 186.3 | 190.9 | 194 |
| Catalyst Reed in Reactor 2 (ppm) | 0.29 | 0.23 | 0.21 | 0.21 | 0.24 |

| | Example 15 | Example 16 | Example 17 | Example 18 |
|---|---|---|---|---|
| Reactor 1 | | | | |
| Ethylene (kg/h) | 35.7 | 35.6 | 35.7 | 38.4 |
| 1-Octene (kg/h) | 2.6 | 4.7 | 4.9 | 1.5 |
| Hydrogen (g/h) | 0.45 | 0.46 | 0.46 | 0.62 |
| Solvent (kg/h) | 256.6 | 259.1 | 258.9 | 346.3 |
| Reactor Feed Inlet Temperature (° C.) | 30 | 30 | 30 | 30 |
| Reactor Temperature (° C.) | 152.5 | 151 | 147 | 141.1 |
| Catalyst Feed in Reactor 1 (ppm) | 0.08 | 0.13 | 0.10 | 0.10 |
| Reactor 2 | | | | |
| Ethylene (kg/h) | 43.6 | 43.6 | 43.6 | 51.9 |
| 1-Octene (kg/h) | 0 | 0 | 0 | 0 |
| Hydrogen (g/h) | 10.2 | 21.59 | 16.21 | 15.07 |
| Solvent (kg/h) | 171.6 | 167 | 167.1 | 121.7 |

TABLE 9-continued

| | | | | |
|---|---|---|---|---|
| Reactor Feed Inlet Temperature (° C.) | 30 | 30 | 30 | 30 |
| Reactor Temperature (° C.) | 185.7 | 186.2 | 186.4 | 192.8 |
| Catalyst Feed in Reactor 2 (ppm) | 0.13 | 0.22 | 0.20 | 0.31 |

| | Example 19 | Example 20 | Example 21 | Example 22 |
|---|---|---|---|---|
| Reactor 1 | | | | |
| Ethylene (kg/h) | 34.1 | 34.1 | 34.1 | 32.6 |
| 1-Octene (kg/h) | 4 | 3.1 | 4.8 | 4.9 |
| Hydrogen (g/h) | 0.27 | 0.22 | 0.35 | 0.29 |
| Solvent (kg/h) | 331.3 | 345.1 | 314.4 | 311.4 |
| Reactor Feed Inlet Temperature (° C.) | 30 | 30 | 30 | 30 |
| Reactor Temperature (° C.) | 135.8 | 137 | 139.9 | 140 |
| Catalyst Feed in Reactor 1 (ppm) | 0.08 | 0.13 | 0.09 | 0.13 |
| Reactor 2 | | | | |
| Ethylene (kg/h) | 41.7 | 41.7 | 41.7 | 40.0 |
| 1-Octene (kg/h) | 0 | 0 | 0 | 0 |
| Hydrogen (g/h) | 19.8 | 19.25 | 23.10 | 20.35 |
| Solvent (kg/h) | 128.8 | 115.7 | 144.9 | 151.1 |
| Reactor Feed Inlet Temperature (° C.) | 29.8 | 34.2 | 30 | 30.5 |
| Reactor Temperature (° C.) | 192.2 | 192 | 191.9 | 186.3 |
| Catalyst Feed in Reactor 2 (ppm) | 0.29 | 0.21 | 0.28 | 0.21 |

Selected properties of the second interpolymer composition examples are provided in Table 10.

TABLE 10

| | Example 10 | Example 11 | Example 12 |
|---|---|---|---|
| Density (g/cm$^3$) | 0.9529 | 0.9524 | 0.9524 |
| Rheology/Flow Properties | | | |
| Melt Index $I_2$ (g/10 min) | 1.57 | 2.94 | 1.69 |
| Melt Flow Ratio ($I_{21}/I_2$) | 58 | 44.1 | 61 |
| Stress Exponent | 1.38 | 1.36 | 1.38 |
| $I_{21}$ (g/10 min) | 90 | 129 | 104 |
| $I_5$ (g/10 min) | 4.72 | | 4.94 |
| $I_{21}/I_5$ | 19.07 | | 21.05 |
| Shear Viscosity at $10^5$ $s^{-1}$ (240° C., Pa-s) | 5.1 | 6.2 | 4.8 |
| Shear Viscosity Ratio $\eta(10\ s^{-1})/\eta(1000\ s^{-1})$ at 240° C. | 13.5 | 8.1 | 13.0 |
| DMA Data (190° C.) | $\eta^*$ = 5294 Pa*s at G* = 2.647 kPa; $\eta^*$ = 5106 Pa*s at G* = 3.547 kPa | | $\eta^*$ = 4889 Pa*s at G* = 2.445 kPa; $\eta^*$ = 4739 Pa*s at G* = 3.292 kPa |
| GPC | | | |
| $M_n$ | 10524 | 15679 | 10579 |
| $M_w$ | 83712 | 74090 | 86319 |
| $M_z$ | 256210 | 215369 | 291056 |
| Polydispersity Index ($M_w/M_n$) | 7.95 | 4.73 | 8.16 |
| $M_z/M_w$ | 3.06 | 2.91 | 3.37 |
| Broadness Factor $(M_w/M_n)/(M_z/M_w)$ | 2.60 | 1.63 | 2.42 |
| Branch Frequency - FTIR (uncorrected for chain end - $CH_3$) | | | |
| Uncorrected SCB/1000 C | 3 | 1.8 | 3 |
| Uncorrected Comonomer content (mol %) | 0.6 | 0.4 | 0.6 |
| Comonomer ID | 1-octene | 1-octene | 1-octene |
| Comonomer mol % measured by $^{13}$C-NMR | | | |
| Hexyl+ branches(≥4 carbon atoms), mol % | 0.4 | | 0.4 |
| Slow-CTREF | | | |
| $CDBI_{50}$ (wt. %) | | | |
| $CDBI_{25}$ (wt. %) | 65.4 | 61.8 | 61.8 |
| DSC | | | |
| Primary Melting Peak (° C.) | 127.3 | 128.8 | 127.5 |
| Heat of Fusion (J/g) | 203.8 | 206.1 | 207.3 |
| Crystallinity (%) | 70.27 | 71.08 | 71.48 |
| Other Properties | | | |

TABLE 10-continued

| | | | |
|---|---|---|---|
| Hexane Extractables (wt. %) | 0.36 | 0.22 | 0.42 |
| VICAT Soft. Pt. (° C.) - Plaque | 125.2 | 126.8 | 124.8 |
| Heat Deflection Temp. [° C.] @ 66 PSI | 68 | 74.1 | 76 |

| | Example 13 | Example 14 | Example 15 |
|---|---|---|---|
| Density (g/cm$^3$) | 0.9523 | 0.9532 | 0.9527 |
| Rheology/Flow Properties | | | |
| Melt Index $I_2$ (g/10 min) | 1.5 | 1.78 | 1.29 |
| Melt Flow Ratio ($I_{21}/I_2$) | 54.8 | 55.6 | 44.1 |
| Stress Exponent | 1.4 | 1.37 | 1.35 |
| $I_{21}$ (g/10 min) | 82.3 | 99.1 | 57 |
| $I_5$ (g/10 min) | 4.5 | 5.33 | |
| $I_{21}/I_5$ | 18.29 | 18.59 | |
| Shear Viscosity at $10^5$ $s^{-1}$ (240° C., Pa-s) | 5.8 | 5.1 | 6.3 |
| Shear Viscosity Ratio $\eta(10\ s^{-1})/\eta(1000\ s^{-1})$ at 240° C. | 14.8 | 13.3 | 11.6 |
| DMA Data (190° C.) | | | $\eta^*$ = 6707 Pa*s at G* = 2.413 kPa; $\eta^*$ = 6465 Pa*s at G* = 3.232 kPa |
| GPC | | | |
| $M_n$ | 13309 | 9716 | 18449 |
| $M_w$ | 88295 | 84943 | 93080 |
| $M_z$ | 278141 | 288665 | 272788 |
| Polydispersity Index ($M_w/M_n$) | 6.63 | 8.74 | 5.05 |
| $M_z/M_w$ | 3.15 | 3.40 | 2.93 |
| Broadness Factor ($M_w/M_n$)/($M_z/M_w$) | 2.10 | 2.57 | 1.72 |
| Branch Frequency - FTIR (uncorrected for chain end - $CH_3$) | | | |
| Uncorrected SCB/1000 C | 2.1 | 2.5 | 1.7 |
| Uncorrected comonomer content (mol %) | 0.4 | 0.5 | 0.3 |
| Comonomer ID | 1-octene | 1-octene | 1-octene |
| Comonomer mol % measured by $^{13}$C-NMR | | | |
| Hexyl+ branches(≥ 4 carbon atoms), mol % | 0.3 | | |
| Slow-CTREF | 76.5 | | |
| $CDBI_{50}$ (wt. %) | | 75.2 | 86.2 |
| $CDBI_{25}$ (wt. %) | | | |
| DSC | | | |
| Primary Melting Peak (° C.) | 129 | 128.3 | 129.8 |
| Heat of Fusion (J/g) | 209 | 207.3 | 208.5 |
| Crystallinity (%) | 72.08 | 71.48 | 71.9 |
| Other Properties | | | |
| Hexane Extractables (wt. %) | 0.25 | 0.33 | 0.25 |
| VICAT Soft. Pt. (° C.) - Plaque | 126.4 | 125.4 | 128.2 |
| Heat Deflection Temp. [° C.] @ 66 PSI | 67.3 | 69.8 | 68.2 |

| | Example 16 | Example 17 | Example 18 |
|---|---|---|---|
| Density (g/cm$^3$) | 0.9534 | 0.9522 | 0.9568 |
| Rheology/Flow Properties | | | |
| Melt Index $I_2$ (g/10 min) | 2.05 | 1.31 | 1.68 |
| Melt Flow Ratio ($I_{21}/I_2$) | 55 | 64 | 54.2 |
| Stress Exponent | 1.34 | 1.39 | 1.40 |
| $I_{21}$ (g/10 min) | 113 | 83 | 91 |
| $I_5$ (g/10 min) | 6.21 | 0 | |
| $I_{21}/I_5$ | 18.20 | | |
| Shear Viscosity at $10^5$ $s^{-1}$ (240° C., Pa-s) | 5.0 | 5.8 | 6.0 |
| Shear Viscosity Ratio $\eta(10\ s^{-1})/\eta(1000\ s^{-1})$ at 240° C. | 12.1 | 14.8 | 11.2 |
| DMA Data (190° C.) | | $\eta^*$ = 6688 Pa*s at G* = 2.407 kPa; $\eta^*$ = 6472 Pa*s at G* = 3.236 kPa | |
| GPC | | | |
| $M_n$ | 11145 | 14021 | 15110 |
| $M_w$ | 80630 | 93175 | 85227 |
| $M_z$ | 243944 | 303823 | 287035 |
| Polydispersity Index ($M_w/M_n$) | 7.23 | 6.65 | 5.64 |
| $M_z/M_w$ | 3.03 | 3.26 | 3.37 |
| Broadness Factor ($M_w/M_n$)/($M_z/M_w$) | 1.43 | 2.04 | 1.72 |
| Branch Frequency - FTIR (uncorrected for chain end - $CH^3$) | | | |

TABLE 10-continued

| | | | |
|---|---|---|---|
| Uncorrected SCB/1000 C | 2.8 | 2.2 | 1.7 |
| Uncorrected comonomer content (mol %) | 0.6 | 0.4 | 0.3 |
| Comonomer ID | 1-octene | 1-octene | 1-octene |
| Comonomer mol % measured by $^{13}$C-NMR | | | |
| Hexyl+ branches(≥4 carbon atoms), mol % | | | |
| Slow-CTREF | | | |
| $CDBI_{50}$ (wt. %) | 79.7 | 80.4 | 86.2 |
| $CDBI_{25}$ (wt. %) | | | |
| DSC | | | |
| Primary Melting Peak (° C.) | 127.9 | 128.4 | 129.8 |
| Heat of Fusion (J/g) | 2211.1 | 205.4 | 208.5 |
| Crystallinity (%) | 72.8 | 70.82 | 71.9 |
| Other properties | | | |
| Hexane Extractables (wt. %) | 0.38 | 0.27 | 0.25 |
| VICAT Soft. Pt. (° C.) - Plaque | 125.2 | 126.2 | 128.2 |
| Heat Deflection Temp. [° C.] @ 66 PSI | 66.8 | 69 | 68.2 |

Calculated properties for the first ethylene interpolymer and the second ethylene interpolymer of the second interpolymer examples, as obtained from GPC-FTIR deconvolution studies, are provided in Table 11.

TABLE 11

| Example No. | Example 12 | Example 13 | Example 14 | Example 16 |
|---|---|---|---|---|
| Density (g/cm$^3$) | 0.9524 | 0.9523 | 0.9532 | 0.9534 |
| $I_2$ (g/10 min.) | 1.69 | 1.5 | 1.78 | 2.05 |
| Stress Exponent | 1.38 | 1.4 | 1.37 | 1.34 |
| MFR ($I_{21}/I_2$) | 61 | 54.8 | 55.6 | 55 |
| $M_w/M_n$ | 8.16 | 6.63 | 8.74 | 7.23 |
| 1$^{st}$ Ethylene Copolymer | | | | |
| Weight % | 0.455 | 0.454 | 0.454 | 0.453 |
| $M_w$ | 165100 | 168100 | 162700 | 157200 |
| $I_2$ (g/10 min.) | 0.13 | 0.12 | 0.13 | 0.15 |
| Density 1, $d_1$ (g/cm$^3$) | 0.9325 | 0.9302 | 0.9322 | 0.9316 |
| SCB1 per 1000 Cs | 1.57 | 2.24 | 1.71 | 2.02 |
| mol % 1-octene | 0.31 | 0.45 | 0.34 | 0.40 |
| 2$^{nd}$ Ethylene Copolymer | | | | |
| Weight % | 0.545 | 0.546 | 0.546 | 0.547 |
| $M_w$ | 11100 | 14900 | 12100 | 11400 |
| $I_2$ (g/10 min.) | 6318 | 1817 | 4419 | 5739 |
| Density 2, $d_2$ (g/cm$^3$) | 0.9614 | 0.9555 | 0.959 | 0.9577 |
| SCB2 per 1000 Cs | 0.63 | 1.64 | 1.08 | 1.59 |
| mol % 1-octene | 0.13 | 0.33 | 0.22 | 0.32 |
| Estimated ($d_2$ − $d_1$), g/cm$^3$ | 0.0289 | 0.0253 | 0.0268 | 0.0261 |
| Estimated (SCB2 − SCB1) | −0.94 | −0.6 | −0.63 | −0.43 |
| SCB1/SCB2 | 2.5 | 1.37 | 1.58 | 1.27 |

The properties of pressed plaques made from examples of the second interpolymer composition are provided in Table 12.

TABLE 12

| Example No. | Example 10 | Example 11 | Example 12 | Example 13 |
|---|---|---|---|---|
| Environmental Stress Crack Resistance | | | | |
| ESCR Cond. B at 10% (hours) | 309 | 23 | 212 | 86 |
| Flexural Properties (Plaques) | | | | |
| Flex Secant Mod. 1% (MPa) | 1274 | 1247 | 1267 | 1295 |
| Flex Sec Mod 1% (MPa) Dev. | 39 | 44 | 19 | 23 |
| Flex Secant Mod. 2% (MPa) | 1064 | 1035 | 1060 | 1085 |
| Flex Sec Mod 2% (MPa) Dev. | 29 | 33 | 14 | 21 |
| Flexural Strength (MPa) | 37.5 | 36.7 | 37.1 | 37.3 |
| Flexural Strength Dev. (MPa) | 0.8 | 0.4 | 0.3 | 0.4 |

TABLE 12-continued

| Tensile Properties (Plaques) | | | | |
|---|---|---|---|---|
| Elong. at Yield (%) | 9 | 10 | 8 | 10 |
| Elong. at Yield Dev. (%) | 1 | 1 | 0 | 0 |
| Yield Strength (MPa) | 26 | 25.6 | 26.4 | 26.3 |
| Yield Strength Dev. (MPa) | 0.2 | 0.1 | 0.3 | 0.3 |
| Ultimate Elong. (%) | 701 | 988 | 762 | 891 |
| Ultimate Elong. Dev. (%) | 106 | 58 | 98 | 23 |
| Ultimate Strength (MPa) | 21.8 | 32.2 | 24.7 | 33.3 |
| Ultimate Strength Dev. (MPa) | 6.8 | 1.9 | 7.4 | 2 |
| Sec Mod 1% (MPa) | 1483 | 1256 | 1331 | 1230 |
| Sec Mod 1% (MPa) Dev. | 121 | 333 | 241 | 90 |
| Sec Mod 2% (MPa) | 973 | 880 | 939 | 913 |
| Sec Mod 2% (MPa) Dev. | 33 | 88 | 62 | 34 |
| Impact Properties (Plaques) | | | | |
| Notched Izod Impact (J/m) | 74.7 | 69.4 | 69.4 | 80.1 |
| IZOD DV (J/m) | 0.0 | 0.0 | 0.0 | 2.7 |

| Example No. | Example 14 | Example 15 | Example 16 | Example 17 |
|---|---|---|---|---|
| Environmental Stress Crack Resistance | | | | |
| ESCR Cond. B at 10% (hours) | 83 | 60 | 73 | 157 |
| Flexural Properties (Plaques) | | | | |
| Flex Secant Mod. 1% (MPa) | 1304 | 1240 | 1318 | 1260 |
| Flex Sec Mod 1% (MPa) Dev. | 57 | 31 | 37 | 25 |
| Flex Secant Mod. 2% (MPa) | 1092 | 1026 | 1098 | 1049 |
| Flex Sec Mod 2% (MPa) Dev. | 40 | 26 | 24 | 15 |
| Flexural Strength (MPa) | 37.6 | 36.1 | 38.2 | 36.9 |
| Flexural Strength Dev. (MPa) | 0.8 | 0.6 | 0.3 | 0.6 |
| Tensile Properties (Plaques) | | | | |
| Elong. at Yield (%) | 9 | 10 | 8 | 9 |
| Elong. at Yield Dev. (%) | 0 | 0 | 0 | 1 |
| Yield Strength (MPa) | 26.4 | 25.6 | 26.9 | 26.1 |
| Yield Strength Dev. (MPa) | 0.2 | 0.2 | 0.2 | 0.2 |
| Ultimate Elong. (%) | 862 | 974 | 766 | 836 |
| Ultimate Elong. Dev. (%) | 47 | 35 | 130 | 103 |
| Ultimate Strength (MPa) | 29.7 | 36.3 | 22.9 | 29.6 |
| Ultimate Strength Dev. (MPa) | 2.7 | 1.5 | 7 | 5.5 |
| Sec Mod 1% (MPa) | 1197 | 1333 | 1429 | 1395 |
| Sec Mod 1% (MPa) Dev. | 128 | 213 | 183 | 217 |
| Sec Mod 2% (MPa) | 881 | 893 | 979 | 934 |
| Sec Mod 2% (MPa) Dev. | 40 | 70 | 52 | 73 |
| Impact Properties (Plaques) | | | | |
| Notched Izod Impact (J/m) | 64.1 | 128.1 | 64.1 | 80.1 |
| IZOD DV (J/m) | 2.1 | 5.3 | 0.0 | 0.0 |

INDUSTRIAL APPLICABILITY

Polyethylene compositions and rotomolded articles.

The invention claimed is:

1. An ethylene interpolymer composition comprising a first ethylene interpolymer, a second ethylene interpolymer, and a third ethylene interpolymer, wherein the ethylene interpolymer composition has:
   - a density of at least 0.945 g/cm$^3$;
   - a z-average molecular weight, $M_z$, from 200,000 to 800,000;
   - an environmental stress crack resistance (ESCR), measured according to ASTM D1693, Condition B, 10% IGEPAL CO-360, of at least 90 hours; and
   - an IZOD impact strength of greater than 1.5 ft·lb/inch.

2. The ethylene interpolymer composition of claim 1, wherein the density of the ethylene interpolymer composition is from 0.945 g/cm$^3$ to 0.949 g/cm$^3$.

3. The ethylene interpolymer composition of claim 1, wherein the density of the ethylene interpolymer composition is from 0.949 g/cm$^3$ to 0.953 g/cm$^3$.

4. The ethylene interpolymer composition of claim 1, wherein the density of the ethylene interpolymer composition is from 0.953 g/cm$^3$ to 0.957 g/cm$^3$.

5. The ethylene interpolymer composition of claim 1, wherein the ethylene interpolymer composition comprises a melt index, $I_2$, from 0.5-10 g/10 min.

6. The ethylene interpolymer composition of claim 1, wherein the ethylene interpolymer composition has a number average molecular weight, $M_n$, from 10,000 to 40,000.

7. The ethylene interpolymer composition of claim 1, wherein the ethylene interpolymer composition has a weight-average molecular weight, $M_w$, from 40,000 to 150,000.

8. The ethylene interpolymer composition of claim 1, wherein the ethylene interpolymer composition has a polydispersity index ($M_w/M_n$) from 3 to 11.

9. The ethylene interpolymer composition of claim 1, wherein the ethylene interpolymer composition has an ESCR from 90 hours to 500 hours, as measured according to ASTM D1693, Condition B, 10% IGEPAL CO-360.

10. The ethylene interpolymer composition of claim 1, wherein the Izod impact strength of the ethylene interpolymer composition is from 1.5 ft·lb/in$^2$ to 10 ft·lb/in$^2$.

11. The ethylene interpolymer composition of claim 1, wherein at least one of the first ethylene interpolymer, the second ethylene interpolymer, or the third ethylene interpolymer comprises an α-olefin chosen from butene, pentene, hexene, heptene, octene, nonene, decene, or a combination thereof.

12. The ethylene interpolymer composition of claim 1, wherein the ethylene interpolymer composition has a bimodal profile in a gel permeation chromatograph.

13. The ethylene interpolymer composition of claim 1, wherein the ethylene interpolymer composition further comprises at least one catalyst residue chosen from titanium, aluminum, magnesium, and chlorine.

14. The ethylene interpolymer composition of claim 13, wherein the ethylene interpolymer composition comprises from 0.100 parts per million (ppm) to 1.000 ppm titanium.

15. The ethylene interpolymer composition of claim 13, wherein the ethylene interpolymer composition comprises from 1.00 parts per million (ppm) aluminum to 10.00 ppm aluminum.

16. The ethylene interpolymer composition of claim 13, wherein the ethylene interpolymer composition comprises less than 2.0 parts per million (ppm) magnesium.

17. The ethylene interpolymer composition of claim 13, wherein the ethylene interpolymer composition comprises from 0.100 parts per million (ppm) chlorine to 1.000 ppm chlorine.

* * * * *